US010719888B2

(12) United States Patent
Eder

(10) Patent No.: US 10,719,888 B2
(45) Date of Patent: Jul. 21, 2020

(54) CONTEXT SEARCH SYSTEM

(71) Applicant: XENOGENIC DEVELOPMENT LIMITED LIABILITY COMPANY, Wilmington, DE (US)

(72) Inventor: Jeffrey Scott Eder, Mill Creek, WA (US)

(73) Assignee: XENOGENIC DEVELOPMENT LIMITED LIABILITY COMPANY, Wilmington, DE (US)

( * ) Notice: Subject to any disclaimer, the term of this patent is extended or adjusted under 35 U.S.C. 154(b) by 0 days.

(21) Appl. No.: 16/441,761

(22) Filed: Jun. 14, 2019

(65) Prior Publication Data

US 2019/0362436 A1    Nov. 28, 2019

Related U.S. Application Data

(63) Continuation of application No. 11/262,146, filed on Oct. 28, 2005, now Pat. No. 10,346,926, which is a
(Continued)

(51) Int. Cl.
| | |
|---|---|
| *H04L 1/00* | (2006.01) |
| *G06Q 40/00* | (2012.01) |
| *G06Q 10/06* | (2012.01) |
| *G06Q 30/02* | (2012.01) |
| *G06F 16/951* | (2019.01) |

(52) U.S. Cl.
CPC .......... *G06Q 40/12* (2013.12); *G06F 16/951* (2019.01); *G06Q 10/06* (2013.01); *G06Q 10/0631* (2013.01); *G06Q 10/0635* (2013.01); *G06Q 10/0637* (2013.01); *G06Q 10/0639* (2013.01); *G06Q 10/06311* (2013.01); *G06Q 10/06375* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| 3,749,892 A | 7/1973 | Stenning |
| 3,933,305 A | 1/1976 | Murphy |
| (Continued) | | |

FOREIGN PATENT DOCUMENTS

| EP | 0587290 A2 | 3/1994 |
| GB | 2253081 A | 2/1992 |

OTHER PUBLICATIONS

Free Patents Online, "Search results—software layer", Feb. 11, 2009, pp. 1-4, Free Patents Online, USA.
(Continued)

*Primary Examiner* — Thomas L Mansfield
(74) *Attorney, Agent, or Firm* — Brundidge & Stanger, P.C.

(57) ABSTRACT

A computer based media, method and system for developing at least one context frame that summarizes a measure performance situation for one or more levels of one or more organizations, providing applications for managing the measure performance that adapt to the performance situation by using a context frame and a database that automatically captures and incorporates any changes in the measure performance situation.

49 Claims, 16 Drawing Sheets

Related U.S. Application Data continuation of application No. 10/237,021, filed on Sep. 9, 2002, now abandoned.

(60) Provisional application No. 60/522,794, filed on Nov. 8, 2004.

(56) References Cited

U.S. PATENT DOCUMENTS

| | | |
|---|---|---|
| 4,839,304 A | 6/1989 | Roberts et al. |
| 4,989,141 A | 1/1991 | Lyons |
| 5,128,861 A | 7/1992 | Kagami |
| 5,189,011 A | 2/1993 | Itozaki et al. |
| 5,191,522 A | 3/1993 | Bosco et al. |
| 5,193,055 A | 3/1993 | Brown |
| 5,224,034 A | 6/1993 | Katz |
| 5,237,495 A | 8/1993 | Morii |
| 5,237,946 A | 8/1993 | Kagami |
| 5,311,421 A | 5/1994 | Nomura et al. |
| 5,317,504 A | 5/1994 | Nakayama |
| 5,361,201 A | 11/1994 | Jost |
| 5,377,116 A | 12/1994 | Wayne et al. |
| 5,406,477 A | 4/1995 | Harhen |
| 5,414,621 A | 5/1995 | Hough |
| 5,435,565 A | 7/1995 | Benaderet |
| 5,471,611 A | 11/1995 | McGregor |
| 5,542,420 A | 8/1996 | Goldman et al. |
| 5,644,727 A | 7/1997 | Atkins |
| 5,649,181 A | 7/1997 | French et al. |
| 5,668,591 A | 9/1997 | Shintani |
| 5,680,305 A | 10/1997 | Agpar |
| 5,704,045 A | 12/1997 | King et al. |
| 5,704,055 A | 12/1997 | George et al. |
| 5,706,495 A | 1/1998 | Chadha et al. |
| 5,737,581 A | 4/1998 | Keane |
| 5,742,775 A | 4/1998 | King |
| 5,765,154 A | 6/1998 | Horikiri et al. |
| 5,768,475 A | 6/1998 | Godbole et al. |
| 5,774,761 A | 6/1998 | Rai |
| 5,774,873 A | 6/1998 | Berent |
| 5,794,219 A | 8/1998 | Brown |
| 5,802,501 A | 9/1998 | Graff |
| 5,809,282 A | 9/1998 | Cooper |
| 5,812,404 A | 9/1998 | Hamalainen et al. |
| 5,812,988 A | 9/1998 | Sandretto |
| 5,819,237 A | 10/1998 | Garman |
| 5,825,653 A | 10/1998 | Huovila et al. |
| 5,875,431 A | 2/1999 | Heckman et al. |
| 5,889,823 A | 3/1999 | Agazzi et al. |
| 5,933,345 A | 8/1999 | Martin et al. |
| 5,938,594 A | 8/1999 | Poon et al. |
| 5,940,794 A | 8/1999 | Yoshiharu |
| 5,951,300 A | 9/1999 | Brown |
| 5,985,559 A | 11/1999 | Brown |
| 6,014,629 A | 1/2000 | DeBruin-Ashton |
| 6,032,119 A | 2/2000 | Brown et al. |
| 6,064,971 A | 5/2000 | Hartnett |
| 6,064,972 A | 5/2000 | Jankowitz et al. |
| 6,065,003 A | 5/2000 | Sedluk |
| 6,078,901 A | 6/2000 | Ching |
| 6,092,056 A | 7/2000 | Tull, Jr. et al. |
| 6,112,188 A | 8/2000 | Harnett |
| 6,125,355 A | 9/2000 | Bekaert et al. |
| 6,134,536 A | 10/2000 | Shepherd |
| 6,148,293 A | 11/2000 | King |
| 6,173,276 B1 | 1/2001 | Kant |
| 6,189,002 B1 | 2/2001 | Roitblat |
| 6,205,150 B1 | 3/2001 | Ruszczyk |
| 6,207,936 B1 | 3/2001 | de Waard et al. |
| 6,209,124 B1 | 3/2001 | Venmeire et al. |
| 6,219,649 B1 | 4/2001 | Jameson |
| 6,221,009 B1 | 4/2001 | Doi et al. |
| 6,249,784 B1 | 5/2001 | Macke et al. |
| 6,249,282 B1 | 6/2001 | Sutcliffe et al. |
| 6,263,314 B1 | 7/2001 | Donner |
| 6,278,899 B1 | 8/2001 | Piche et al. |
| 6,278,981 B1 | 8/2001 | Dembo et al. |
| 6,282,531 B1 | 8/2001 | Haughton et al. |
| 6,301,584 B1 | 10/2001 | Ranger |
| 6,315,735 B1 | 11/2001 | Joeken et al. |
| 6,327,590 B1 | 12/2001 | Chidlovski et al. |
| 6,332,163 B1 | 12/2001 | Bowman-Amuah |
| 6,366,934 B1 | 4/2002 | Cheng et al. |
| 6,375,469 B1 | 4/2002 | Brown |
| 6,418,448 B1 | 7/2002 | Sarkar |
| 6,487,459 B1 | 11/2002 | Martin et al. |
| 6,490,579 B1 | 12/2002 | Gao et al. |
| 6,499,843 B1 | 12/2002 | Cox et al. |
| 6,510,430 B1 | 1/2003 | Oberwager et al. |
| 6,518,069 B1 | 2/2003 | Otvos et al. |
| 6,564,213 B1 | 5/2003 | Ortega et al. |
| 6,576,471 B2 | 6/2003 | Otvos |
| 6,584,507 B1 | 6/2003 | Bradley et al. |
| 6,612,986 B2 | 9/2003 | Doi et al. |
| 6,625,577 B1 | 9/2003 | Jameson |
| 6,633,865 B1 | 10/2003 | Liao |
| 6,645,124 B1 | 11/2003 | Clem |
| 6,654,289 B2 | 11/2003 | Brunheroto et al. |
| 6,654,389 B1 | 11/2003 | Brunheroto |
| 6,654,469 B1 | 11/2003 | Nelson et al. |
| 6,654,649 B2 | 11/2003 | Treiber et al. |
| 6,684,204 B1 | 1/2004 | Lal |
| 6,695,795 B2 | 2/2004 | Knoll |
| 6,700,923 B1 | 3/2004 | Dowling et al. |
| 6,732,095 B1 | 5/2004 | Warshavsky et al. |
| 6,735,483 B2 | 5/2004 | Martin et al. |
| 6,738,677 B2 | 5/2004 | Martin et al. |
| 6,738,753 B1 | 5/2004 | Hogan |
| 6,745,114 B2 | 6/2004 | Elgin |
| 6,757,898 B1 | 6/2004 | Ilsen et al. |
| 6,795,811 B1 | 9/2004 | Epstein |
| 6,823,253 B2 | 11/2004 | Brunell |
| 6,826,521 B1 | 11/2004 | Hess et al. |
| 6,826,531 B2 | 11/2004 | Fukada |
| 6,853,998 B2 | 2/2005 | Biebesheimer et al. |
| 6,866,024 B2 | 3/2005 | Rizzoni et al. |
| 6,873,990 B2 | 3/2005 | Oblinger |
| 6,892,155 B2 | 5/2005 | Gee et al. |
| 6,934,931 B2 | 8/2005 | Plumer et al. |
| 6,961,731 B2 | 11/2005 | Holbrook |
| 6,963,867 B2 | 11/2005 | Ford et al. |
| 7,006,939 B2 | 2/2006 | Voorakaranam et al. |
| 7,020,494 B2 | 3/2006 | Spriestersbach et al. |
| 7,039,475 B2 | 5/2006 | Sayyarrodsari et al. |
| 7,047,089 B2 | 5/2006 | Martin et al. |
| 7,050,866 B2 | 5/2006 | Martin et al. |
| 7,091,779 B2 | 8/2006 | Sahlman |
| 7,142,307 B1 | 11/2006 | Stark |
| 7,155,390 B2 | 12/2006 | Fukada |
| 7,155,510 B1 | 12/2006 | Kaplan |
| 7,188,637 B2 | 3/2007 | Dreyer et al. |
| 7,216,121 B2 | 5/2007 | Bachman et al. |
| 7,219,040 B2 | 5/2007 | Renou et al. |
| 7,219,087 B2 | 5/2007 | Panfilov et al. |
| 7,219,105 B2 | 5/2007 | Kummamuru et al. |
| 7,249,007 B1 | 7/2007 | Dutton |
| 7,283,846 B2 | 10/2007 | Spriestersbach et al. |
| 7,299,080 B2 | 11/2007 | Acosta et al. |
| 7,347,365 B2 | 3/2008 | Rowe |
| 7,356,771 B2 | 4/2008 | Paul et al. |
| 7,409,692 B2 | 8/2008 | Ittel et al. |
| 7,426,423 B2 | 9/2008 | Schneider et al. |
| 7,474,960 B1 | 1/2009 | Nesbitt |
| 7,519,566 B2 | 4/2009 | Prigogin et al. |
| 7,542,932 B2 | 6/2009 | Chalermkraivuth et al. |
| 7,561,158 B2 | 7/2009 | Abe et al. |
| 7,565,517 B1 | 7/2009 | Arbon |
| 7,599,870 B2 | 10/2009 | Merkoulovitch et al. |
| 7,603,112 B2 | 10/2009 | Huomo et al. |
| 7,617,142 B2 | 11/2009 | Markov et al. |
| 7,617,165 B2 | 11/2009 | Werner |
| 7,644,047 B2 | 1/2010 | Assadian et al. |
| 7,702,615 B1 | 4/2010 | DeLurgio et al. |
| 7,716,278 B2 | 5/2010 | Beringer et al. |
| 7,716,333 B2 | 5/2010 | Bowman-Amuah |

(56) References Cited

U.S. PATENT DOCUMENTS

| | | | |
|---|---|---|---|
| 7,725,374 B2 | 5/2010 | Van Erlach et al. |
| 7,769,684 B2 | 8/2010 | Del Bianco et al. |
| 7,774,179 B2 | 8/2010 | Guirguis |
| 7,788,195 B1 | 8/2010 | Subramanian et al. |
| 7,799,761 B2 | 9/2010 | Fein |
| 7,827,557 B2 | 11/2010 | Zhu et al. |
| 7,881,956 B2 | 2/2011 | Kenyon et al. |
| 7,899,695 B2 | 3/2011 | Kenyon et al. |
| 7,899,723 B2 | 3/2011 | Ostergard et al. |
| 7,912,769 B2 | 3/2011 | Ostergard |
| 7,933,863 B2 | 4/2011 | Werner et al. |
| 2001/0009590 A1 | 7/2001 | Holm |
| 2001/0013006 A1 | 8/2001 | Brown |
| 2001/0034628 A1 | 10/2001 | Eder |
| 2001/0034686 A1 | 10/2001 | Eder |
| 2001/0041995 A1 | 11/2001 | Eder |
| 2001/0041996 A1 | 11/2001 | Eder |
| 2002/0002520 A1 | 1/2002 | Gatto |
| 2002/0016758 A1 | 1/2002 | Gatto |
| 2002/0023034 A1 | 2/2002 | Brown et al. |
| 2002/0033753 A1 | 3/2002 | Imbo |
| 2002/0046143 A1 | 4/2002 | Eder |
| 2002/0048755 A1 | 4/2002 | Cohen |
| 2002/0052820 A1 | 5/2002 | Gatto |
| 2002/0083025 A1 | 6/2002 | Robarts et al. |
| 2002/0087532 A1 | 7/2002 | Barritz et al. |
| 2002/0087535 A1 | 7/2002 | Kotcheff et al. |
| 2002/0097245 A1 | 7/2002 | Jeong et al. |
| 2002/0103789 A1 | 8/2002 | Turnbull et al. |
| 2002/0107843 A1 | 8/2002 | Biebesheimer et al. |
| 2002/0107852 A1 | 8/2002 | Oblinger |
| 2002/0147880 A1 | 10/2002 | Wang Baldondo |
| 2002/0152222 A1 | 10/2002 | Holbrook |
| 2002/0169759 A1 | 11/2002 | Kraft et al. |
| 2003/0018961 A1 | 1/2003 | Ogasawara |
| 2003/0028267 A1 | 2/2003 | Hales et al. |
| 2003/0036873 A1 | 2/2003 | Bauhahn et al. |
| 2003/0037043 A1 | 2/2003 | Chang et al. |
| 2003/0040900 A1 | 2/2003 | D'Agostini |
| 2003/0046130 A1 | 3/2003 | Golightly et al. |
| 2003/0083973 A1 | 5/2003 | Horsfall |
| 2003/0115090 A1 | 6/2003 | Mujtaba et al. |
| 2003/0120433 A1 | 6/2003 | Yokota et al. |
| 2003/0182394 A1* | 9/2003 | Ryngler ............ G01C 21/3629 709/217 |
| 2003/0217097 A1 | 11/2003 | Eitel |
| 2003/0233310 A1 | 12/2003 | Stavrovski |
| 2004/0015906 A1 | 1/2004 | Goraya |
| 2004/0078220 A1 | 4/2004 | Jackson |
| 2004/0083101 A1 | 4/2004 | Brown et al. |
| 2004/0088239 A1 | 5/2004 | Eder |
| 2004/0100494 A1 | 5/2004 | Ragoler et al. |
| 2004/0107181 A1 | 6/2004 | Rodden |
| 2004/0124742 A1 | 7/2004 | Takemura et al. |
| 2004/0139106 A1 | 7/2004 | Bachman et al. |
| 2004/0193019 A1 | 9/2004 | Wei |
| 2004/0193503 A1 | 9/2004 | Eder |
| 2004/0193894 A1 | 9/2004 | Chaudhari et al. |
| 2004/0194099 A1 | 9/2004 | Lamping et al. |
| 2004/0199445 A1 | 10/2004 | Eder |
| 2004/0215495 A1 | 10/2004 | Eder |
| 2004/0215522 A1 | 10/2004 | Eder |
| 2004/0225629 A1 | 11/2004 | Eder |
| 2004/0236621 A1 | 11/2004 | Eder |
| 2004/0236673 A1 | 11/2004 | Eder |
| 2004/0254932 A1 | 12/2004 | Gupta et al. |
| 2004/0260695 A1 | 12/2004 | Brill |
| 2005/0027507 A1 | 2/2005 | Patrudu |
| 2005/0027652 A1 | 2/2005 | Brown |
| 2005/0038669 A1 | 2/2005 | Sachdeva et al. |
| 2005/0043965 A1 | 2/2005 | Heller et al. |
| 2005/0060311 A1 | 3/2005 | Tong et al. |
| 2005/0071266 A1 | 3/2005 | Eder |
| 2005/0071328 A1 | 3/2005 | Lawrence |
| 2005/0110268 A1 | 5/2005 | Schone |
| 2005/0119900 A1 | 6/2005 | Eder |
| 2005/0119919 A1 | 6/2005 | Eder |
| 2005/0119922 A1 | 6/2005 | Eder |
| 2005/0119959 A1 | 6/2005 | Eder |
| 2005/0144664 A1 | 6/2005 | Smith et al. |
| 2005/0149496 A1 | 7/2005 | Mukherjee et al. |
| 2005/0154711 A1 | 7/2005 | McConnell |
| 2005/0165777 A1 | 7/2005 | Hurst-Hiller |
| 2005/0187920 A1 | 8/2005 | Tenembaum |
| 2005/0193739 A1 | 9/2005 | Brunell et al. |
| 2005/0197994 A1 | 9/2005 | Fujii et al. |
| 2005/0237939 A1 | 10/2005 | Corl et al. |
| 2005/0251468 A1 | 11/2005 | Eder |
| 2006/0059028 A1* | 3/2006 | Eder ................ G06Q 30/0202 705/7.12 |
| 2006/0156310 A1 | 7/2006 | Powers |
| 2007/0022384 A1 | 1/2007 | Abbott et al. |
| 2007/0156677 A1 | 7/2007 | Szabo |

OTHER PUBLICATIONS

Free Patents Online, "Search results—software layer and architecture", Feb. 11, 2009, pp. 1-2, Free Patents online, USA.

Free Patents Online, "Search results—mobile, location, context", Feb. 12, 2009, pp. 1-6, Free Patents Online, USA.

Kifler, Michael, Larsen, Georg, Wu, James; "Logical foundations of object-oriented and frame based languages", Apr. 1993, pp. 1-100, Suny, USA.

Cheverst et al., Experiences of Developing an Deploying a Context-Aware Tourist Guide: The GUIDE Project, MOBICOM 2000, Boston, MA, pp. 20-31.

Maedche et al., SEmantic portAL—The SEAL approach, Mar. 27, 2001, pp. 1-27.

Dey and Abowd, A Conceptual Framework and a Toolkit for Supporting the Rapid Prototyping of Context-Aware Applications, Human-Computer Interaction, vol. 16, 2001, pp. 97-166.

Finkelstein et al., Placing Search in Context: The Concept Revisited, ACM Transactions on Information Systems, vol. 20, No. 1, Jan. 2002, pp. 116-131.

Brown and Jones, Context-aware Retrieval; Exploring a New Environment for Information Filtering, Personal and Ubiquitous Computing, vol. 5, 2001, pp. 253-263.

Lieberman and Selker, Out of context: Computer systems that adapt to, and learn from, context, IBM Systems Journal, vol. 28, Nos. 3&4, 2000, pp. 617-632.

Budzik and Hammond, User Interactions with Everyday Applications as Context for Just-in-time Information Access, ACM 2000, New Orleans, pp. 44-51.

Dey, et al., Towards a Better Understanding of Context and Context-Awareness, Georgia Institute of Technology, 1999, pp. 1-12.

Schmidt et al., There is more to Context than Location, Computers & Graphics 23 (1999), pp. 893-901.

Gauch and Pretschner, Ontology Based Personalized Search, Proceedings of the 11th IEEE Conference on Tools with Artificial Intelligence, Chicago, IL, Nov. 9, 1999-Nov. 11, 1999.

Amini et al., Stochastic Models for Surface Information Extractions in Texts, ICANN 1999; pp. 892-897, p. 893 vol. 2, University of Paris, France.

Theobald and Weikum, The Index-Based XXL Search Engine for Querying XML Data with Relevance Ranking, pp. 477-495, Proceedings of the 8th International Conference on Extending Database Technology: Advances in Database Technology, Mar. 25-27, 2002.

Embley et al., Conceptual-model-based data extraction from mulitple-record Web pages, Data & Knowledge Engineering 31 (1999), pp. 227-251.

Chiang et al., A smart web query method for semantic retrieval of web data, Data & Knowledge Engineering 38 (2001), pp. 63-84.

Amini, M; Zaragoza, H; Gallinari, P.; "Stochastic models for surface information extraction in text"; ICANN 1999, pp. 892-897, vol. 2, University of Paris, France.

Barabasi, Albert-Laszlo, Linked—the new science of networks, Apr. 2002; Perseus.

(56) References Cited

OTHER PUBLICATIONS

Davidow, William; Accounting systems are completely wrong, Jan. 1995, Red Herring.
McTaggert, James; Kontes, Peter and Mankins, Michael; The value imperative, 1994, The Free Press.
Rappaport, Alfred; Creating shareholder value; 1986, The Free Press.
Ritchken, Peter, Options, Theory, Strategy and Applications, 1987, Foresman and Company.
Dixit, Avinash & Pindyck, Robert; Investment under uncertainty; 1994; Princeton University Press.
Garson, David; Interpreting neural connection weights, Apr. 1, 1991, AI Expert.
Wellstead, Stephen; Neural network and fuzzy logic applications in C/C++; 1994; John Wiley & Sons.
Most, Kenneth; Accounting theory; 1977, Grid, Inc.
Hendriksen, Elden, Accounting theory, 1982, Ricahrd D. Irwin.
Kulkarni, Arun; Artificial neural networks for image understanding; Jan. 1, 1994; Van Norstrand Reinhold.
Ward Systems Group; NeuroWindows User Manual; 1993; Wards Systems Group.
Brealey, Richard & Meyers, Stewart; Principles of Corporate Finance; 1991; McGraw Hill.
Faulkner, Terrence; Applying options thinking to R&D valuation; May 1, 1996; Research Technology Manage.
Miller, Merton & Modigliani, Franco; Divided policy, growth and the valuation of shares, Oct. 1, 1961.
Wilson, Albert; Emerging approaches to impaired property valuation, Apr. 1, 1996, Appraisal Journal, V64.
Brown, Gordon T., Free cash flow appraisal, a better way, Apr. 1, 1996, Appraisal Journal, V64, No. 2.
Business Editors & Real Estate Industry Writers, EQK REality Investors I, Apr. 2, 1992, Press Release.
Swad, Randy; Business valuation, applicable standards for CPA's, Sep. 1, 1995, CPA Journal v65, No. 9.
Reilly, Robert; Valuation of intangibles for bankruptcy and reorganization purposes; Aug. 1, 1994; Ohio.
Liebich, Kim; How to value a bank; Aug. 1, 1995; ABA Banking Journal.
Maxson, Mark; Will you get your money's worth?, May 1, 1993, Financial Executive.
Friedman, Richard; Business valuation; calculating it right; Oct. 1, 1994; Practical Accountant.
Mullen, Maggie; How to value intangible; Nov. 1, 1993; Accountancy.
Stewart, Thomas; Trying to grasp the intangible; Oct. 2, 1995 Fortune.
Ourosoff, Alexandria; What the world's top brands are worth; Sep. 1, 1992; Finance World.
Phillips Business Information, Inc.; Five ways to reduce risk with neural networks; Sep. 27, 1993; Credi.
Hirsch, A. Ethan, What's it worth? Dec. 21, 1992, Accounting Today, v6, No. 24, p. 16.
Harold, Elliotte, XML Bible, IDG Books 1999.
Knight, James, Value Based Management, McGraw Hill, 1998.
NeuroSolutions, Applications Summaries, Apr. 24, 1999.
Dijk, Context and Cognition: Knowledge Frames and Speech Comprehension, Journal of Pragmatics, vol. 1, Issue 3, Sep. 1977, pp. 211-231.
Retta, Yehdega, Office Action for U.S. Appl. No. 09/761,671, dated Nov. 18, 2004, pp. 1-7, U.S.P.T.O, USA.
Myers, Stewart & Howe, Christopher; A life-cycle financial model of Pharmaceutical R&D; Apr. 1, 1997; MIT.
Simon, Carol J. & Sullivan, Mary W.; The Measurement and Determinants of Brand Equity; Oct. 1, 1993; Ma.
Sveiby, Karl Erik & Mellander, Klas; Tango Learning Guide Version 2.1; 1994; Celemi.
Kaufman, J. Jerry; Value Management; 1998; Crisp.
HBS Press; Measuring Corporate Performance; 1998; HBS Press.
Kaplan, Robert & Norton, David; The Balanced Scorecard; 1996; HBS Press.
Morris, Henry; Extending the Business Process, Oct. 6, 1998; IDC Presentation.
Bouquet, Paolo; Searafini, Luciano, et al.; Modeling and Using Context—Context 99, Sep. 1999, Springer.
Akman, Varol; Bouquet, Paolo, et al.; Modeling and Using Context—Context 2001, Jul. 2001, Springer.
Blackburn, Patrick; Ghidini Chiara, et al.; Modeling and Using Context—Contact 2003, Jun. 2003, Springer.
Franke, Jurgen; Hardle, Wolfgang, et al.; Measuring Risk in Complex Stochastic Systems; 2000, Springer.
Shimpi, Prakash, Integrading Corporate Risk Management, Oct. 1999, Swiss Re New Markets.
Brewka, Gerhard, Principles of Knowledge Representation, 1996, CSLI Publications.
Reiter, Raymond, Knowledge in Action, 2001, MIT Press.
Tissen, Rene; Andriessen, Daniel, et al.; The Knowledge of Dividend, 2000, Prentice Hall.
Rumizen, Melissie Clemmons; The Complete Idiot's Guide to Knowledge Management; 2002, CWL Publishing.
Chappell, David & Jewell, Tyler, Java Web Services; 2002, O'Reilly.
Kluge, Jurgen; Stein, Wolfram, Licht, Thomas; Knowledge Unplugged, 2001, Palgrave.
Conway, Susan & Sligar, Char; Unlocking Knowledge Assets, 2002, Microsoft Press.
Marcus, Robert & Wafters, Beverly; Collective Knowledge, 2002, Microsoft Press.
Hancock, John; Huber, Peter; Koch, Pablo; The economics of insurance, 2001, Swiss Re Press.
Fahy, Martin; Strategic Enterprise management systems, 2001, CIMA.
Shafer, Glenn & Vovk, Vladimir; Probability and Finance, 2001, John Wiley & Sons.
Barua, Anitesh; Lee, C.H. Sophie; Whinston, Andrew; "The Calculus of Reengineering", Aug. 1994.
Hildenbrand, Carol, "Putting two and two together", Darwin, Jan. 2002, p. 51.
Glass, Graham, Web Services, Prentice Hall, 2002.
CIO Insight, "Special Issue: The Alignment Gap", Ziff Davis Media, No. 15, 2002.
Pfeffer, Avi, "A Bayesian Language for Cumulative Learning", 2000, AAII.
Clark, Peter, et al., "Knowledge entry as graphical assembly of components", 2001, K-Cap 01.
Blythe, Jim, "An Integrated Enviroment for Knowledge Acquisition", 2001, Intelligent User Interface.
Quinn, James Brian, Intelligent Enterprise, Free Press, 1992.
Fowler, Martin; Analysis Patterns: Reusable Object Models, 1997, Addison Wesley.
Haesendonckx, Michel, "VBM—Value Driver Tree", Jun. 8, 2005.
Anonymous, "Survey: Too Clever by Half", The Economist, Jan. 24, 2004.
Chambers, Robert; Quiggins, John; "Resource Allocation and Asset Pricing", Nov. 2002.
Widom, Jennifer, "Data Management for XML, Research Directions", IEEE, Jul. 1999.
Maier, David, "Database Desiderata for an XML Query Language"; W3.org, 1998.
Goldfarb, Charles & Prescod, Paul; XML Handbook; Prentice Hall, 1998.
Fowler, Martin; Patterns of Enterprise Application Architecture, Addison-Wesley, 2003.
Dowd, Kevin; Beyond Value at Risk, John Wiley and Sons, 1998.
Koller, Timothy, "What is value based management", McKinsey Quarterly, 1994, No. 3.
Bergstrom, Peter; Kimber, Eliot "Formal dara Models for SGML and HyTime" SGML Mar. 1999, electrum.
Thomas, Team-based Access Control (TMAC): A Primitive for Applying Role-based Access Controls in Collaborative Enviroments, RBAC 1997, p. 13-19.

(56) References Cited

OTHER PUBLICATIONS

Dey et al., A Conceptual Framework and a Toolkit for Supporting the Rapid Prototyping of Context-Aware Applications, Human-Computer Interaction, 2001, vol. 16, p. 97-166.
Lueg, Operationalizing Context in Context-Aware Artifacts: Benefits and Pitfalls, Informing Science, Human Technology Interface, vol. 5, No. 2, 2002, p. 43-47.
Schilit, A System Architecture for Context-Aware Mobile Computing, Columbia University, 1995, p. 1-144.
Ailisto et al. Structuring Context Aware Applications: Five-Layer Model and Example Case, Aug. 19, 2002, p. 1-5.
Fama, Eugene & French, Kenneth, "The Capital Asset Pricing Model: Theory and Evidence", Summer 2004, pp. 25-46, Journal of Economic Perspectives, U.S.A.
Rauenzahn, Rick, "Declaration under Rule 132 for U.S. Appl. No. 10/237,021", filed Sep. 16, 2011, pp. 1-5, USA.
Someren, Maarten, Verdeneus, Floor; "Introducing inductive methods in knowledge acquisition by divide-and-conquer", 1998, pp. 20-28, AAAI, USA.
Geman, Stuart, Bienenstock, Elie; "Neural networks and the bias/variance dilemma", 1992, Neural Computation, pp. 1-58, MIT, USA.
Schuurmans, Dale; "A new metric based approach to model selection", 1997, pp. 1-7, AAAI National Conference Proceedings, AAAI, USA.
Kohavi, Ron, "Wrappers for feature subset selection", 1997, Artificial Intelligence, pp. 273-324, Elsevier, Holland.
Mitchell, Tom, "Machine Learning", 1997, pp. 1-414, McGraw Hill, USA.
Michalski, Ryzard, "A theory and methodology of inductive learning", 1982, pp. 111-161, Tioga Publishing, USA.
Piramuthu, Selwyn, et al., "Using Feature Construction to Improve the Performance of Neural Networks", 1998, pp. 416-430, Management Science, USA.
Kohavi, Ron; "Wrappers for performance enhancement and oblivious decision graphs"; 1995, pp. 1-302, Stanford University, USA.
Kira, Kenji, Rendell, Larry, "The feature selection problem, traditional methods and a new algorithm", 1992, pp. 129-134, Learning Inductive, AAAI, USA.
Jordan, Michael, Jacobs, Robert; "Hierarchical Mixtures of Experts and the EM Algorithm", 1993, pp. 1-30, MIT, USA.
Mandato et al., CAMP: A Context-Aware Mobile Portal, IEEE Communications Magazine, Jan. 2002, p. 90-97.
Mandato et al., CAMP: A Context-Aware Mobile Portal, IEEE 2000, p. 52-61.
Hsu, William, "Time Series Learning With Probabilistic Networks", 1998, pp. 1-135, University of Illinois, USA.
Englebrecht, Herman, "Efficient decoding of hidden markov models", Sep. 2007, pp. 1-151, University of Stellenbosch, South Africa.
Chen, Peter, "The Entity Relationship Model", Mar. 1976, pp. 9-36, ACM Transactions on Database Systems, USA.
Link, Jonathan, "Addendum to petition for relief for U.S. Appl. No. 11/360,087", Aug. 31, 2011, pp. 1-52, Kilpatrick Townsend, U.S.A.
Hauser, John and Urban, Glen, "Assessment of Attribute importance and consumer utility functions", Journal of Consumer Research, pp. 251-262, Mar. 1979, USA.
Lu, Zhidong, et al., "A robust language independent OCR systems", 1998, pp. 1-9, BBN Technologies, USA.
Rockefeller, R.T., Wets, Roger, "Scenario and policy aggregation in optimization under uncertainty", Mathematics of Operation Research, pp. 119-147, 1991, USA.
Mulvey, John and Andrzej Ruszczynski "A New Scenario Decomposition Method for Large-Scale Stochastic Optimization" Operations Research, vol. 43 (1995), No. 3, pp. 477-490, USA.
Kon, Stanley and Jen, Frank, "The Investment Performance of Mutual Funds", The Journal of Business, vol. 52, No. 2 (Apr. 1979), pp. 263-289, USA.
Ippolito, Richard, On Studies of Mutual Fund Performance, 1962-1991, Financial Analysts Journal, vol. 49, No. 1 (Jan.-Feb. 1993), pp. 42-50, USA.
Treynor, Jack and Mazuy, Kay, "Can Mutual Funds Outguess the Market?", Harvard Business Review, Jul.-Aug. 1996, pp. 131-136, USA.
Viterbi, Andrew, "Error Bounds for Convolutional Codes", IEEE Transactions on Information Theory, Apr. 1967, pp. 260-269, USA.
Expert, Economic, "Viterbi Algorithm", www.economicexpert.com, Jul. 19, 2011, pp. 1-2, USA.
Rabiner, Lawrence, "A Tutorial on Hidden Markov Models and Selected Applications in Speech Recognition", Proceedings of the IEEE, Feb. 1989, pp. 257-286, USA.
Forney, David, "The Viterbi Algorithm", proceedings of the IEEE, Mar. 1973, pp. 268-278, USA.
Hauser, John and Urban, Glen, "Assessment of attribute importances and consumer utility functions", Journal of Consumer Research, pp. 251-262, Mar. 1979, USA.
Schulze, Mark; "Linear Programming for Optimization", 1998, pp. 1-8, Perceptive Scientific Instruments, USA.
Smith, Cole, et al., "A Tutorial Guide to Mixed-Integer Programming Models and Solution Techniques", 2007, pp. 1-23, University of Florida, USA.
Heching, Aliza and King, Alan; "Financial Engineering"; Operations research and management science handbook, pp. 21-37, 2008, CRC Press, USA.
Link, Jonathan, "Addendum to petition for relief for U.S. Appl. No. 11/360,087", filed Mar. 1, 2011, pp. 1-10, Kilpatrick Townsend, U.S.A.
Eppen, Gary; Martin R.; Schrage, Linus, "A Scenario Approach to Capacity Planning", Operations Research, vol. 37, No. 4, Jul. 1989, pp. 517-527.
Stein, Jeremy, et al., "A compariable approach to measuring cash flow at risk for non financial firms", Journal of Applied Corporate Finance, Winter 2001, pp. 100-109.
Hodder, J., "Financial Market Approaches to Facility Location under Uncertainty", Operations Research, vol. 32, pp. 1374-1380, 1984.
Hodder, J., et al., "A Simple Plant-Location Model for Quantity Setting Firms Subject to Price Uncertainty", European Journal of Operational Research; Amsterdam, vol. 21, pp. 39-46, 1985.
Bradley, Stepehen; Hax, Arnoldo; Magnanti, Thomas; "Applied Mathematical Programming", pp. 227-271, 1977, Addison Wesley, USA.
Zomaya, Albert; Kazman, Rick, "Simulated Annealing Techniques," Algorithms and theory of computation handbook, pp. 33-1 to 33-18, 2010, CRC Press, USA.
Morris, Cohen, Fisher, Marshall, Ramchadran, Jaikumar; "Managing International Manufacturing", pp. 67-93, 1989, Elsevier, USA.
Care, Algo; Garatti, Simone, et al., "Data-driven optimization through the scenario approach", pp. 1-12, Sep. 2010, University of Brescia, Italy.
Jensen, Paul and Bard, Jonathan, Operations Research Models and Methods, pp. A1-A6, John Wiley and Sons, 2003.
Owens, Terry J; Lorin, Hubert C; and Felling, Anton, "Decision on Appeal 2009-012839, U.S. Appl. No. 09/688,983"; Mar. 16, 2011; pp. 1-18, U.S.P.T.O., USA.
Link, Jonathan, "Petition for relief for U.S. Appl. No. 11/360,087", Jan. 7, 2011, pp. 1-89, Kilpatrick Townsend, U.S.A.
Simensky, Melvin & Bryer, Lanning; The new role of intellectual property in commercial transactions, Sep. 5, 1994.
Baumann, Barbara, H. & Oxaal, Marjorie, R.; Estimating the value of a group medical practice, a primer, Dec. 1993.
Lippitt, Jeffrey & Mastracchio, Nicholas; Developing capitalization rates for valuing a business, 11, Nov. 1995.
Amir, Eli & Lev, Baruch; "Value-relevance of non-financial information", Journal of Accounting, Jun. 1996.
Ernst & Young, Measures that Matter, 1997.
Upton, Wayne; "Special Report: Business and Financial Reporting, Challenges of the New Economy," FAS, Apr. 2001.
Kuehne, Sven, et al., "SEQL: Category learning as progressive abstraction using structure mapping", 2, Sep. 2000.
Brown, John Seely, et al., Loosening up: How process networks unlock the power of specialization, 20, May 31, 2002.
Caouette, John; Altman, Edward & Narayanan, Paul; Managing Credit Risk, John Wiley and Sons, Inc. Nov 3, 1998.

(56) References Cited

OTHER PUBLICATIONS

Brown, Carol; Coakley, James; Phillips, Mary Ellen, "Neural Networks Enter World of Mgmt Accounting" May 1995.
Bielinski, Daniel, "How to sort out the premium drivers of post deal value", Mergers & Acquisitions, Jul./Aug. 1993.
Brown, Carolyn; Phillips, Mary Ellen, Expert Systems for Management Accounting Tasks, IMA Foundation, 1995.

* cited by examiner

CONTEXT SEARCH SYSTEM

CROSS-REFERENCE TO RELATED APPLICATIONS

This application is a continuation under 35 U.S.C. § 120 of U.S. patent application Ser. No. 11/262,146, filed on Oct. 28, 2005, which claims priority from U.S. Provisional Patent application No. 60/522,794, filed on Nov. 8, 2004, which is also a continuation of U.S. patent application Ser. No. 10/237,021, filed Sep. 9, 2002, and also related to U.S. Pat. No. 7,039,654 issued May 2, 2006. The disclosures of all applications are hereby incorporated herein by reference in their entireties.

BACKGROUND OF THE INVENTION

This invention relates to a computer based method of and system for context search for an organization, organization combination or subset of an organization including an individual, a team or a division.

SUMMARY OF THE INVENTION

It is a general object of the present invention to provide a novel, useful system that develops, analyzes, stores and applies complete context information for use in searching, sorting and displaying data, information and/or knowledge for any organization, organization combination or subset of an organization including an individual, a team or a division with one or more quantifiable missions. For simplicity, we will refer to the collection of different subsets of an organization that can be supported by the system for knowledge based performance management as organization levels.

A critical first step in defining a new approach is to clearly define the terms: data, information, context and knowledge. Data is anything that is recorded. This includes records saved in a digital format and data stored using other means. A subset of the digital data is structured data such as transaction data and data stored in a database for automated retrieval. Data that is not structured is unstructured data. Unstructured data includes data stored in a digital format and data stored in some other format (i.e. paper, microfilm, etc.). Information is data plus context of unknown completeness. Knowledge is data plus complete context. Complete context is defined as: all the information relevant to the decision being made using the data at a specific time. If a decision maker has data and the complete context, then providing additional data or information that is available at the time the decision is being made will not change the decision that was made. If additional data or information changes the decision, then the decision maker had "partial context".

We will use an example to illustrate the difference between data, partial context, complete context and knowledge. The example is shown in Table 1 and Table 2.

TABLE 1

Data: We received a check for $6,000 from Acme Tool today.
Partial Context: Acme Tool owed our division $36,000 and promised to pay the entire balance due last week. We are due to ship them another 100 widgets next Tuesday, since we have only 50 in the warehouse we need to start production by Friday if we are going to meet the promised date.
Decision based on data + partial context: Stop production and have customer service put a credit hold flag on their account, then have someone call them to find out what their problem is.

TABLE 2

Data: We received a check for $6,000 from Acme Tool today.
Complete context: Acme Tool owed our division $36,000 and promised to pay the entire balance due last week. We are due to ship them another 100 widgets next Tuesday, since we have only 50 in the warehouse we need to start production by Friday if we are going to meet the promised date. Acme is a key supplier for Project X in the international division. The international division owes Acme over $75,000. They expected to pay Acme last week but they are late in paying because they have had some problems with their new e.r.p. system. Netting it all out, our organization actually owes Acme $45,000. We have also learned that our biggest competitor has been trying to get Acme to support their efforts to develop a product like Project X.
Decision based on knowledge (data + complete context): See if there is anything you can do to expedite the widget shipment. Call Acme, thank them for the payment and see if they are OK with us deducting the money they owe us from the money the materials division owes them. If Acme OKs it, then call the international division and ask them to do the paperwork to transfer the money to us so we can close this out.

The example in Tables 1 and 2 illustrates that there is a clear difference between having data with partial context and having knowledge. Data with partial context leads to one decision while data with complete context creates knowledge and leads to another completely different decision. The example also suggests another reason (in addition to not being able to find anything) that so many firms are not realizing the return they expect from their investments in narrow performance management systems. Virtually every information technology system being sold today processes and analyzes data within the narrow silo defined by the portion of the enterprise it supports. As a result, these systems can not provide the complete context required to turn data into knowledge.

Processing in the Knowledge Based Performance Management System is completed in three steps: The first step in the novel method for knowledge based performance management involves using data provided by existing narrow systems and the nine key terms described below to define mission measures for each organization level. As part of this processing data from the world wide web. unstructured data, gee-coded data, and video data are processed and made available for analysis. The automated indexation, extraction, aggregation and analysis of data from the existing, narrow computer-based systems significantly increases the scale and scope of the analyses that can be completed by users. This innovation also promises to significantly extend the life of the narrow systems that would otherwise become obsolete. The system of the present invention is capable of processing data from the "narrow" systems listed in Table 3.

TABLE 3

1. Accounting systems;
2. Alliance management systems;
3. Asset management systems;
4. Brand management systems;
5. Budgeting/financial planning systems;
6. Business intelligence systems;
7. Call management systems;
8. Cash management systems;
9. Channel management systems;
10. Commodity risk management systems;
11. Content management systems;
12. Contract management systems;
13. Credit-risk management system
14. Customer relationship management systems;

TABLE 3-continued

15. Data integration systems;
16. Demand chain systems;
17. Decision support systems;
18. Document management systems;
19. Email management systems;
20. Employee relationship management systems;
21. Energy risk management systems;
22. Executive dashboard systems;
23. Expense report processing systems;
24. Fleet management systems;
25. Fraud management systems;
26. Freight management systems;
27. Human capital management systems;
28. Human resource management systems;
29. Incentive management systems;
30. Innovation management systems;
31. Insurance management systems;
32. Intellectual property management systems;
33. Intelligent storage systems
34. Interest rate risk management systems;
35. Investor relationship management systems;
36. Knowledge management systems;
37. Learning management systems;
38. Location management systems;
39. Maintenance management systems;
40. Material requirement planning systems;
41. Metrics creation system
42. Online analytical processing systems;
43. Ontology management systems;
44. Partner relationship management systems;
45. Payroll systems;
46. Performance management systems; (for IT assets)
47. Price optimization systems;
48. Private exchanges
49. Process management systems;
50. Product life-cycle management systems;
51. Project management systems;
52. Project portfolio management systems;
53. Revenue management systems;
54. Risk management information system
55. Risk simulation systems;
56. Sales force automation systems;
57. Scorecard systems;
58. Sensor grid systems;
59. Service management systems;
60. Six-sigma quality management systems;
61. Strategic planning systems;
62. Supply chain systems;
63. Supplier relationship management systems;
64. Support chain systems;
65. Taxonomy development systems;
66. Technology chain systems;
67. Unstructured data management systems;
68. Visitor (web site) relationship management systems;
69. Weather risk management systems;
70. Workforce management systems; and
71. Yield management systems The quantitative mission measures that are initially created using the extracted narrow system data from each organization can take any form (please note: a new organization could use the Entity Context System to generate the information required to create mission measures without the use of narrow system data). For many of the lower organization levels (combinations being the highest level and an element being the lowest organization level) the mission measures are simple statistics like percentage achieving a certain score, average time to completion and the ratio of successful applicants versus failures. At higher levels more complicated mission measures are generally used. For example, Table 5 shows a three part mission measure for a medical organization mission—patient health, patient longevity and financial break even. As discussed in the cross-referenced patent application Ser. No. 10/071,164 filed Feb. 7, 2002; Ser. No. 10/1?4,240 filed Apr. 18, 2002 and Ser. No. 10/124,327 filed Apr. 18, 2002, commercial businesses that are publicly traded generally require five risk adjusted measures per enterprise—a current operation measure, a real option measure, an investment measure, a derivatives measure and a market sentiment measure. The system of the present invention will support the use of each of the five measures described in the cross referenced patent applications in an automated fashion. Also, as described in the cross-referenced patent applications (Ser. No. 10/124,240 filed Apr. 18, 2002 and Ser. No. 10/124,327 filed Apr. 18, 2002) the total risk associated with these five measures equals the risk associated with equity in the organization. The Entity Context System will also support the automated definition of other mission measures including: each of the different types of event risks alone or in combination, each of the different types of factor risks alone or in combination, cash flow return on investment, accounting profit, and economic profit.

The system of the present invention provides several other important advances over the systems described in these cross-referenced applications, including:

1. the same performance management system can be used to manage performance for all organization levels;
2. the user is free to specify more than five mission measures for every organization level;
3. the user can assign a weighting to each of the different mission measures which is different than the risk adjusted value measure; and
4. the user is free to specify mission measures that are different than the ones described in the prior cross-referenced patent applications.

After the user defines the mission measures and the data available for processing is identified, processing advances to second stage of processing where mission-oriented context layers for each organization level are developed and stored in a ContextBase (60). In the final processing step the context layers and organization levels are combined as required to develop context frames for use in analyzing, forecasting, planning, reviewing and/or optimizing performance using Complete Context™ Systems (601, 602, 603, 604, 605, 606, 607 and 608) and closing the loop with any remaining narrow systems as required to support Knowledge Based Performance Management.

The system of the present invention is the first known system with the ability to systematically develop the context required to support the comprehensive analysis of mission performance and turn data into knowledge. Before completing the summary of system processing, we will provide more background regarding mission-oriented context, context layers and the Complete Context™ Systems (601, 602, 603, 604, 605, 606, 607 and 608).

The complete context for evaluating a mission performance situation can contain up to six distinct types of information:

1. Information that defines the physical context, i.e. we have 50 good widgets in the warehouse available for shipment. If we need to make more, we need to use the automated lathe and we need to start production 2 days before we need to ship;
2. Information that defines the tactical (aka administrative) context, i.e. we need to ship 100 widgets to Acme by Tuesday;
3. Information that defines the instant impact, i.e. Acme owes us $30,000 and the price per widget is $100 and the cost of manufacturing widgets is $80 so we make $20 profit per unit (for most businesses this could be defined as the short term economic context).

4. Information that defines the organizational context, i.e. Acme is also a key supplier for the new product line, Project X, that is expected to double our revenue over the next five years;
5. Information that defines the mission impact, i.e. Acme is one of our most valuable customers and they are a key supplier to the international division, and
6. Information that defines the social environment, i.e. our biggest competitor is trying to form a relationship with Acme.

We will refer to each different type of information as a context layer. Different combinations of context layers from different organization levels and/or organizations are relevant to different decisions. Each different combination of context layers, organization levels and organizations is called a context frame.

The ability to rapidly create context frames can be used to rapidly analyze a number of different operating scenarios including an alliance with another organization or a joint exercise between two organizations. For example, combined context frames could be created to support the Army and the Air Force in analyzing the short and long term implications of a joint exercise as shown in Table 4. It is worth noting at this point that the development of a combination frame is most effective when the two organizations share the same mission measures.

TABLE 4

| Context Frame Description | Combines These Layers | From These Organizations |
| --- | --- | --- |
| JV short term | Physical, Tactical & Instant | Army and Air Force |
| JV strategic | Physical, Tactical, Instant, Organization, Mission & Social Environment | Army and Air Force |

Using the context frames from the combined organizations to guide both tactical (short-term) and strategic analysis and decision making would allow each organization to develop plans for achieving a common goal from the same perspective (or context) while still maintaining independence. This capability provides a distinct advantage over traditional analytical applications that generally only consider the first three layers of context when optimizing resource allocations. In taking this approach, traditional analytic systems analyze and optimize the instant (short-term) impact given the physical status and the tactical situation. Because these systems generally ignore organization, mission and environmental contexts (and some aspects of instant impact), the recommendations they make are often at odds with common sense decisions made by line managers that have a more complete context for evaluating the same data. This deficiency is one reason many have noted that "there is no intelligence in business intelligence applications".

Before moving on to better define context, it is important to re-emphasize the fact that the six layers of context we have defined can also be used to support performance management, analysis and decision making in areas other than commercial business. In fact, the system of the present invention will measure and help manage performance for any organization or group with a quantifiable mission. For example, Table 5 illustrates the use of the six layers in analyzing a sample business context and a sample medical context.

TABLE 5

| Business (shareholder value maximization mission) | Medical (patient health & longevity, financial break even missions) |
| --- | --- |
| Social Environment: competitor is trying to form a relationship with Acme | Social Environment: malpractice insurance is increasingly costly |
| Mission: Acme is a valuable customer and a key supplier, relationship damage will decrease returns and increase risk | Mission: treatment in first week improves 5 year survival 18%, 5 year reoccurrence rate is 7% higher for procedure A |
| Organization: Acme supports project X in international division | Organization: Dr. X has a commitment to assist on another procedure Monday |
| Instant: we will receive $20 profit per unit | Instant: survival rate is 99% for procedure A and 98% for procedure B |
| Tactical: need 100 widgets by Tuesday for Acme, need to start production Friday | Tactical: patient should be treated next week, his insurance will cover operation |
| Physical: 50 widgets in inventory, automated lathe is available Friday | Physical: operating room A has the right equipment and is available Monday, Dr. X could be available Monday |

Our next step in completing the background information is to define each context layer in more detail. Before we can do this we need to define nine key terms: mission, element, resource, asset, agent, action, commitment, priority and factor, that we will use in the defining the layers.
1. Mission—purpose of organization translated into one or more mission measures—examples: market value, patient survival rate, and production efficiency;
2. Element—something of value (note value may be negative) that is related to an organization—examples: property, relationships and knowledge;
3. Resource—subset of elements that are routinely transferred to others and/or consumed—examples: raw materials, products, employee time and risks;
4. Asset—subset of elements that support the consumption, production or transfer of resources. They are generally not transferred to others and/or consumed—examples: brands, customer relationships; and equipment;
5. Agent—subset of elements that can participate in an action—examples: customers, suppliers, salespeople.
6. Action—consumption, production, acquisition or transfer of resources that support organization mission—examples: sale of products and development of a new product (actions are a subset of events which include anything that is recorded);
7. Commitment—an obligation to perform an action in the future—example: contract for future sale of products;
8. Priority—relative importance assigned to actions and mission measures; and
9. Factor—conditions external to organization that have an impact on organization performance—examples: commodity prices, weather, earnings expectation.

In some cases agent, element and/or action classes may be defined by an industry organization (such as the ACORD consortium for insurance). If this is the case, then the pre-defined classes are used as a starting point for key term definition. In any event, we will use the nine key terms to define the six context layers shown below.
1. Physical context—information about the physical status, location and performance characteristics of elements;

2. Tactical context—information about completed actions, action procedures, action priorities, commitments and events;
3. Instant context—information about the short-term impact of actions, the short term impact of events and the expected impact of commitments;
4. Organization context—information about the inter-relationship between factors, elements and/or actions (includes process maps and may be action specific);
5. Mission context—information about the impact of elements, factors and actions on mission measures (may be agent specific) and mission measure priorities; and
6. Social Environment context—information about factors in the social environment in which the organization is completing actions (includes market dynamics).

Management can establish alert levels for data within each layer. Management control is defined and applied at the tactical and mission levels by assigning priorities to actions and mission measures. Using this approach the system of the present invention has the ability to analyze and optimize performance using management priorities, historical measures or some combination of the two. It is worth noting at this point that the layers may be combined for ease of use, to facilitate processing or as organizational requirements dictate. We will refer to the first three layers (physical, tactical and instant) as the administrative layers and the last three layers (organization, mission and social environment) as the strategic layers (aka strategic business context layers).

As discussed previously, analytical applications are generally concerned with only the first three (3) context layers (physical, tactical and instant). One reason for this is that the information to define the last three layers of context (organization, mission and social environment—the strategic context layers) are not readily available and must be developed. The Entity Context System (100) develops context in a manner similar to that described previously in cross referenced application: Ser. No. 10/071,164 filed Feb. 7, 2002; Ser. No. 10/124,240 filed Apr. 18, 2002 and Ser. No. 10/124,327 filed Apr. 18, 2002. In one embodiment, the Entity Context System works in tandem with a Business Process Integration Platform to integrate narrow systems into a complete system for performance management. However, in an alternate mode the system would provide the functionality for process integration in the organization tier of the software architecture. In either mode, the system of the present invention supports the development of the strategic context layers and the storage of all six context layers as required to create a mission-oriented ContextBase (60).

The creation of the mission-oriented ContextBase (60) provides several important benefits. One of the key benefits the mission-oriented ContextBase (60) provides is that it allows the system of the present invention to displace the seventy plus narrow systems with seven Complete Context™ Systems (601, 602, 603, 604, 605, 606 and 607) that provide more comprehensive analytical and management capabilities. The seven Complete Context™ Systems (601, 602, 603, 604, 605, 606 and 607) are briefly described below:

1. Complete Context™ Analysis System (602)—analyzes the impact of specified changes on a specific context frame. Software to complete these analyses can reside on the application server with user access through a browser, it can reside in an applet that is activated as required or it can reside on a client computer with the context frame being provided by the Entity Context System as required. Context frame information may be supplemented by simulations and information from subject matter experts as appropriate. Cross referenced U.S. patent application Ser. No. 10/025,794 describes a similar client-side application for asset and process analysis. Cross referenced U.S. patent application Ser. No. 10/036,522 describes a similar client-side application for risk analysis. Cross referenced U.S. patent application Ser. No. 10/166,758 describes a similar client-side application for purchasing analysis. Cross referenced application Ser. Nos. 10/046,316 and 10/124,240 describe a server based system for analyzing a multi-enterprise organization.
2. Complete Context™ Forecast System (603)—forecasts the value of specified variable(s) using data from all relevant context layers. Completes a tournament of forecasts for specified variables and defaults to a multivalent combination of forecasts from the tournament using methods similar to those first described in U.S. Pat. No. 5,615,109. Software to complete these forecasts can reside on the application server with user access through a browser, it can reside in an applet that is activated as required or it can reside on a client computer.
3. Complete Context™ Optimization System (604)—simulates organization performance and identifies the optimal mode for operating a specific context frame. If there is more than one mission measure, the optimization system can use management input or the relative levels or relevance found historically to weight the different measures. Software to complete these simulations and optimizations can reside on the application server with user access through a browser, it can reside in an applet that is activated as required or it can reside on a client computer with the context frame being provided by the Entity Context System as required. Cross referenced U.S. patent application Ser. No. 10/025,794 describes a similar client-side application for asset and process optimization. Cross referenced U.S. patent application Ser. No. 10/036,522 describes a similar client-side application for risk optimization. Cross referenced U.S. patent application Ser. No. 10/166,758 describes a similar client-side application for purchasing optimization. Cross referenced application Ser. Nos. 10/046,316 and 10/124,240 describe a similar server based system for optimizing a multi-enterprise organization.
4. Complete Context™ Planning System (605)—system that management uses to: establish mission measure priorities, establish action priorities, establish expected performance levels (aka budgets) for actions, events, instant impacts and mission measures. These priorities and performance level expectations are saved in the corresponding layer in the ContextBase (60). For example, mission measure priorities are saved in the mission layer table (175). This system also supports collaborative planning when context frames that include one or more partners are created. Software to complete this planning can reside on the application server with user access through a browser, it can reside in an applet that is activated as required or it can reside on a client computer with the context frame being provided by the Entity Context System as required.
5. Complete Context™ Project (606)—system for analyzing and optimizing the impact of a project or a group of projects on a context frame. Software to complete these analyses and optimizations can reside on the application server with user access through a browser, it can reside in an applet that is activated as required or it can reside on a client computer with the context frame being provided by the Entity Context System as required. Context frame information may be supplemented by simulations and information from subject matter experts as appropriate. Cross referenced U.S. patent application Ser. No. 10/012,375 describes a similar client-side application for project analysis and optimization.

6. Complete Context™ Review System (607)—system for reviewing actions, elements, instant impacts and mission measures. This system uses a rules engine to transform ContextBase (60) historical information into standardized reports that have been defined by different organizations. For example the Financial Accounting Standards Board, International Accounting Standards Board and Standard and Pears have each defined standardized reports for reporting combinations of instant impacts, elements and actions for commercial businesses—the income statement, the balance sheet and the cash flow statement. Other standardized, non-financial performance reports have been developed for medical organizations, military operations and educational institutions. The rules engine produces these reports on demand. The software to complete these reports can reside on the application server with user access through a browser, it can reside in an applet that is activated as required or it can reside on a client computer with the context frame being provided by the Entity Context System as required.

7. Complete Context™ Transaction System (601)—system for recording actions and commitments into the ContextBase. The interface for this system is a browser based template that identifies the available physical, tactical, organization and instant impact data for inclusion in an action transaction. After the user has recorded a transaction the system saves the information regarding each action or commitment to the ContextBase (60). Other applications such as Complete Context™ Analysis, Plan or Optimize can interface with this system to generate actions or commitments in an automated fashion.

The Complete Context™ Systems (601, 602, 603, 604, 605, 606 and 607) can be supplemented by a Complete Context™ Search Engine (608) that can help a user (20) locate relevant information using the indices developed by layer in the ContextBase (60). Complete Context™ Frames can also be defined for any collaboration with another group or for any subset of the organization including an individual, a team or a division. The data for these frames can then be made available to the user (20) or managers (21) on a continuous basis using a portal. Each of the seven different systems can be flexibly bundled together in any combination as required to complete the analysis, planning and review required for Knowledge Based Performance Management. For example, the systems for Complete Context™ Review (607), Forecast (603) and Planning (605) Systems are often bundled together. The Complete Context™ Analysis and Optimization Systems are also bundled together in a similar fashion.

The Complete Context™ Systems (hereinafter, referred to as the standard applications) can replace seventy plus narrow systems currently being used because it takes a fundamentally different approach to developing the information required to manage performance. Narrow systems (30) try to develop a picture of how part of the organization is performing. The user (20) is then left to integrate the picture. The Entity Context System (100) develops a complete picture of how the organization is performing, saves it in the ContextBase (60) and then divides this picture and combines it with other pictures as required to provide the detailed information regarding each narrow slice of the organization These details are included in the context frames that are produced using information in the ContextBase (60). The context frames are then mapped to one or more standard applications for analysis and review. Developing the complete picture first, before dividing it and recombining it as required to produce context frames, enables the system of the present invention to reduce IT infrastructure complexity by an order of magnitude while dramatically increasing the ability of each organization to manage performance. The ability to use the same system to manage performance for different organizational levels further magnifies the benefits associated with the simplification enabled by the system of the present invention. Because the ContextBase (60) is continually updated by a "learning system", changes in organization context are automatically captured and incorporated into the processing and analysis completed by the Entity Context System (100).

The mission-centric focus of the ContextBase (60) provides four other important benefits. First, by directly supporting mission success the system of the present invention guarantees that the ContextBase (60) will provide a tangible benefit to the organization. Second, the mission focus allows the system to partition the search space into two areas with different levels of processing. Data that is known to be relevant to the mission and data that is not thought to be relevant to mission. The system does not ignore data that is not known to be relevant, however, it is processed less intensely. Third, the processing completed in ContextBase (60) development defines a complete ontology for the organization. As detailed later, this ontology can be flexibly matched with other ontologies as required to interact with other organizations that have organized their information using a different ontology and extract data from the semantic web in an automated fashion. Finally, the focus on mission also ensures the longevity of the ContextBase (60) as organization missions rarely change. For example, the primary mission of each branch of the military has changed very little over the last 100 years while the assets, agents, resources and the social environment surrounding that mission have obviously changed a great deal. The same can be said for almost every corporation of any size as almost all of them have a shareholder value maximization mission that has not changed from the day they were founded. The difference between the mission-oriented approach and a more generic approach to knowledge management are summarized in Table 6A.

TABLE 6A

| Characteristic/System | Mission-oriented ContextBase (60) | Generic Knowledge |
| --- | --- | --- |
| Tangible benefit | Built in | Unknown |
| Search Space | Partitioned by mission | Un-partitioned |
| Longevity | Equal to mission longevity | Unknown |

Another benefit of the novel system for knowledge based performance management is that it can be used for managing the performance of any entity with a quantifiable mission. It is most powerful when used to manage an organization with different levels and each of these levels are linked together as shown in the following example.

In the example, summarized in Table 68, the Marines are interested in understanding what drove their mission performance in a recent conflict.

TABLE 68

Organizational hierarchy of mission performance drivers

1. Marines find Division A is biggest contributor to mission performance
2. Division A finds Camp Pendleton training is biggest contributor to mission performance
3. Camp Pendleton identifies the Sergeant Mack as biggest contributor to mission performance As shown in Table 68, after using the Entity Context System they were able to determine that Division A made the biggest contribution to their mission measure performance. Divisions A uses the Entity Context System to determine that it was the training they received at Camp Pendleton that made the biggest contribution to their mission measure performance. Camp Pendleton then uses the Entity Context System to identify Sergeant Mack as the biggest contributor to their high level of training mission measure performance.

Using an overall system for evaluating mission performance, each of the three performance drivers: Division A, Camp Pendleton and Sergeant Mack would be identified. However, because their contributions to mission performance are closely inter-related it would be difficult to identify their separate contributions using an overall analysis. A better use of the results from an overall analysis in an environment where there is a hierarchy to performance management is to ensure that there is an alignment between the mission measures at each level. For example, if the Camp Pendleton performance management system had identified Captain Black as the strongest contributor, then the Camp Pendleton system would clearly be out of alignment with the higher level measures that identified Sergeant Mack as the strongest contributor. The Camp Pendleton mission measures would need to be changed to bring their performance management system into alignment with the overall mission. Because efforts to achieve organizational alignment have relied exclusively on management opinion and subjective measures like scorecards, some have concluded that achieving ongoing organizational alignment is "impossible". While it may have been impossible, the innovative system of the present invention provides a mechanism for establishing and maintaining alignment between different levels of a hierarchy for any organization with a quantifiable mission. It also provides a separate mechanism for aligning the operation of every level of the organization in accordance with the priorities established by the management team.

In addition to providing the ability to systematically analyze and improve mission performance, the Entity Context System (100) provides the ability to create robust models of the factors that drive action, event and instant impact levels to vary. This capability is very useful in developing action plans to improve mission measure performance. One of the main reasons for this is that most mission measures relate to the long term impact of actions, events and instant impacts.

To facilitate its use as a tool for improving performance, the system of the present invention produces reports in formats that are graphical and highly intuitive. By combining this capability with the previously described capabilities for: flexibly defining robust performance measures, ensuring organizational alignment, identifying complete context information, reducing IT complexity and facilitating knowledge sharing, the Entity Context System gives executives and managers the tools they need to dramatically improve the performance of any organization with a quantifiable mission.

BRIEF DESCRIPTION OF DRAWINGS

These and other objects, features and advantages of the present invention will be more readily apparent from the following description of one embodiment of the invention in which.

DETAILED DESCRIPTION OF ONE EMBODIMENT

Figure 1:
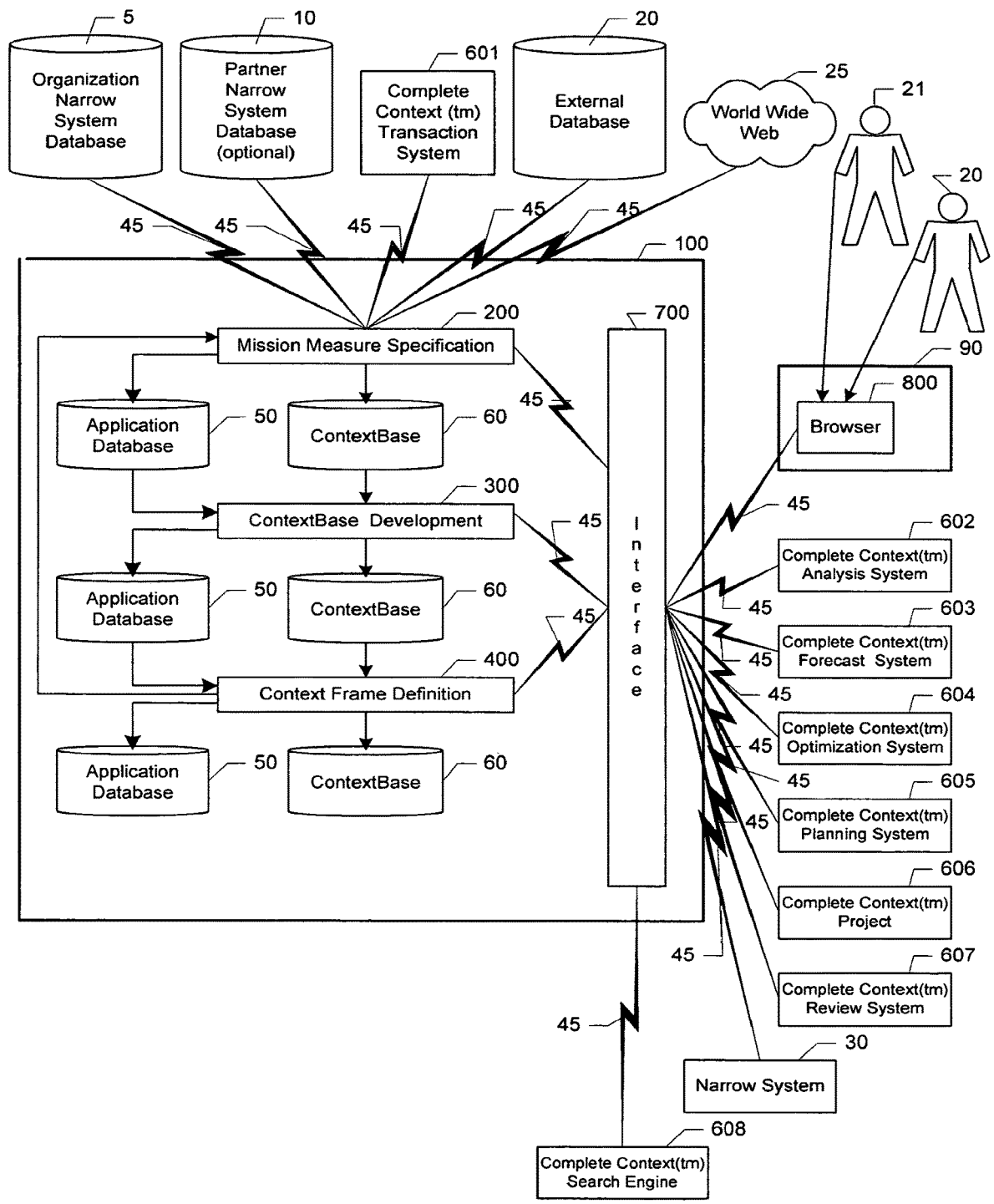
FIG. 1 is a block diagram showing the major processing steps of the present invention.
Figure 2:
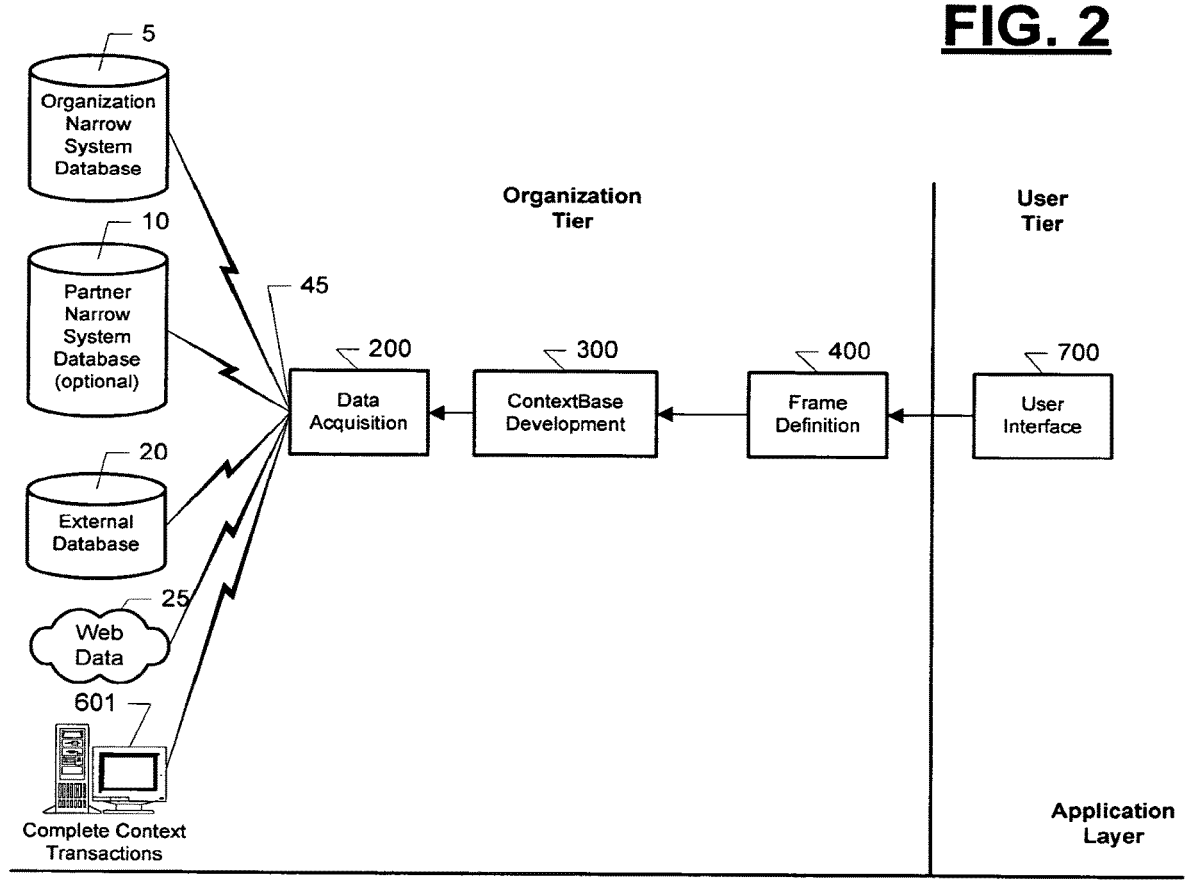
FIG. 2 is a diagrams showing the application layer portion of software architecture of the present invention.

FIG. 1 provides an overview of the processing completed by the innovative system for knowledge based performance management. In accordance with the present invention, an automated system (100) and method for developing a ContextBase (60) that contains the six context layers for each mission measure by organization and organization level is provided. Processing starts in this system (100) when the data extraction portion of the application software (200) extracts data from an organization narrow system database (5); optionally, a partner narrow system database (10); an external database (20); and a world wide web (25) via a network (45). Data may also be obtained from a Complete Context™ Transaction System (601) via the network (45) in this stage of processing. The processing completed by the system (100) may be influenced by a user (20) or a manager (21) through interaction with a user-interface portion of the application software (700) that mediates the display, transmission and receipt of all information to and from a browser software (BOO) such as the Netscape Navigator® or the Microsoft Internet Explorer® in an access device (90) such as a phone, personal digital assistant or personal computer where data are entered by the user (20).

While only one database of each type (5, 10 and 20) is shown in FIG. 1, it is to be understood that the system (100) can process information from all narrow systems listed in Table 3 for each organization being supported. In one embodiment, all functioning narrow systems within each organization will provide data to the system (100) via the network (45). It should also be understood that it is possible to complete a bulk extraction of data from each database (5, 10 and 20) and the World Wide Web (25) via the network (45) using peer to peer networking and data extraction applications. The data extracted in bulk could be stored in a single datamart, a data warehouse or a storage area network where the analysis bets in later stages of processing could operate on the aggregated data. A virtual database could also be used that would leave all data in the original databases where it could be retrieved as needed for calculations by the analysis bots over a network (45).

Figure 3:
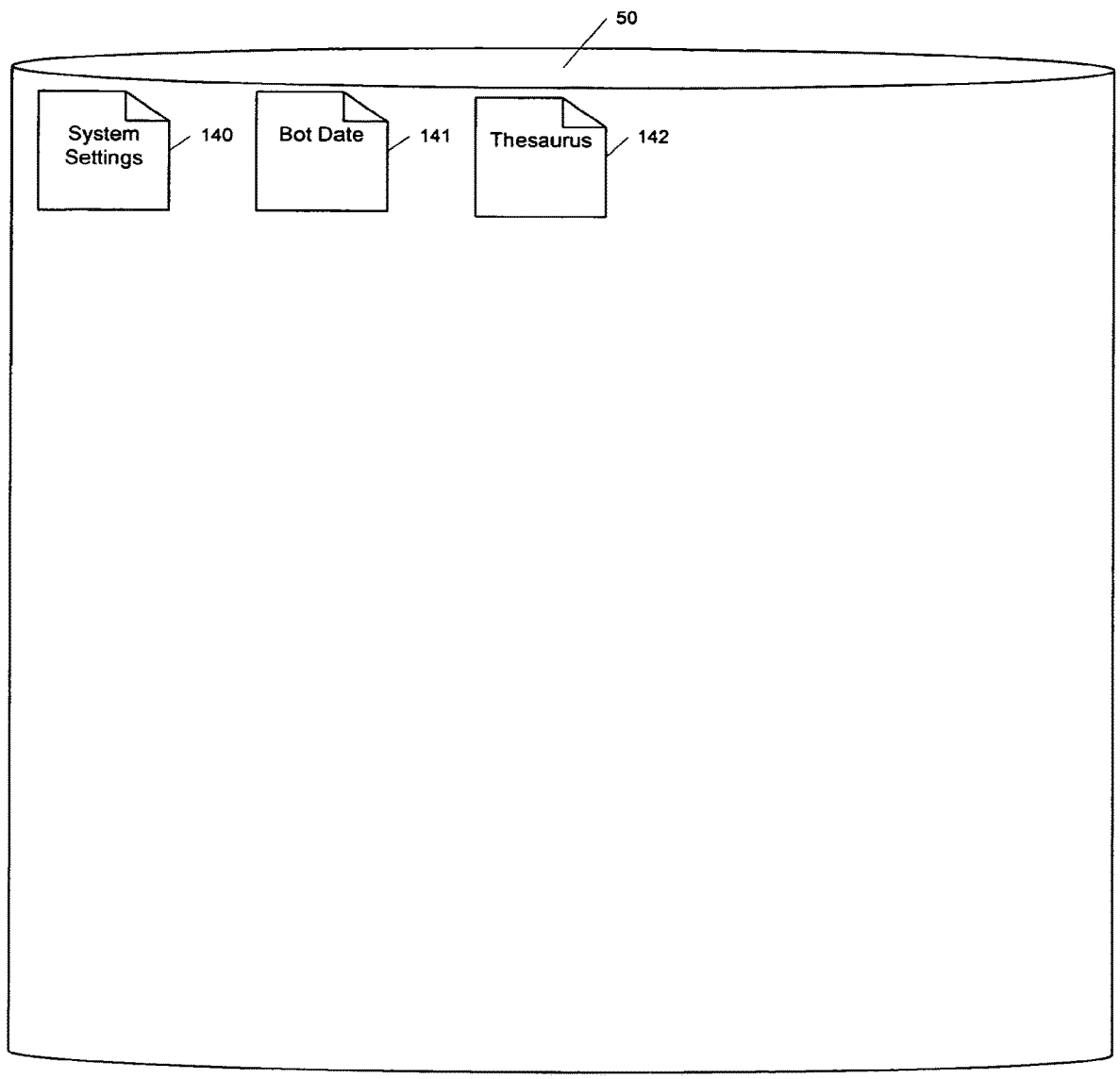
FIG. 3 is a diagram showing the tables in the application database (50) of the present invention that are utilized for data storage and retrieval during the processing in the innovative system for knowledge based performance management.

The operation of the system of the present invention is determined by the options the user (20) and manager (21) specify and store in the application database (50) and the ContextBase (60). As shown in FIG. 3, the application database (50) contains a system settings table (140), a bot date table (141) and a Thesaurus table (142).

Figure 4:
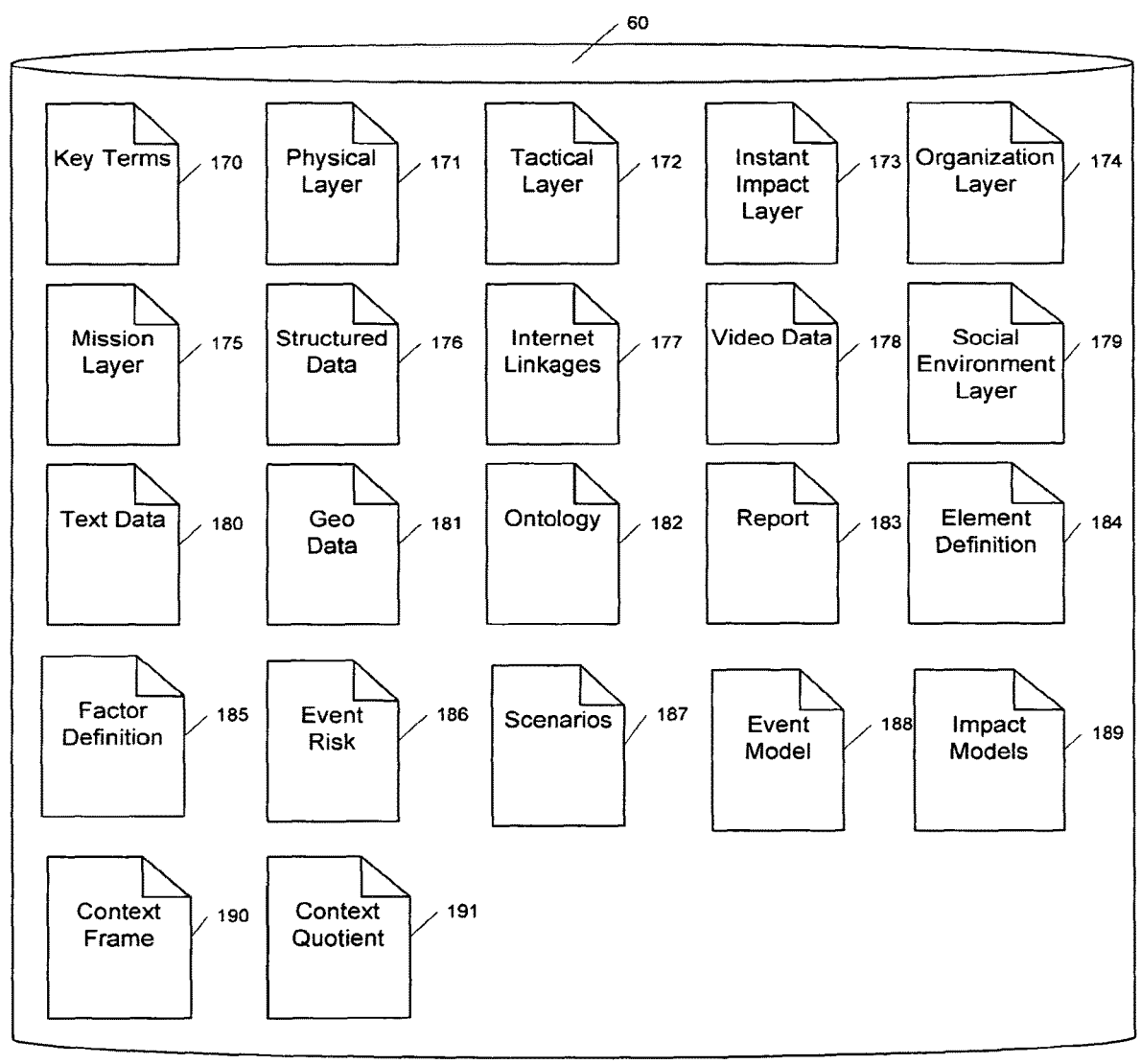
FIG. 4 is a diagram showing the tables in the Context8ase (60) of the present invention that are utilized for data storage and retrieval during the processing in the innovative system for knowledge based performance management.

As shown in FIG. 4, the ContextBase (60) contains tables for storing extracted information by context layer including: a key terms table (170), a physical layer table (171), a tactical layer table (172), an instant impact layer table (173), an organization layer table (174), a mission layer table (175), a structured data table (176), an internet linkage table (177), a video data table (178), a social environment layer table (179), a text data table (180), a geo data table (181), an ontology table (182), a report table (183), an element definition table (184), a factor definition table (185), an event risk table (186), a scenario table (187), an event model table (188), an impact model table (189), a context frame table (190) and a context quotient table (191). The ContextBase (60) can exist as a datamart, data warehouse, a virtual repository or storage area network. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in one embodiment all required information is obtained from the specified data sources (5, 10, 20, 601 and 25) for each organization, organization level and organization partner.

Figure 5:
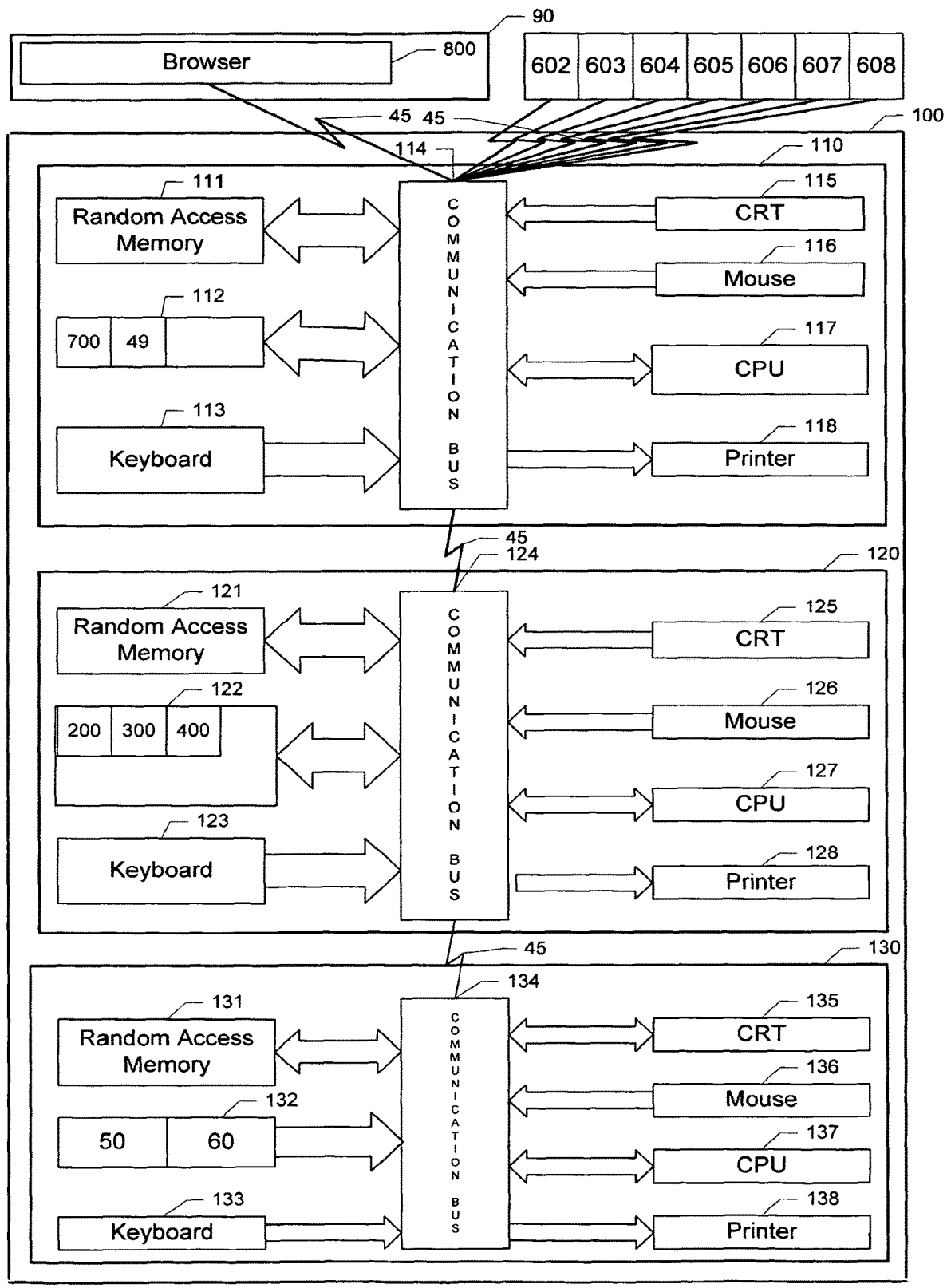
FIG. 5 is a block diagram of an implementation of the present invention.
Figure 6A:
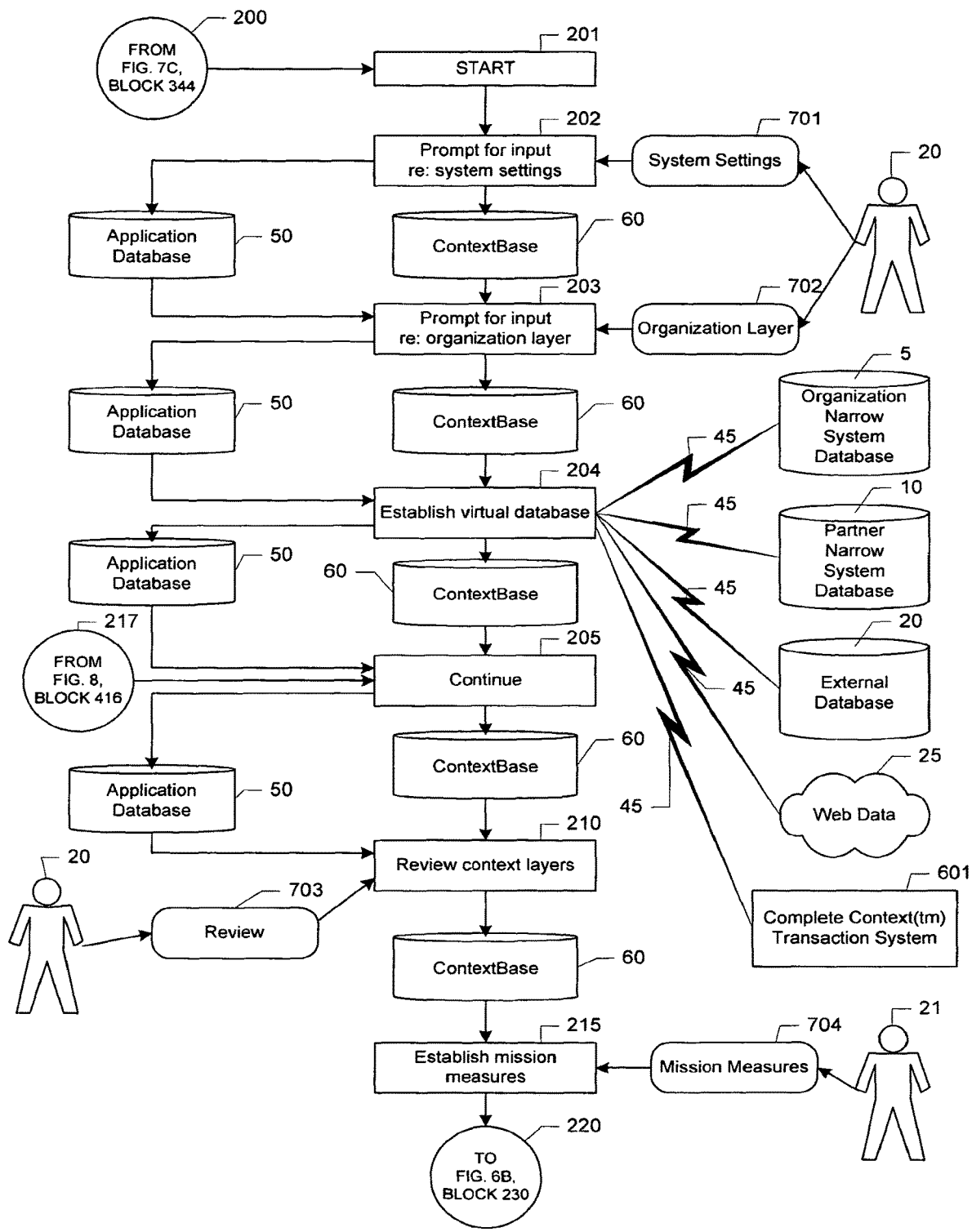
FIG. 6A, FIG. 6B, FIG. 6C and FIG. 6D are block diagrams showing the sequence of steps in the present invention used for specifying system settings, preparing data for processing and defining the mission measures.
Figure 6B:
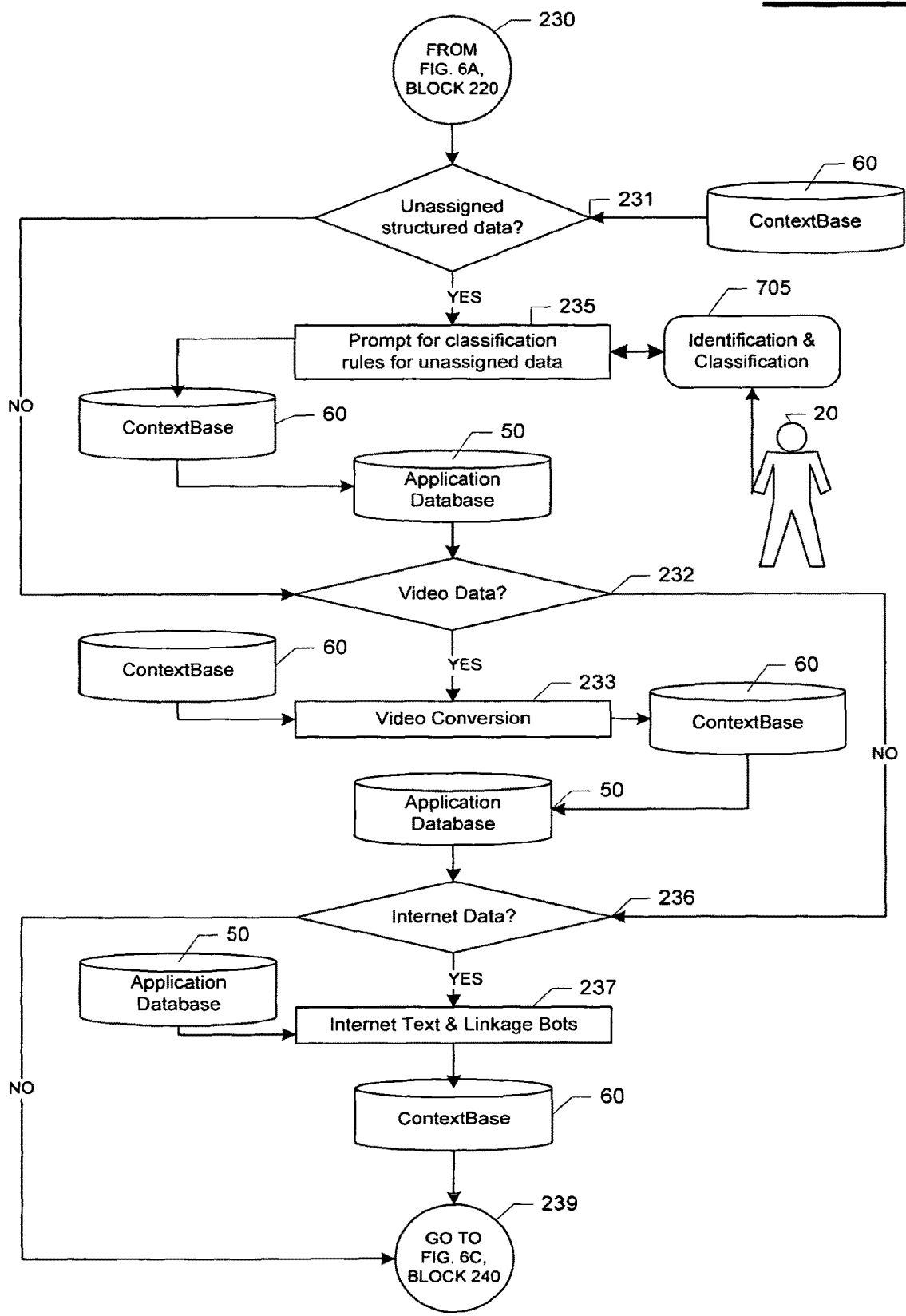
Figure 6C:
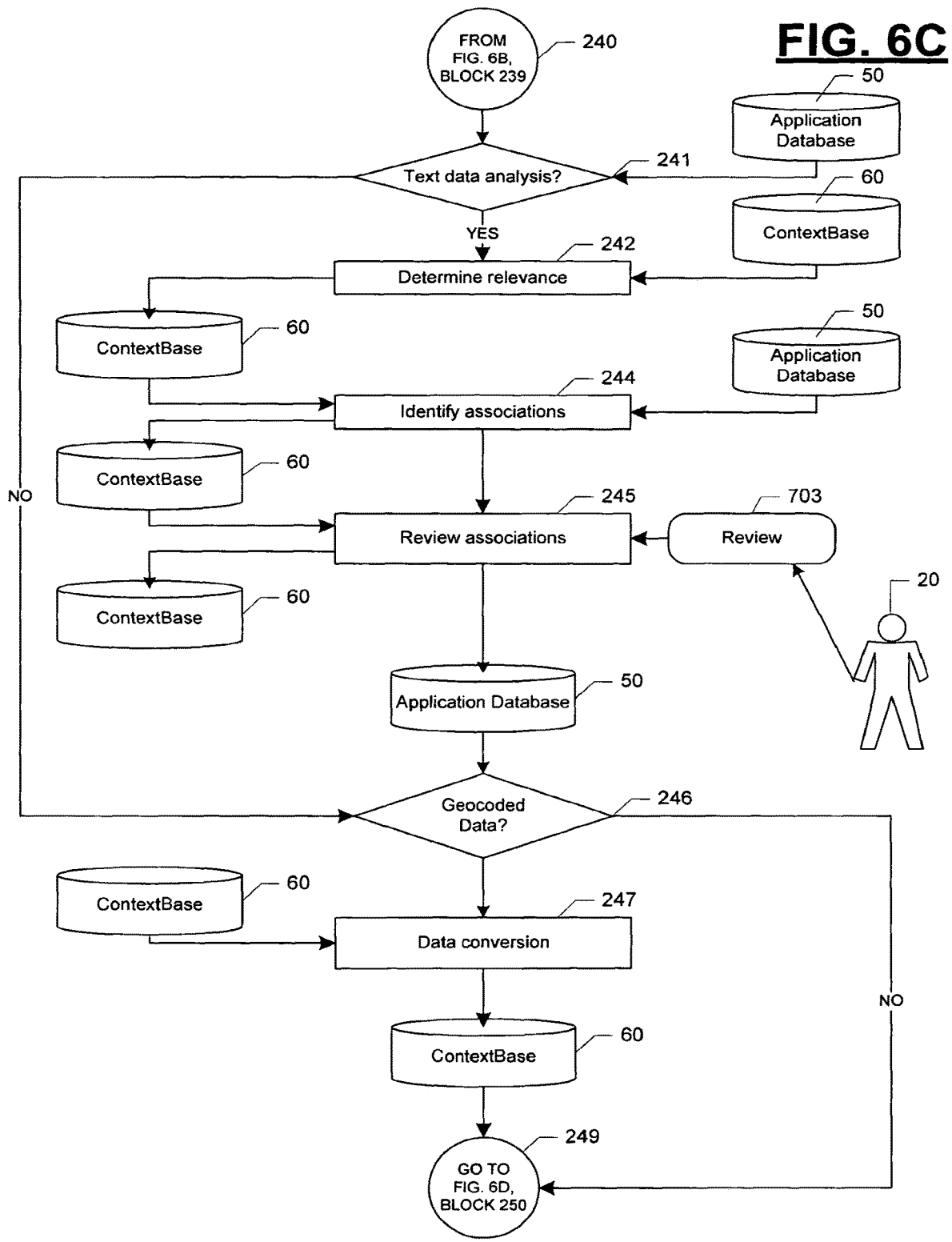
Figure 6D:
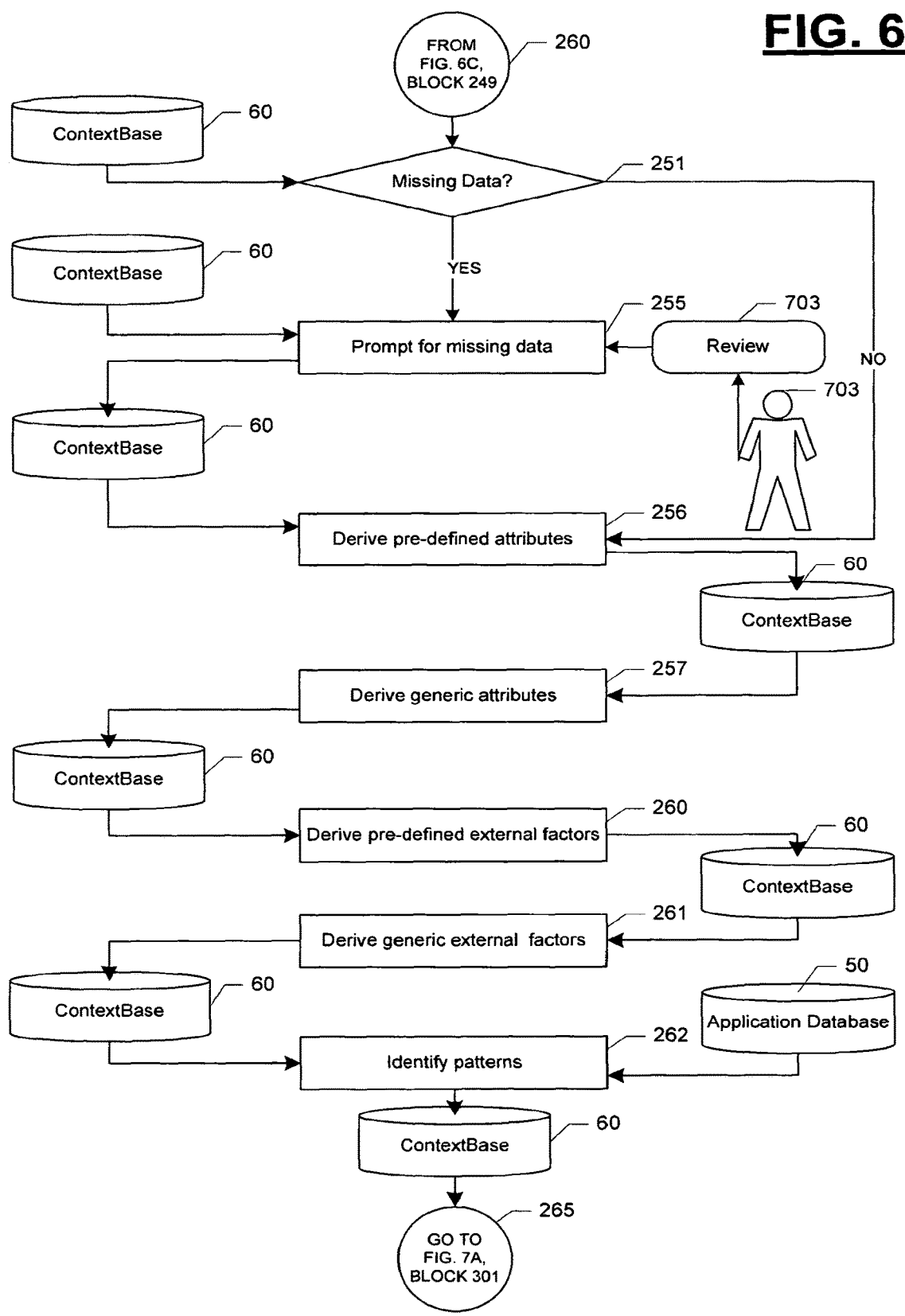
Figure 7A:
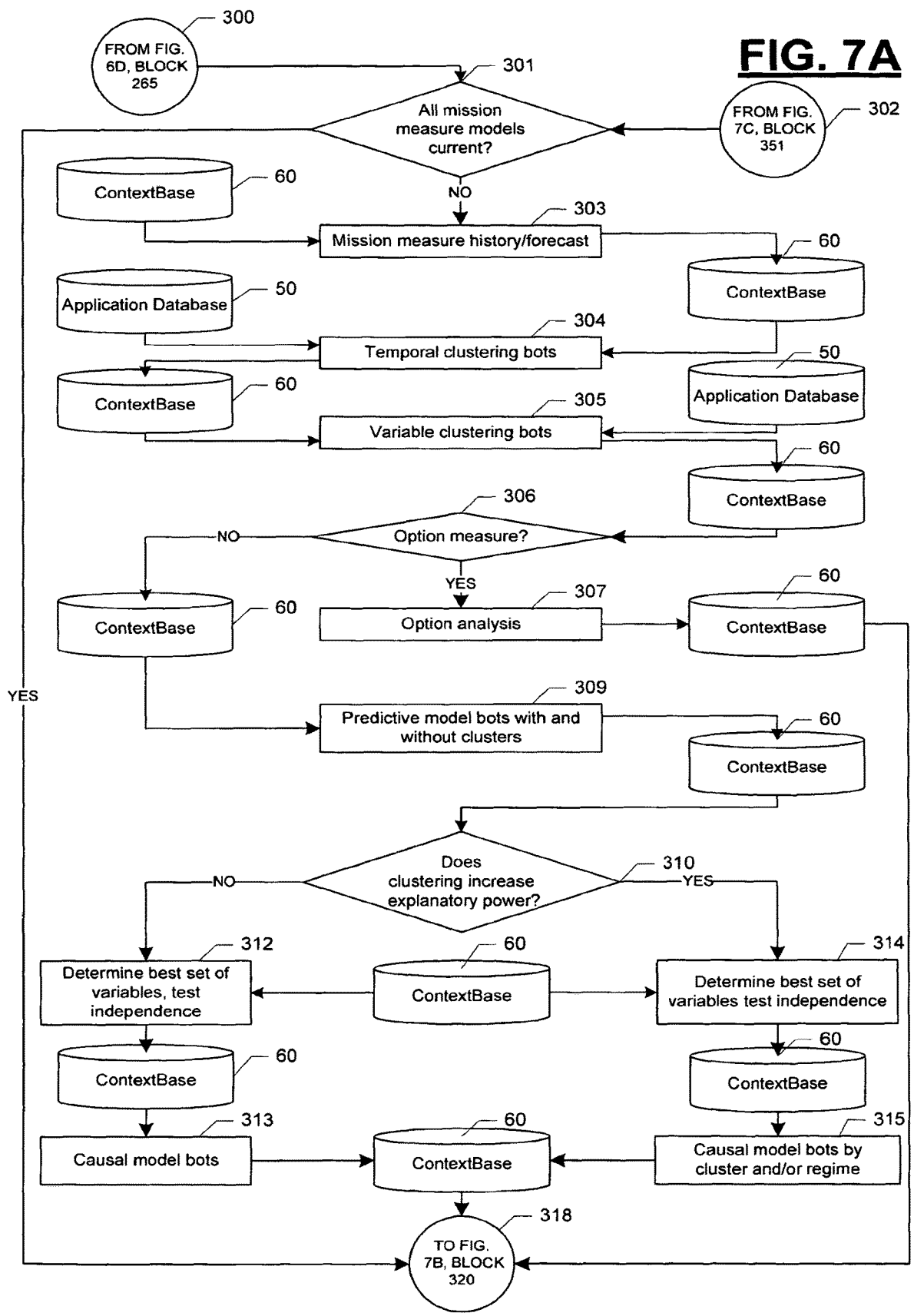
FIG. 7A, FIG. 7B, FIG. 7C, FIG. 7D and FIG. 7E are block diagrams showing the sequence of steps in the present invention used for creating a mission-oriented Context8ase for by organization and organization level.
Figure 7B:
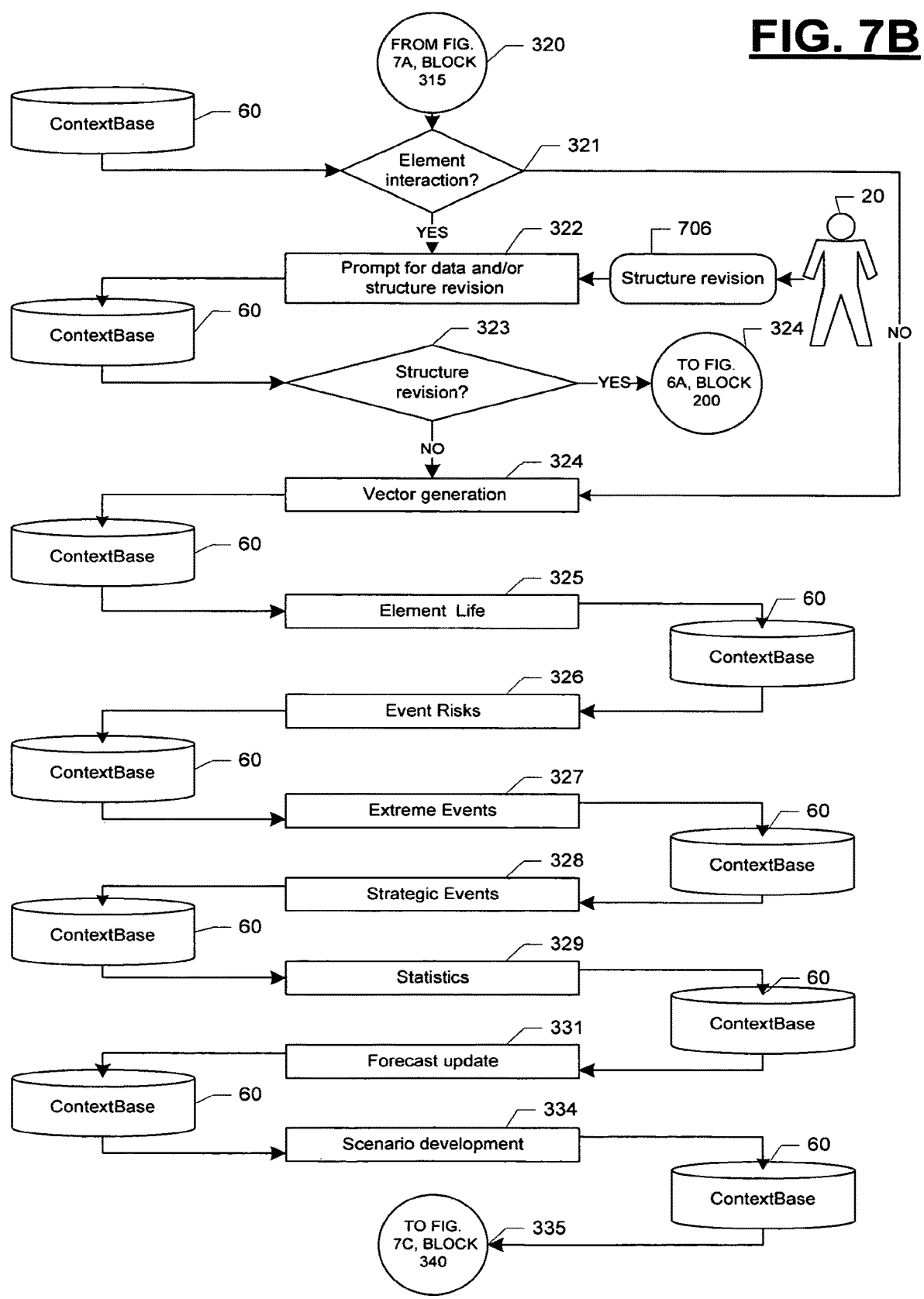
Figure 7C:
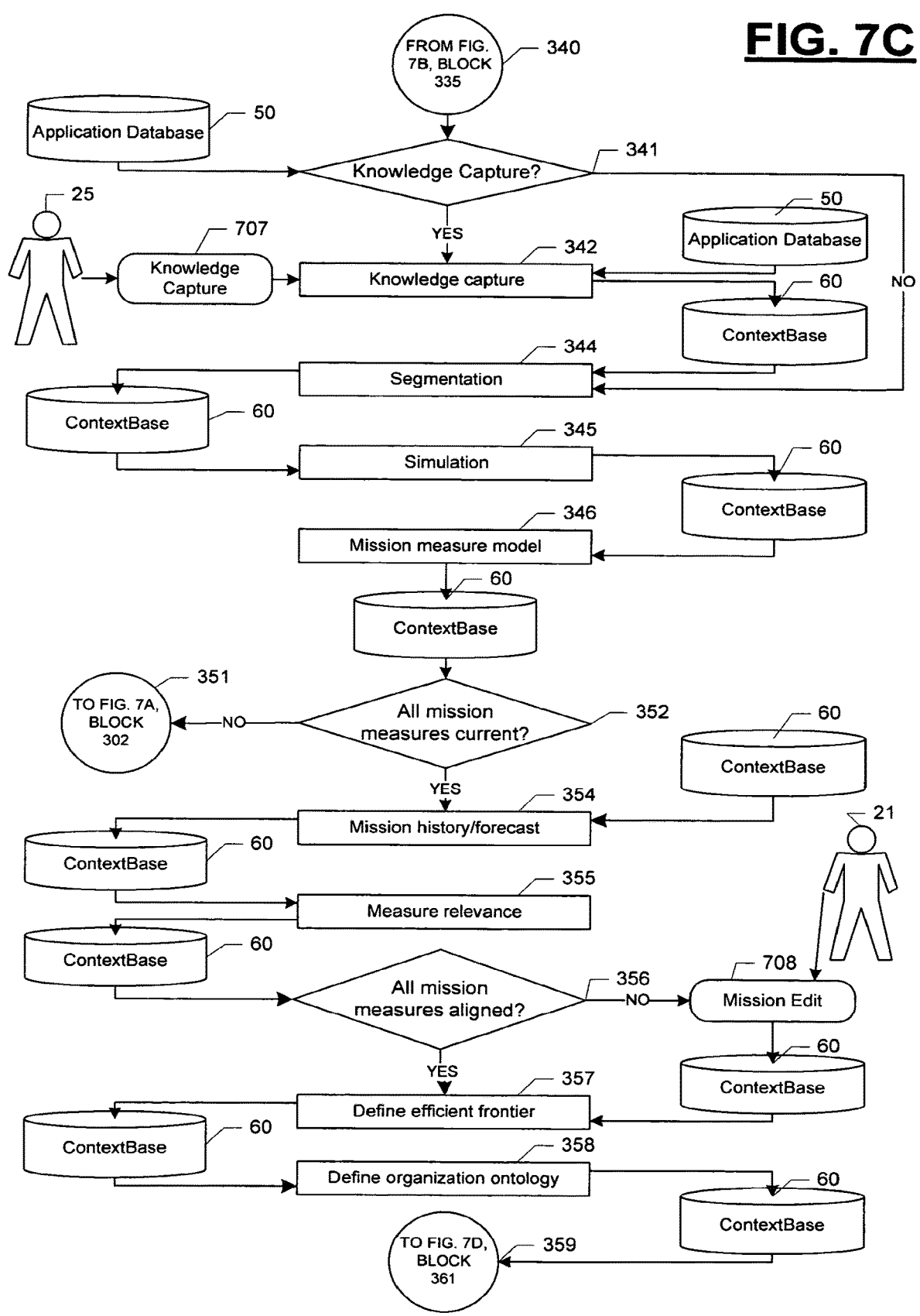
Figure 7D:
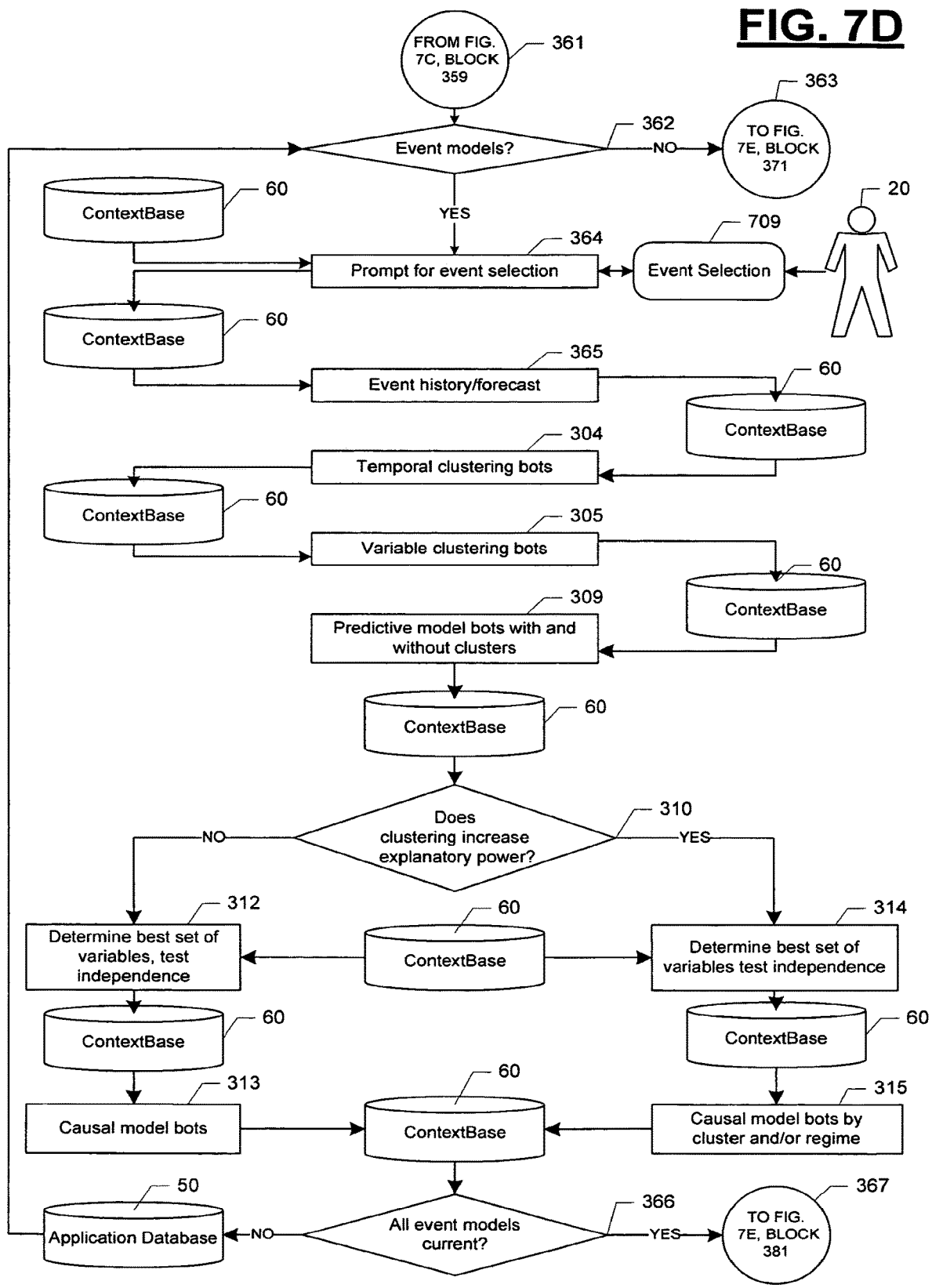
Figure 7E:
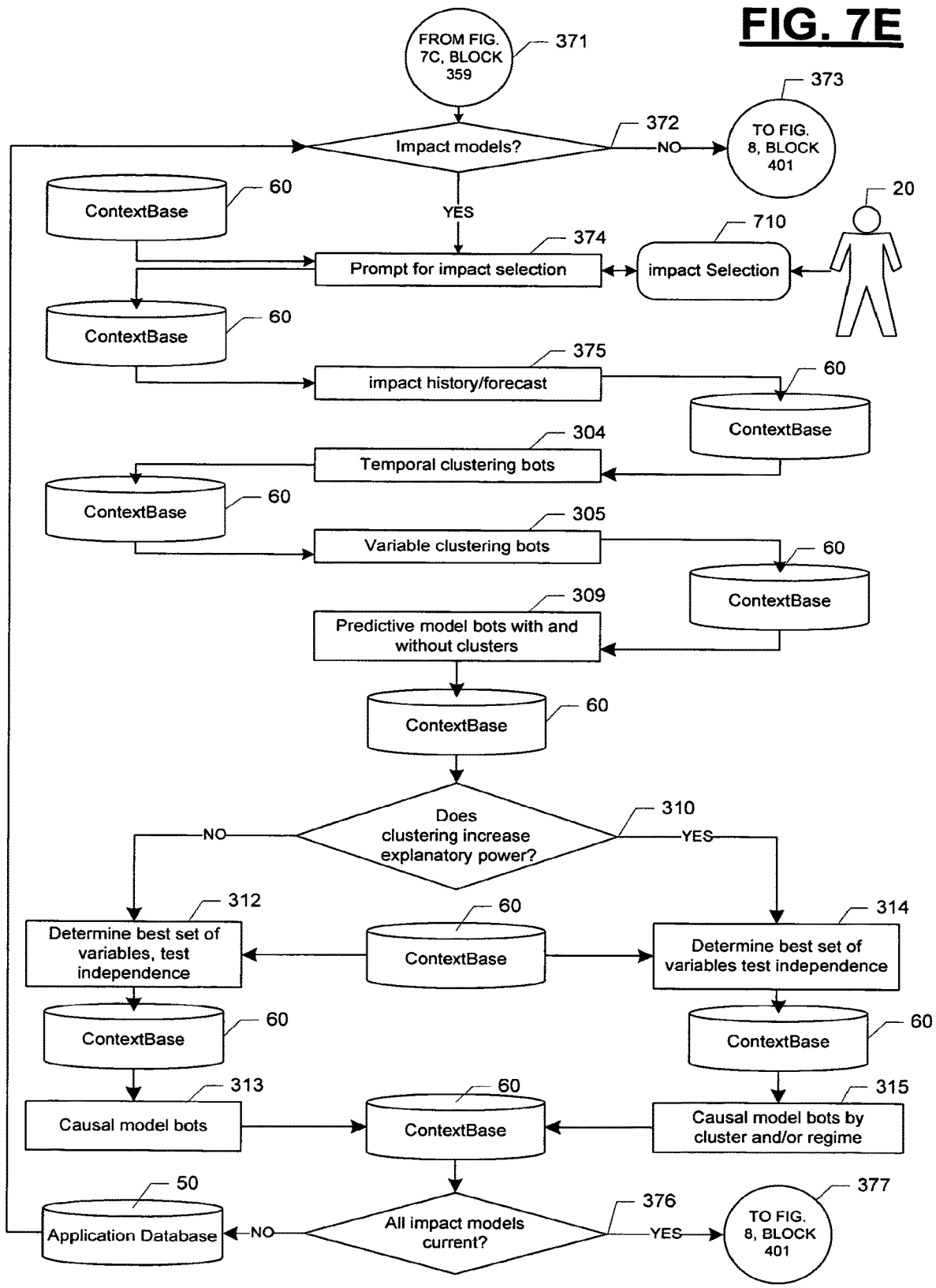

As shown in FIG. 5, one embodiment of the present invention is a computer system (100) illustratively comprised of a user-interface personal computer (110) connected to an application-server personal computer (120) via a network (45). The application-server personal computer (120) is in turn connected via the network (45) to a database-server personal computer (130). The user interface personal computer (110) is also connected via the network (45) to an Internet browser appliance (90) that contains browser software (800) such as Microsoft Internet Explorer or Netscape Navigator.

The database-server personal computer (130) has a read/write random access memory (131), a hard drive (132) for storage of the application database (50) and the ContextBase (60), a keyboard (133), a communication bus (134), a display (135), a mouse (136), a CPU (137) and a printer (138).

The application-server personal computer (120) has a read/write random access memory (121), a hard drive (122) for storage of the non-user-interface portion of the enterprise section of the application software (200, 300 and 400) of the present invention, a keyboard (123), a communication bus (124), a display (125), a mouse (126), a CPU (127) and a printer (128). While only one client personal computer is shown in FIG. 3, it is to be understood that the application-server personal computer (120) can be networked to fifty or more client, user-interface personal computers (110) via the network (45). The application-server personal computer (120) can also be networked to fifty or more server, personal computers (130) via the network (45). It is to be understood that the diagram of FIG. 5 is merely illustrative of one embodiment of the present invention as the system of the present invention could reside in a single computer or be support by a computer grid.

The user-interface personal computer (110) has a read/write random access memory (111), a hard drive (112) for storage of a client data-base (49) and the user-interface portion of the application software (700), a keyboard (113), a communication bus (114), a display (115), a mouse (116), a CPU (117) and a printer (118).

The application software (200, 300 and 400) controls the performance of the central processing unit (127) as it completes the calculations required to support knowledge based performance management. In the embodiment illustrated herein, the application software program (200, 300 and 400) is written in a combination of Java and C++. The application software (200, 300 and 400) can use Structured Query Language (SQL) for extracting data from the databases and the World Wide Web {5, 10, 20 and 25). The user (20) and manager (21) can optionally interact with the user-interface portion of the application software (700) using the browser software (800) in the browser appliance (90) to provide information to the application software (200, 300 and 400) for use in determining which data will be extracted and transferred to the ContextBase (60) by the data bets.

User input is initially saved to the client database (49) before being transmitted to the communication bus (124) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known.

The computers (110, 120, 130) shown in FIG. 5 illustratively are personal computers or workstations that are widely available. Typical memory configurations for client personal computers (110) used with the present invention should include at least 1028 megabytes of semiconductor random access memory (111) and at least a 200 gigabyte hard drive (112). Typical memory configurations for the application-server personal computer (120) used with the present invention should include at least 5128 megabytes of semiconductor random access memory (121) and at least a 300 gigabyte hard drive (122). Typical memory configurations for the database-server personal computer (130) used with the present invention should include at least 5128 megabytes of semiconductor random access memory (131) and at least a 750 gigabyte hard drive (132).

Using the system described above, data is extracted from the narrowly focused enterprise systems, external databases and the world wide web as required to develop a ContextBase (60), develop context frames and manage performance. Before going further, we need to define a number of terms that will be used throughout the detailed description of one embodiment of the Entity Context System:

1. A transaction is any event that is logged or recorded (actions are a subset of events);
2. Transaction data are any data related to a transaction;
3. Descriptive data are any data related to an element, factor, event or commitment. Descriptive data includes forecast data and other data calculated by the system of the present invention;
4. An element of performance (or element) is "an entity or group that as a result of past transactions, forecasts or other data has provided and/or is expected to benefit to one or more organization mission measures";
5. An item is a single member of the group that defines an element of performance. For example, an individual salesman would be an "item" in the "element of performance" sales staff. It is possible to have only one item in an element of performance;
6. Item variables are the transaction data and descriptive data associated with an item or related group of items;
7. Item performance indicators are data derived from transaction data and/or descriptive data for an item;
8. Composite variables for an element are mathematical or logical combinations of item variables and/or item performance indicators;
9. Element variables or element data are the item variables, item performance indicators and composite variables for a specific element or sub-element of performance;
10. External factors (or factors) are numerical indicators of: conditions external to the enterprise, conditions of the enterprise compared to external expectations of enterprise conditions or the performance of the enterprise compared to external expectations of enterprise performance;
11. Factor variables are the transaction data and descriptive data associated with external factors;
12. Factor performance indicators are data derived from factor transaction data and/or descriptive data;
13. Composite factors are mathematical or logical combinations of factor variables and/or factor performance indicators for a factor;
14. Factor data are defined as the factor variables, factor performance indicators and composite factors;
15. A layer is software and/or information that gives an application, system or layer the ability to interact with another layer, system, application or set of information at a general or abstract level rather than at a detailed level;
16. An organization is defined as an entity with a mission and one or more defined, quantified mission measures, organizations include multi-enterprise organizations and enterprises;
17. An organization level is defined as a subset of an organization characterized by a unique, defined, quantifiable mission measure, organization levels include divisions, departments, teams and individuals;
18. A value chain is defined by two or more organizations that have joined together to complete one or more actions;
19: A combination is defined by two or more organizations that have joined together to plan and/or complete one or more actions (value chains are a subset of combinations);
20. Frames are sub-sets of an organization level that can be analyzed separately. For example, one frame could gro1.,.1p together all the elements and external factors by process allowing each process in an organization to be analyzed by outside vendors. Another frame could exclude the one mission measure from each enterprise within a multi-enterprise organization. Frames can also be used to store short and long term plan information;
21. Context frames include all information relevant to mission measure performance for a defined combination of context layers, organization levels and organizations. Context frames can exist as virtual databases that point to the relevant information in one or more databases, they can be designated by adding tags to stored data or they can be physically established as one or more tables within a database. In one embodiment, each context frame is a series of pointers (like a virtual database) that are stored within a separate table;
22. Full context frames are context frames that contain all relevant data from the six context layers (physical, tactical, instant, organization, mission and social environment) for a specified organization level;
23. Administrative context frames are context frames that contain all relevant data from the first three context layers (physical, tactical and instant) for a specified organization level;
24. Strategic context frames are context frames that contain all relevant data from the last three context layers (organization, mission and social environment) for a specified organization level;
25. Complete Context is a designation for applications with a context quotient of 200 that can process full context frames;
26. ContextBase is a database that organizes data by context layer;
27. Risk is defined as events or variability that cause reduced performance;
28. Total risk for an organization with publicly traded equity is defined by the implied volatility associated with organization equity. The amount of implied volatility can be determined by analyzing the option prices for organization equity. For organizations without publicly traded equity, total risk is the sum of all variability risks and event risks;
29. Variability risk is a subset of total risk. It is the risk of reduced or impaired performance caused by variability in external factors and/or elements of performance. Variability risk is generally quantified using statistical measures like standard deviation per month, per year or over some other time period. The covariance between different variability risks is also determined as simulations require quantified information regarding the interrelationship between the different risks to perform effectively;
30. Factor variability (or factor variability risk) is a subset of variability risk. It is the risk of reduced performance caused by external factor variability;
31. Element variability (or element variability risk) is a subset of variability risk. It is the risk of reduced performance caused by the variability of an element of performance;
32. Base market risk is a subset of factor variability risk for an organization with publicly traded equity. It is defined as the implied variability associated with a portfolio that represents the market. For example, the S&P 500 can be used in the U.S. and the FTSE 100 can be used in the U.K. The implied amount of this variability can be determined by analyzing the option prices for the portfolio;

33. Industry market risk is a subset of factor variability risk for an organization with publicly traded equity. It is defined as the implied variability associated with a portfolio that is in the same SIC code as the organization—industry market risk can be substituted for base market risk in order to get a clearer picture of the market risk specific to stock for an organization;
34. Market volatility is a subset of total risk for an organization with publicly traded equity. It is defined as the difference between market variability risk and the calculated values of: base market risk, factor variability, element variability, event risk (includes strategic event risk and contingent liabilities) over a given time period;
35. Event risk is a subset of total risk. It is the risk of reduced performance caused by an event. Most insurance policies cover event risks. For example, an insurance policy might state that: if this event happens, then we will reimburse event related expenses up to a pre-determined amount. Other event risks including customer defection, employee resignation and supplier bankruptcy are generally overlooked by traditional risk management systems;
36. Standard event risk is a subset of event risk. It is the risk associated with events that have a one time impact;
37. Extreme event risk is a subset of event risk. It is the risk associated with events that have a one time impact three or more standard deviations above the average impact for an event;
38. Contingent liabilities are a subset of event risk. They are liabilities the organization may have at some future date where the liability is contingent on some event occurring in the future, therefore they can be considered as a type of event risk. They are different from standard event risks in that the amount of "damage" is often defined contractually and is known in advance. Many feel that the bankruptcy of Enron was triggered by a contingent liability from one of the infamous "off balance sheet entities". The system of the present invention quantifies contingent liabilities for all organization levels—even if the liability comes from a entity that isn't on the balance sheet—a distinct advantage over current financial systems;
39. Strategic risk (or strategic event risk) is a subset of event risk. It is the risk associated with events that can have a permanent impact on the performance of an enterprise or organization. Examples of strategic risk would include: the risk that a large new competitor enters the market and the risk that a new technology renders existing products obsolete;
40. Real options are defined as options the organization may have to make a change in its operation at some future date—these can include the introduction of a new product, the ability to shift production to lower cost environments, etc. Real options are generally supported by the elements of performance of an organization;
41. Narrow systems are the systems listed in Table 3 and any other system that supports the analysis, measurement or management of an element, event, commitment or priority of an organization or enterprise; and
42. The efficient frontier is the curve defined by the maximum performance the organization can expect for given levels of risk.

We will use the terms defined above when detailing one embodiment of the present invention. In this invention, analysis bats are used to determine element of performance lives and the percentage of mission measure performance that is attributable to each element of performance organization level. The resulting values are then added together to determine the contribution of each element of performance to the mission performance at each organization level. External factor contributions and risk impacts are calculated in a similar manner, however, they generally do not have defined lives.

Figure 8:
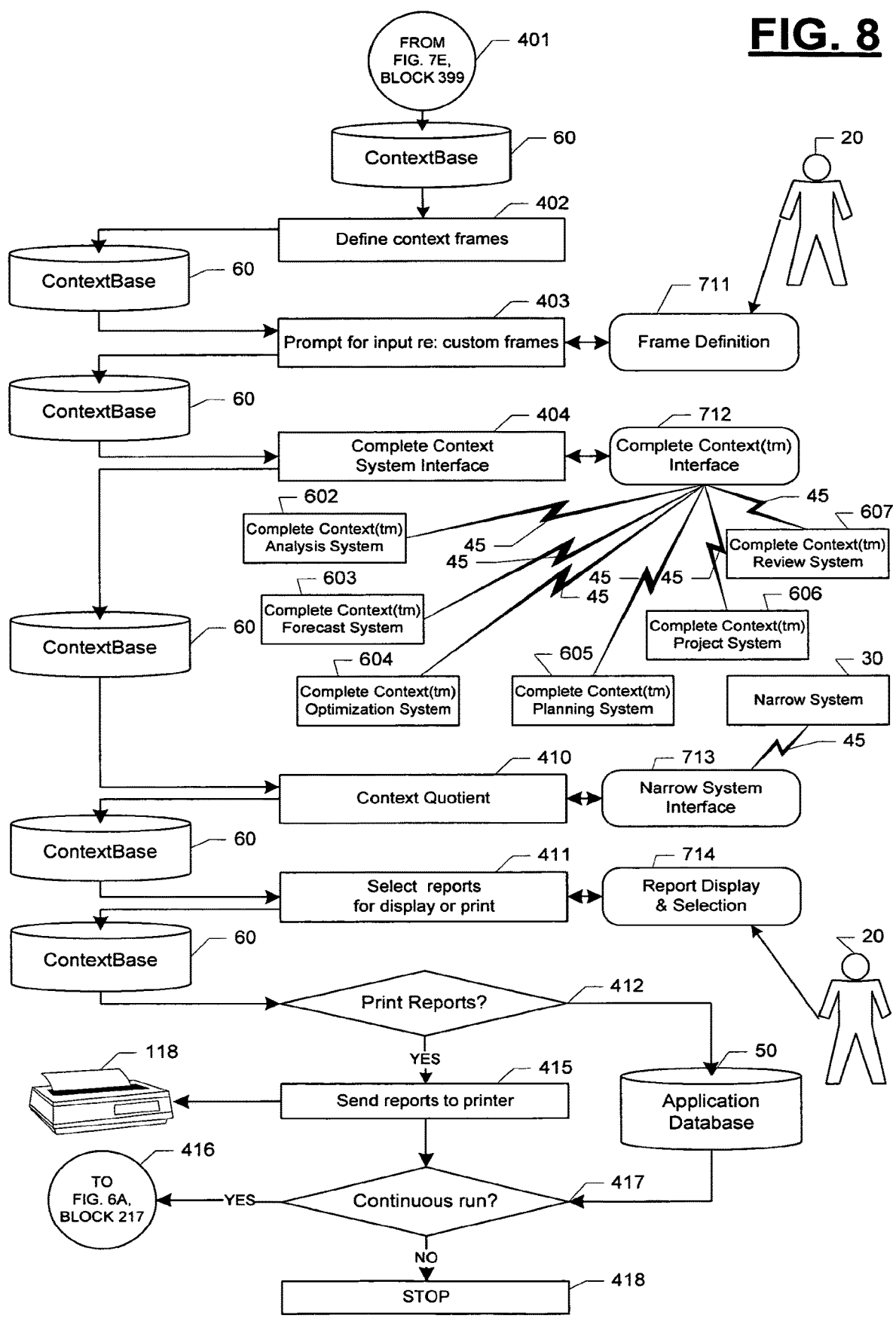
FIG. 8 is a block diagram showing the sequence in steps in the present invention used in defining and distributing context frames and overall performance reports.
Figure 9:
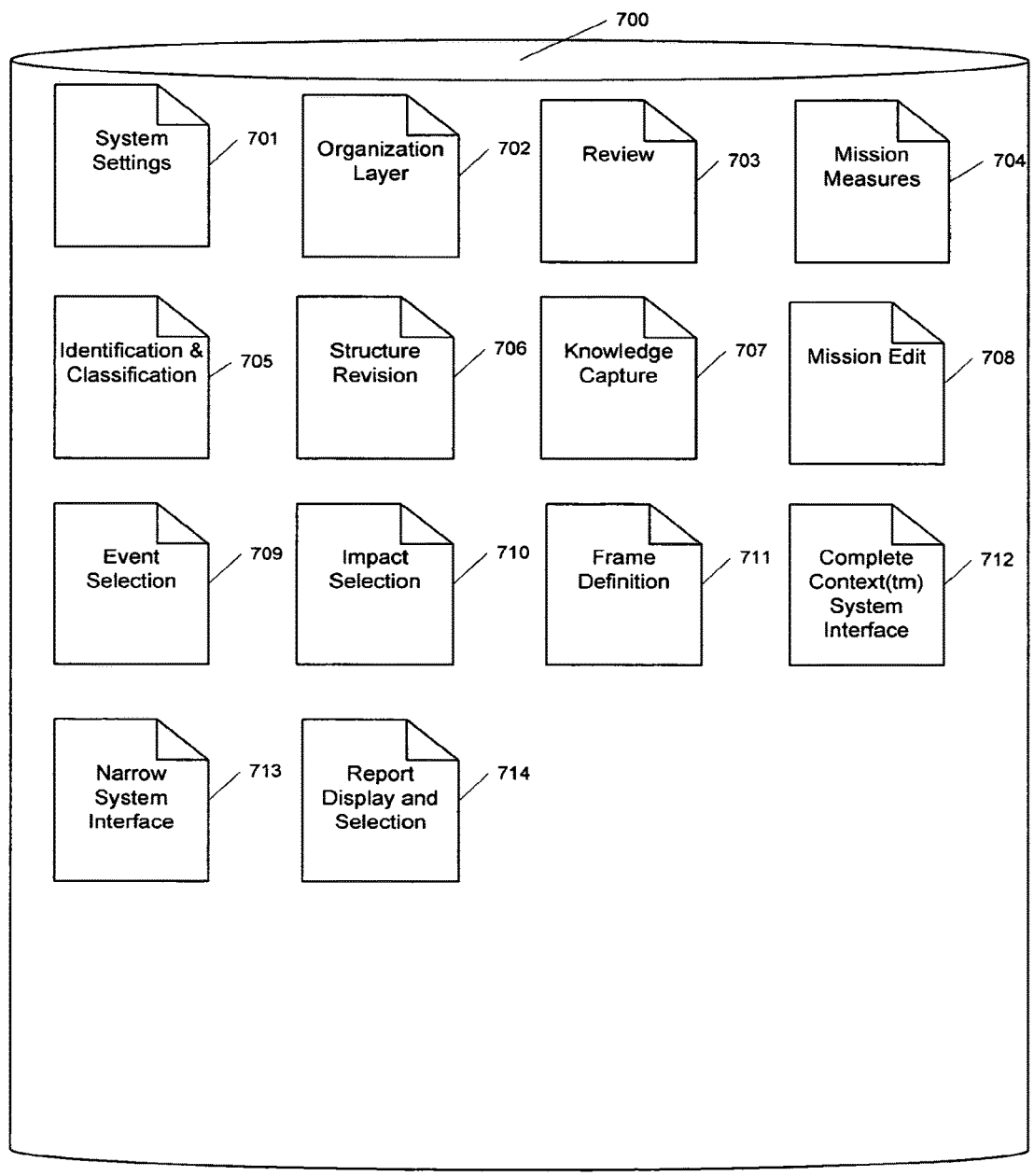
FIG. 9 is a diagram showing the data windows that are used for receiving information from and transmitting information via the interface (700).

As discussed previously, the Entity Context System completes processing in three distinct stages. As shown in FIG. 6A, FIG. 6B, FIG. 6C and FIG. 6D the first stage of processing (block 200 from FIG. 1) extracts data, defines mission measures and prepares data for the next stage of processing. As shown in FIG. 7A, FIG. 7B, FIG. 7C, FIG. 7D and FIG. 7E the second stage of processing (block 300 from FIG. 1) develops and then continually updates the mission-oriented Context8ase (60) by organization and organization level. As shown in FIG. 8, in the third and final stage of processing (block 400 from FIG. 1) prepares context frames for use by the standard applications and optionally prepares and print reports. If the operation is continuous, then the processing described above is continuously repeated.

Mission Measure Specification

The flow diagram in FIG. 6A, FIG. 6B, FIG. 6C and FIG. 6D details the processing that is completed by the portion of the application software (200) that establishes a virtual database for data from other systems that is available for processing, prepares unstructured data for processing and accepts user (20) and management (21) input as required to define the mission measures for each organization level. As discussed previously, the system of the present invention is capable of accepting data from all the narrowly focused systems listed in Table 3. Data extraction, processing and storage is completed by organization and organization level. Operation of the system (100) will be illustrated by describing the extraction and use of structured data from a narrow system database (5) for supply chain management and an external database (20). A brief overview of the information typically obtained from these two databases will be presented before reviewing each step of processing completed by this portion (200) of the application software.

Supply chain systems are one of the seventy plus narrow systems identified in Table 3. Supply chain databases are a type of narrow system database (5) that contain information that may have been in operation management system databases in the past. These systems provide enhanced visibility into the availability of resources and promote improved coordination between organizations and their suppliers. All supply chain systems would be expected to track all of the resources ordered by an organization after the first purchase. They typically store information similar to that shown below in Table 7.

TABLE 7

Supply chain system information

1. Stock Keeping Unit (SKU)
2. Vendor
3. Total quantity on order
4. Total quantity in transit
5. Total quantity on back order
6. Total quantity in inventory
7. Quantity available today
8. Quantity available next 7 days

TABLE 7-continued

Supply chain system information

9. Quantity available next 30 days
10. Quantity available next 90 days
11. Quoted lead time
12. Actual average lead time External databases (20) are used for obtaining information that enables the definition and evaluation of elements of performance, external factors and event risks. In some cases, information from these databases can be used to supplement information obtained from the other databases and the Internet (5 and 10). In the system of the present invention, the information extracted from external databases (20) includes the data listed in Table 8.

TABLE 8

External database information

1. Text information such as that found in the Lexis Nexis database;
2. Text information from databases containing past issues of specific publications,
3. Geospatial data;
4. Multimedia information such as video and audio clips; and
5. Event risk data including information about risk probability and magnitude System processing of the information from the different databases (5, 10 and 20) and the World Wide Web (25) described above starts in a block 202, FIG. 6A. The software in block 202 prompts the user (20) via the system settings data window (701) to provide system setting information. The system setting information entered by the user (20) is transmitted via the network (45) back to the application-server (120) where it is stored in the system settings table (140) in the application database (50) in a manner that is well known. The specific inputs the user (20) is asked to provide at this point in processing are shown in Table 9.

TABLE 9*

1. Continuous, If yes, new calculation frequency? (by minute, hour, day, week, etc.)
2. Organization(s) (can include partners)
3. Organization structure(s) (organization levels, combinations)
4. Organization industry classification(s) (SIC Code)
5. Names of primary competitors by SIC Code
6. Base account structure
7. Base units of measure
8. Base currency
9. Knowledge capture from subject matter expert? (yes or no)
10. Event models? (yes or no)
11. Instant impact models? (yes or no)
12. Video data extraction? (yes or no
13. Internet data extraction? (yes or no)
14. Text data analysis? (if yes, then specify maximum number of relevant words)
15. Gee-coded data? (if yes, then specify standard)
16. Maximum number of generations to process without improving fitness
17. Maximum number of clusters (default is six)
18. Management report types (text, graphic or both)
19. Missing data procedure (chose from selection)
20. Maximum time to wait for user input
21. Maximum number of sub elements
22. Most likely scenario, normal, extreme or mix (default is normal)
23. Simulation time periods
24. Risk free interest rate
25. Date range for history-forecast time periods (optional)
26. Minimum working capital level (optional)

*settings over 4 for each organization level(if different)

The system settings data are used by the software in block 202 to establish organization levels and context layers. As described previously, there are six context layers for each organization level. The application of the remaining system settings will be further explained as part of the detailed explanation of the system operation. The software in block 202 also uses the current system date to determine the time periods (generally in months) that require data to complete the calculations. In one embodiment the analysis of organization level performance by the system utilizes data from every data source for the four year period before and the three year forecast period after the date of system calculation. The user (20) also has the option of specifying the data periods that will be used for completing system calculations. After the date range is calculated it is stored in the system settings table (140) in the application database (50), processing advances to a software block 203.

The software in block 203 prompts the user (20) via the organization layer data window (702) to define the different organization levels, define process maps, identify the elements and factors relevant to each organization level and graphically depict the relationship between the different organization levels that were saved in the system settings (140). For example, an organization could have two enterprises with each enterprise having three departments. In that case there would be nine organization levels as shown in Table 10.

TABLE 10

| Organization Level | Location in example hierarchy |
| --- | --- |
| 1. Organization | Highest Level |
| 2. Enterprise A | Middle Level |
| 3. Enterprise A - Department 100 | Lowest Level |
| 4. Enterprise A - Department 200 | Lowest Level |
| 5. Enterprise A - Department 300 | Lowest Level |
| 6. Enterprise B | Middle Level |
| 7. Enterprise B - Department 101 | Lowest Level |
| 8. Enterprise B - Department 201 | Lowest Level |
| 9. Enterprise B - Department 301 | Lowest Level |

In the system of the present invention an item within an element of performance is the lowest organization level. The organization level and process map relationships identified by the user (20) are stored in the organization layer table (174) in the ContextBase (60). It is also possible to obtain the organization layer information directly from narrow system input. The element and factor definitions by organization level are stored in the element definition table (184) and the factor definition table (185) in the ContextBase (60). After the data is stored, processing advances to a software block 204.

The software in block 204 communicates via a network (45) with the different databases (5, 10, and 20) that are providing data to the Entity Context System. As described previously, a number of methods can be used to identify the different data sources and make the information available for processing including bulk data extraction and point to point data extraction using bats or ETL (extract, test and load) utilities. Data from the lower levels of the hierarchy are automatically included in the context layers for the higher organization levels. In one embodiment the systems providing data are identified using UDDI protocols. The databases in these systems (5, 10 and 20) use XML tags that identify the organization level, context layer, element assignment and/or factor association for each piece of data. In this stage of processing the software in block 204 stores the location information for the data of interest as required to establish a virtual database for the administrative layers for each organization level that was specified in the system settings table (140). Establishing a virtual database eliminates the latency that can cause problems for real time processing. The virtual database information for the physical layer for each organization level is stored in the physical layer table (171) in the ContextBase (60). The virtual database information for the tactical layer for each organization level is stored in the tactical layer table (172) in the ContextBase (60). The virtual database information for the instant layer for each organization level is stored in the instant impact layer table (173) in the ContextBase (60). Structured data that was made available for processing that could not be mapped to an administrative context layer, organization level, factor and/or element is stored in the structured data table (176) in the Context Base (60). World Wide Web data that needs to be processed before being mapped to a context layer, organization level, factor and/or element are identified using a virtual database stored in the Internet linkage (177) in the ContextBase (60). Video data that needs to be processed before being mapped to a context layer, organization level, factor and/or element are identified using a virtual database stored in the video data table (178) in the ContextBase (60). Unstructured text data that needs to be processed before being mapped to a context layer, organization level, factor and/or element are identified using a virtual database stored in the text data table (180) in the ContextBase (60). Geecoded data that needs to be processed before being mapped to a context layer, organization level, factor and/or element are identified using a virtual database stored in the geo data table (181) in the ContextBase (60). In all cases, data from narrow partner system databases (10) can be extracted and stored in a manner similar to that described for organization narrow system data. This data can include feature designations that define the acceptable range for data that are changed during optimization calculations. After virtual databases have been created that fully account for all available data from the databases (5, 10 and 20) and the World Wide Web (25), processing advances to a software block 205 and then on to a software block 210.

The software in block 210 prompts the user (20) via the review data window (703) to review the elements and factors by context layer that have been identified in the first few steps of processing. The element—context layer assignments and the factor—context layer assignments were created by mapping data to their "locations" within the ContextBase (60) using xml tag designations. The user (20) has the option of changing these designations on a one time basis or permanently. Any changes the user (20) makes are stored in the table for the corresponding context layer (i.e. tactical layer changes are saved in the tactical layer table (172), etc.). As part of the processing in this block, the user (20) is given the option to establish data categories for each context layer using an interactive GEL algorithm that guides the process of category development. The newly defined categories are mapped to the appropriate data in the appropriate context layer and stored in the organization layer table (174) in the ContextBase (60). The user (20) is also prompted by the review data window (703) to use data and/or the newly created data categories from each context layer to define six of the nine key terms—element, agent, asset, resource, action and commitment (mission measures and priorities will be defined in the next step) for each organization level. The resulting definitions are saved in the key terms table (170) in the ContextBase (60) by organization and organization level. Finally, the user (20) is prompted to define transaction data that do not correspond to one of the six key terms. For example, transaction data may relate to a cell phone call or an email—both events that are not defined as actions for the current organization level. The user (20) will define these events using standardized definitions from a Thesaurus table (142) in the application database (50) with synonyms that match business concepts like "transfer", "return" and "expedite" as required to define each transaction. The new definitions are also stored in the key terms table (170) in the ContextBase (60) before processing advances to a software block 215.

The software in block 215 prompts the manager (21) via the mission measure data window (704) to use the key term definitions established in the prior processing step to specify one or more mission measures for each organization level. As discussed previously, the manager (21) is given the option of using pre-defined mission measures for evaluating the performance of a commercial organization or defining new mission measures using internal and/or external data. If more than one mission measure is defined for a given organization level, then the manager (21) is prompted to assign a weighting or relative priority to the different mission measures that have been defined. The software in this block also prompts the manager (21) to identify keywords that are relevant to mission performance for each organization level in each organization. After the mission measure definitions are completed, the value of the newly defined mission measures are calculated using historical data and forecast data and stored in the mission layer table (175) by organization and organization level. After this has been completed, the mission measure definitions, priorities and keywords are stored in the key terms table (170) in the ContextBase (60) by organization and organization level before processing advances to a software block 231.

The software in block 231 checks the structured data table (176) in the ContextBase (60) to see if there is any structured data that has not been assigned to an organization level and/or context layer. If there is no structured data without a complete assignment (organization, organization level, context layer and element or factor assignment constitutes a complete assignment), then processing advances to a software block 232. Alternatively, if there are structured data without an assignment, then processing advances to a software block 235.

The software in block 235 prompts the manager (21) via the identification and classification data window (705) to identify the context layer, organization level, element assignment or factor assignment for the structured data in table 176. After assignments have been specified for every data element, the resulting assignment are stored in the appropriate context layer table in the ContextBase (60) by organization and organization level before processing advances to a software block 232.

The software in block 232 checks the system settings table (140) in the Application Database (50) to see if video data extraction is going to be used in the current analysis. If video data extraction is not being used, then processing advances to a software block 236. Alternatively, if video data extraction is being used, then processing advances to a software block 233.

The software in block 233 extracts text from the video data stored in the video data table (178) and stores the resulting text in the text data table (180) in the ContextBase (60). The information in the video comes in two parts, the narrative associated with the image and the image itself. In one embodiment, the narrative portion of the video has been captured in captions. These captions along with information identifying the time of first broadcast are stored in the text data table (180). This same procedure can also be used for capturing data from radio broadcasts. If captions are not available, then any of a number of commercially available voice recognition programs can be used to create text from the narratives. The image portion of the video requires conversion. The conversion of video into text requires the use of several conversion algorithms and a synthesis of the results from each of the different algorithms using a data fusion algorithm. The algorithms used for video conversion include: coefficient energy block classification, local stroke detection and merge and graphics/text block classification. Again, the resulting text information along with information identifying the time of first broadcast are stored in the text table (180) before processing advances to a software block 236.

The software in block 236 checks the system settings table (140) in the Application Database (50) to see if internet data extraction is going to be used in the current analysis. If internet data extraction is not being used, then processing advances to a software block 241. Alternatively, if internet data extraction is being used, then processing advances to a software block 237.

The software in block 237 checks the bot date table (141) and deactivates internet text and linkage bots with creation dates before the current system date and retrieves information from the key terms table (170). The software in block 237 then initializes text bots for each keyword stored in the key terms table (170). The bots are programmed to activate with the frequency specified by user (20) in the system settings table (140).

Bots are independent components of the application that have specific tasks to perform. In the case of internet text and linkage bots, their tasks are to locate and extract keyword matches and linkages from the World Wide Web (25) and then store the extracted text in the text data table (180) and the linkages in the internet linkage table (177) in the ContextBase (60). Every Internet text and linkage bot contains the information shown in Table 11.

TABLE 11

1. Unique ID number (based on date, hour, minute, second of creation)
2. Creation date (date, hour, minute, second)
3. Storage location
4. Mapping information
5. Home URL
6. Linkage URL (if any)
7. Organization
8. Organization Level
9. Keyword After being initialized, the text and linkage bets locate, extract and store text and linkages from the World Wide Web (25) in accordance with their programmed instructions with the frequency specified by user (20) in the system settings table (140). These bets will continually extract data as system processing advances a software block 241.

The software in block 241 checks the system settings table (140) to see if text data analysis is being used. If text data analysis is not being used, then processing advances to a block 246. Alternatively, if the software in block 241 determines that text data analysis is being used, processing advances to a software block 242.

The software in block 242 checks the bot date table (141) and deactivates text relevance bets with creation dates before the current system date and retrieves information from the system settings table (140), the key terms table (170) and the text data table (180). The software in block 242 then initializes text relevance bets to activate with the frequency specified by user (20) in the system settings table (140). Sots are independent components of the application that have specific tasks to perform. In the case of text relevance bets, their tasks are to calculate a relevance measure for each word in the text data table (180) and to identify the type of word (Name, Proper Name, Verb, Adjective, Complement, Determinant or Other). The relevance of each word is determined by calculating a relevance measure using the formula shown in Table 12.

TABLE 12

Relevance (word) = $\sqrt{N} \cdot (nm' - n'm)/\sqrt{(n + n')(n + m)(n' + m')(m + m')}$
where
N = total number of phrases (n + n' + m + m')
n = number of relevant phrases where word appears
n' = number of irrelevant phrases where word appears
m = number of relevant phrases where word does not appear
m' = number of irrelevant phrases where word does not appear Note:
relevance is determined by the presence of a keyword in a phrase.

One advantage of this approach is that it takes into account the fact that text is generally. a sequence of words and not just a "bag of words". The type of word and the phrase identities are determined by using a probabilistic speech tagging algorithm. If the amount of text that needs processing is very large, then a multi layer neural net can be used to sort the text into blocks that should be processed and those that should not. Every text relevance bot contains the information shown in Table 13.

TABLE 13

1. Unique 10 number (based on date, hour, minute, second of creation)
2. Creation date (date, hour, minute, second)
3. Mapping information
4. Storage location
5. Organization
6. Organization Layer
7. Word After being activated, the text relevance bots determine the relevance and type of each word with the frequency specified by the user (20) in the system settings table (140). The relevance of each word is stored in the text data table (180) before processing passes to a software block 244.

The software in block 244 checks the bot date table (141) and deactivates text association bots with creation dates before the current system date and retrieves information from the system settings table (140), the tactical layer table (172), the instant impact layer table (173), the key terms table (170), the text data table (180), the element definition table (184) and the factor definition table (185). The software in block 244 then initializes text association bats for the words identified in the prior stage of processing in order of relevance up to the maximum number for each organization (the user (20) specified the maximum number of keywords in the system settings table). Sots are independent components of the application that have specific tasks to perform. In the case of text association bats, their tasks are to determine which element or factor the relevant words are most closely associated with. Every bot initialized by software block 244 will store the association it discovers with the most relevant words stored in the text data table (180). Every text association bot contains the information shown in Table 14.

TABLE 14

1. Unique 10 number (based on date, hour, minute, second of creation)
2. Creation date (date, hour, minute, second)
3. Storage location
4. Organization
5. Organization Level
6. Word After being initialized, the bats identify the element or factor that each word is most closely associated with and stores the association "assignment" in the text data table (180) and the element definition table (184) or factor definition table (185) in the ContextBase (60) before processing advances to a software block 245.

The software in block 245 prompts the user (20) via the review data window (703) to review the associations developed in the prior step in processing. Options the user (20) can choose for modifying the associations include: changing the association to another element or factor, removing the assigned association, or adding an association to one or more other elements or factors. When all the user (20) completes the review of the assignments, all changes are stored in the text data table (180), the element definition table (184) and/or the factor definition table (185) before system processing advances to a software block 246.

The software in block 246 checks the system settings table (140) in the Application Database (50) to see if gee-coded data is going to be used in the current analysis. If geo-coded data is not being used, then processing advances to a software block 251. Alternatively, if geo-coded data is being used, then processing advances to a software block 247.

The software in block 247 retrieves the data stored in the geo data table (181), converts the data in accordance with applicable gee-coding standard, calculates pre-defined attributes and stores the resulting data in the physical layer table (171) by element or factor in the ContextBase (60) before processing advances to software block 251.

The software in block 251 checks each of the administrative context layer tables—the physical layer table (171), the tactical layer table (172) and the instant impact layer table (173)—and the social environment layer table (179) in the ContextBase (60) to see if data is missing for any required time period. If data is not missing for any required time period, then processing advances to a software block 256. Alternatively, if data for one or more of the required time periods is missing for one or more of the administrative context layers, then processing advances to a software block 255.

The software in block 255 prompts the user (20) via the review data window (703) to specify the method to be used for filling the blanks for each field that is missing data. Options the user (20) can choose for filling the blanks include: the average value for the item over the entire time period, the average value for the item over a specified period, zero, the average of the preceding item and the following item values and direct user input for each missing item. If the user (20) does not provide input within a specified interval, then the default missing data procedure specified in the system settings table (140) is used. When all the blanks have been filled and stored for all of the missing data, system processing advances to a block 256.

The software in block 256 calculates pre-defined attributes by item for each numeric, item variable in each of the administrative context layer tables—the physical layer table (171), the tactical layer table (172) or the instant impact layer table (173)—in the ContextBase (60) by element. The attributes calculated in this step include: summary data like cumulative total value; ratios like the period to period rate of change in value; trends like the rolling average value, comparisons to a baseline value like change from a prior years level and time lagged values like the time lagged value of each numeric item variable. The software in block 256 also derives attributes for each item date variable in each of the administrative context layer tables (171, 172 and 173) in the ContextBase (60). The derived date variables include summary data like time since last occurrence and cumulative time since first occurrence; and trends like average frequency of occurrence and the rolling average frequency of occurrence. The software in block 256 derives similar attributes for the text and geospatial item variables stored in the administrative context layer tables—the physical layer table (171), the tactical layer table (172) or the instant impact layer table (173)—by element. The numbers derived from the item variables are collectively referred to as "item performance indicators". The software in block 256 also calculates pre-specified combinations of variables called composite variables for measuring the strength of the different elements of performance. The item performance indicators and the composite variables are tagged and stored in the appropriate administrative context layer table—the physical layer table (171), the tactical layer table (172) or the instant impact layer table (173)—by element and organization level before processing advances to a software block 257.

The software in block 257 uses attribute derivation algorithms such as the AQ program to create combinations of variables from the administrative context layer tables—the physical layer table (171), the tactical layer table (172) or the instant impact layer table (173)—that were not pre-specified for combination in the prior processing step. While the AQ program is used in one embodiment of the present invention, other attribute derivation algorithms, such as the LINUS algorithms, may be used to the same effect. The resulting composite variables are tagged and stored in the appropriate administrative context layer table—the physical layer table (171), the tactical layer table (172) or the instant impact layer table (173)—in the ContextBase (60) by element before processing advances to a software block 260.

The software in block 260 derives external factor indicators for each factor numeric data field stored in the social environment layer table (179). For example, external factors can include: the ratio of enterprise earnings to expected earnings, the number and amount of jury awards, commodity prices, the inflation rate, growth in gross domestic product, enterprise earnings volatility vs. industry average volatility, short and long term interest rates, increases in interest rates, insider trading direction and levels, industry concentration, consumer confidence and the unemployment rate that have an impact on the market price of the equity for an enterprise and/or an industry. The external factor indicators derived in this step include: summary data like cumulative totals, ratios like the period to period rate of change, trends like the rolling average value, comparisons to a baseline value like change from a prior years price and time lagged data like time lagged earnings forecasts. In a similar fashion the software in block 260 calculates external factors for each factor date field in the social environment layer table (179) including summary factors like time since last occurrence and cumulative time since first occurrence; and trends like average frequency of occurrence and the rolling average frequency of occurrence. The numbers derived from numeric and date fields are collectively referred to as "factor performance indicators". The software in block 260 also calculates pre-specified combinations of variables called composite factors for measuring the strength of the different external factors. The factor performance indicators and the composite factors are tagged and stored in the social environment layer table (179) by factor and organization level before processing advances to a block 261.

The software in block 261 uses attribute derivation algorithms, such as the Linus algorithm, to create combinations of the external factors that were not pre-specified for combination in the prior processing step. While the Linus algorithm is used in one embodiment of the present invention, other attribute derivation algorithms, such as the AQ program, may be used to the same effect. The resulting composite variables are tagged and stored in the in the social environment layer table (179) by factor and organization level before processing advances to a block 262.

The software in block 262 checks the bot date table (141) and deactivates pattern bats with creation dates before the current system date and retrieves information from the system settings table (140), the physical layer table (171), the tactical layer table (172), the instant impact layer table (173) and the social environment layer table (179).

The software in block 262 then initializes pattern bats for each layer to identify frequent patterns in each layers. Bats are independent components of the application that have specific tasks to perform. In the case of pattern bats, their tasks are to identify and frequent patterns in the data for each context layer, element, factor and organization level. In one embodiment, pattern bats use the Apriori algorithm to identify patterns including frequent patterns, sequential patterns and multi-dimensional patterns. However, a number of other pattern identification algorithms including the PASCAL algorithm can be used alone or in combination to the same effect. Every pattern bot contains the information shown in Table 15.

TABLE 15

1. Unique ID number (based on date, hour, minute, second of creation)
2. Creation date (date, hour, minute, second)
3. Storage location
4. Organization
6. Context Layer, Element, Factor or Organization level
7. Algorithm After being initialized, the bots identify patterns in the data by element, factor, layer or organization level. Each pattern is given a unique identifier and the frequency and type of each pattern is determined. The numeric values associated with the patterns are item performance indicators. The values are stored in the appropriate context layer table by element or factor. When data storage is complete, processing advances to a software block 303.

Context8ase Development

The flow diagrams in FIG. 7A, FIG. 7B, FIG. 7C, FIG. 7D and FIG. 7E detail the processing that is completed by the portion of the application software (300) that continually develops a mission oriented ContextBase (60) by creating and activating analysis bats that:

1. Supplement the organization layer information provided previously by identifying inter-relationships between the different elements of performance, external factors and risks;
2. Complete the mission measure layer of the ContextBase (60) by developing robust models of the elements, factors and risks driving mission measure performance;
3. Optionally, develop robust models of the elements, factors and risks driving action occurrence rates;
4. Optionally, develop robust models of the elements, factors and risks causing instant impact levels to vary, and
5. Combine the mission measure analyses by organization and organization level as required to evaluate strategic alignment and determine the relationship between the mission measures and mission performance.

Each analysis bot generally normalizes the data being analyzed before processing begins. As discussed previously, processing in one embodiment includes an analysis of all mission measures by organization and organization level. It is to be understood that the system of the present invention can combine any number of mission measures as required to evaluate the performance of any organization level.

Processing in this portion of the application begins in software block 301. The software in block 301 checks the mission layer table (175) in the ContextBase (60) to determine if there are current models for all mission measures for every organization level. If all the mission measure models are current, then processing advances to a software block 321. Alternatively, if all mission measure models are not current, then the next mission measure for the next organization level is selected and processing advances to a software block 303. The software in block 303 retrieves the previously calculated values for the mission measure from the mission layer table (175) before processing advances to a software block 304.

The software in block 304 checks the bot date table (141) and deactivates temporal clustering bots with creation dates before the current system date. The software in block 304 then initializes bots in accordance with the frequency specified by the user (20) in the system settings table (140). The bot retrieves information from the mission layer table (175) for the organization level being analyzed and defines regimes for the mission measure being analyzed before saving the resulting cluster information in the mission layer table (175) in the ContextBase (60). Bots are independent components of the application that have specific tasks to perform. In the case of temporal clustering bots, their primary task is to segment mission measure performance into distinct time regimes that share similar characteristics. The temporal clustering bot assigns a unique identification (id) number to each "regime" it identifies before tagging and storing the unique id numbers in the mission layer table (175). Every time period with data are assigned to one of the regimes. The cluster id for each regime is saved in the data record for the mission measure and organization level being analyzed. The time regimes are developed using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The process continues until adding a new model does not improve accuracy. Other temporal clustering algorithms may be used to the same effect. Every temporal clustering bot contains the information shown in Table 16.

TABLE 16

1. Unique ID number (based on date, hour, minute, second of creation)
2. Creation date (date, hour, minute, second)
3. Mapping information
4. Storage location
5. Maximum number of clusters
6. Organization
7. Organization Level
8. Mission Measure When bats in block 304 have identified and stored regime assignments for all time periods with mission measure data for the current organization, processing advances to a software block 305.

The software in block 305 checks the bot date table (141) and deactivates variable clustering bats with creation dates before the current system date. The software in block 305 then initializes bats as required for each element of performance and external factor for the current organization level. The bats activate in accordance with the frequency specified by the user (20) in the system settings table (140), retrieve the information from the physical layer table (171), the tactical layer table (172), the instant impact layer table (173), the social environment layer table (179), the element definition table (184) and/or the factor definition table (185) as required and define segments for the element data and factor data before tagging and saving the resulting cluster information in the element definition table (184) or the factor definition table (185).

Sots are independent components of the application that have specific tasks to perform. In the case of variable clustering bets, their primary task is to segment the element data and factor data into distinct clusters that share similar characteristics. The clustering bot assigns a unique id number to each "cluster" it identifies, tags and stores the unique id numbers in the element definition table (184) and factor definition table (185). Every item variable for every element of performance is assigned to one of the unique clusters. The cluster id for each variable is saved in the data record for each variable in the table where it resides. In a similar fashion, every factor variable for every external factor is assigned to a unique cluster. The cluster id for each variable is tagged and saved in the data record for the factor variable. The element data and factor data are segmented into a number of clusters less than or equal to the maximum specified by the user (20) in the system settings table (140). The data are segmented using the "default" clustering algorithm the user (20) specified in the system settings table (140). The system of the present invention provides the user (20) with the choice of several clustering algorithms including: an unsupervised "Kohonen" neural network, decision tree, support vector method, K-nearest neighbor, expectation maximization (EM) and the segmental K-means algorithm. For algorithms that normally require the number of clusters to be specified, the bot will use the maximum number of clusters specified by the user (20). Every variable clustering bot contains the information shown in Table 17.

TABLE 17

1. Unique ID number (based on date, hour, minute, second of creation)
2. Creation date (date, hour, minute, second)
3. Mapping information
4. Storage location
5. Element of performance or external factor
6. Clustering algorithm type
7. Organization
8. Organization Level TABLE 17-continued 9. Maximum number of clusters
10. Variable 1
. . . to
1O + n. Variable n When bets in block 305 have identified, tagged and stored cluster assignments for the data associated with each element of performance or external factor in the element definition table (184) or factor definition table (185), processing advances to a software block 306.

The software in block 306 checks the mission layer table (175) in the ContextBase (60) to see if the current mission measure is an options based measure like contingent liabilities, real options or strategic risk. If the current mission measure is not an options based measure, then processing advances to a software block 309. Alternatively, if the current mission measure is an options based measure, then processing advances to a software block 307.

The software in block 307 checks the bot date table (141) and deactivates options simulation bets with creation dates before the current system date. The software in block 307 then retrieves the information from the system settings table (140), the element definition table (184) and factor definition table (185) and the scenarios table (152) as required to initialize option simulation bets in accordance with the frequency specified by the user (20) in the system settings table (140).

Bets are independent components of the application that have specific tasks to perform. In the case of option simulation bets, their primary task is to determine the impact of each element and factor on the mission measure under different scenarios. The option simulation bets run a normal scenario, an extreme scenario and a combined scenario. In one embodiment, Monte Carlo models are used to complete the probabilistic simulation, however other probabilistic simulation models such as Quasi Monte Carlo can be used to the same effect. The element and factor impacts on option mission measures could be determined using the processed detailed below for the other types of mission measures, however, in one embodiment a separate procedure is used. The models are initialized specifications used in the baseline calculations. Every option simulation bot activated in this block contains the information shown in Table 18.

TABLE 18

1. Unique ID number (based on date, hour, minute, second of creation)
2. Creation date (date, hour, minute, second)
3. Mapping information
4. Storage location
5. Type: normal, extreme or combined
6. Option type: real option, contingent liability or strategic risk
7. Organization
7. Organization level
8. Mission measure After the option simulation bats are initialized, they activate in accordance with the frequency specified by the user (20) in the system settings table (140). Once activated, the bats retrieve the required information and simulate the mission measure over the time periods specified by the user (20) in the system settings table (140) as required to determine the impact of each element and factor on the mission measure. After the option simulation bats complete their calculations, the resulting sensitivities are saved in the element definition table (184) and factor definition table (185) by organization and organization level in the application database (50) and processing advances to a software block 309.

The software in block 309 checks the bot date table (141) and deactivates all predictive model bats with creation dates before the current system date. The software in block 309 then retrieves the information from the system settings table (140), the mission layer table (175), the element definition table (184) and the factor definition table (185) as required to initialize predictive model bats for each mission layer.

Bots are independent components of the application that have specific tasks to perform. In the case of predictive model bots, their primary task is to determine the relationship between the element and factor data and the mission measure being evaluated. Predictive model bots are initialized for every organization level where the mission measure being evaluated is used. They are also initialized for each cluster and regime of data in accordance with the cluster and regime assignments specified by the bots in blocks 304 and 305 by organization and organization level. A series of predictive model bots is initialized at this stage because it is impossible to know in advance which predictive model type will produce the "best" predictive model for the data from each commercial enterprise. The series for each model includes 12 predictive model bot types: neural network; CART; GARCH, projection pursuit regression; generalized additive model (GAM), redundant regression network; rough-set analysis, boosted Naive Bayes Regression; MARS; linear regression; support vector method and stepwise regression. Additional predictive model types can be used to the same effect. Every predictive model bot contains the information shown in Table 19.

TABLE 19

1. Unique 10 number (based on date, hour, minute, second of creation)
2. Creation date (date, hour, minute, second)
3. Mapping information
4. Storage location
5. Organization
6. Organization Level
7. Global or Cluster (10) and/or Regime (10)
8. Element, sub-element or external factor
9. Predictive model type After predictive model bots are initialized, the bots activate in accordance with the frequency specified by the user (20) in the system settings table (140). Once activated, the bots retrieve the required data from the appropriate table in the ContextBase (60) and randomly partition the element or factor data into a training set and a test set. The software in block 309 uses "bootstrapping" where the different training data sets are created by re-sampling with replacement from the original training set so data records may occur more than once. After the predictive model bots complete their training and testing, the best fit predictive model assessments of element and factor impacts on mission measure performance are saved in the element definition table (184) and the factor definition table (185) before processing advances to a block 310.

The software in block 310 determines if clustering improved the accuracy of the predictive models generated by the bats in software block 309 by organization and organization level. The software in block 310 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the mean squared error algorithm to the test data are given preference in determining the best set of variables for use in later analysis. There are four possible outcomes from this analysis as shown in Table 20.

TABLE 20

1. Best model has no clustering
2. Best model has temporal clustering, no variable clustering
3. Best model has variable clustering, no temporal clustering
4. Best model has temporal clustering and variable clustering If the software in block 310 determines that clustering improves the accuracy of the predictive models for an enterprise, then processing advances to a software block 314. Alternatively, if clustering does not improve the overall accuracy of the predictive models for an enterprise, then processing advances to a software block 312.

The software in block 312 uses a variable selection algorithm such as stepwise regression (other types of variable selection algorithms can be used) to combine the results from the predictive model bot analyses for each model to determine the best set of variables for each model. The models having the smallest amount of error, as measured by applying the mean squared error algorithm to the test data, are given preference in determining the best set of variables. As a result of this processing, the best set of variables contain the: item variables, item performance indicators, factor performance indications, composite variables and composite factors (aka element data and factor data) that correlate most strongly with changes in the mission measure being analyzed. The best set of variables will hereinafter be referred to as the "performance drivers".

Eliminating low correlation factors from the initial configuration of the vector creation algorithms increases the efficiency of the next stage of system processing. Other error algorithms alone or in combination may be substituted for the mean squared error algorithm. After the best set of variables have been selected, tagged and stored in the element definition table (184) and the factor definition table (185) for each organization level, the software in block 312 tests the independence of the performance drivers for each organization level before processing advances to a block 313.

The software in block 313 checks the bot date table (141) and deactivates causal predictive model bets with creation dates before the current system date. The software in block 313 then retrieves the information from the system settings table (140) and the element definition table (184) and factor definition table (185) as required to initialize causal predictive model bets for each element of performance, sub-element of performance and external factor in accordance with the frequency specified by the user (20) in the system settings table (140).

Sots are independent components of the application that have specific tasks to perform. In the case of causal predictive model bets, their primary task is to refine the performance driver selection to reflect only causal variables. The Bayesian bets in this step also refine the estimates of element or factor impact developed by the predictive model bets in a prior processing step by assigning a probability to the impact estimate. A series of causal predictive model bets are initialized at this stage because it is impossible to know in advance which causal predictive model will produce the "best" vector for the best fit variables from each model. The series for each model includes five causal predictive model bot types: Tetrad, MML, LaGrange, Bayesian and path analysis. The software in block 313 generates this series of causal predictive model bets for each set of performance drivers stored in the element definition table (184) and factor definition table (185) in the previous stage in processing. Every causal predictive model bot activated in this block contains the information shown in Table 21.

TABLE 21

1. Unique ID number (based on date, hour, minute, second of creation)
2. Creation date (date, hour, minute, second)
3. Mapping information
4. Storage location
5. Component or subcomponent of value
6. Element, sub-element or external factor
7. Variable set
8. Causal predictive model type
9. Organization
10. Organization level After the causal predictive model bots are initialized by the software in block 313, the bots activate in accordance with the frequency specified by the user (20) in the system settings table (140). Once activated, they retrieve the required information for each model and sub-divide the variables into two sets, one for training and one for testing. After the causal predictive model bots complete their processing for each model, the software in block 313 uses a model selection algorithm to identify the model that best fits the data for each element of performance, sub-element of performance and external factor being analyzed. For the system of the present invention, a cross validation algorithm is used for model selection. The software in block 313 tags and saves the refined estimates of probable impact and the best fit causal factors in the element definition table (184) or the factor definition table (185) in the ContextBase (60) before processing advances to a block 321.

If software in block 310 determines that clustering improves predictive model accuracy, then processing advances directly to block 314 as described previously. The software in block 314 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the mean squared error algorithm to the test data are given preference in determining the best set of variables. As a result of this processing, the best set of variables contains: the element data and factor data that correlate most strongly with changes in the components of value. The best set of variables will hereinafter be referred to as the "performance drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected, tagged as performance drivers and stored in the element definition table (184) and factor definition table (185) for all organization levels, the software in block 314 tests the independence of the performance drivers at every organization level before processing advances to a block 315.

The software in block 315 checks the bot date table (141) and deactivates causal predictive model bats with creation dates before the current system date. The software in block 315 then retrieves the information from the system settings table (140) and the element definition table (184) and factor definition table (185) as required to initialize causal predictive model bats for each element of performance, sub-element of performance and external factor for every organization level in accordance with the frequency specified by the user (20) in the system settings table (140).

Bats are independent components of the application that have specific tasks to perform. In the case of causal predictive model bats, their primary task is to refine the element and factor performance driver selection to reflect only causal variables. (Note: these variables are grouped together to represent a single element vector when they are dependent). In some cases it may be possible to skip the correlation step before selecting causal the item variables, factor variables, item performance indicators, factor performance indicators, composite variables and composite factors (aka element data and factor data). A series of causal predictive model bats are initialized at this stage because it is impossible to know in advance which causal predictive model will produce the "best" vector for the best fit variables from each model. The series for each model includes four causal predictive model bot types: Tetrad, LaGrange, Bayesian and path analysis. The Bayesian bats in this step also refine the estimates of element or factor impact developed by the predictive model bats in a prior processing step by assigning a probability to the impact estimate. The software in block 315 generates this series of causal predictive model bats for each set of performance drivers stored in the element definition table (184) and factor definition table (185) in the previous stage in processing. Every causal predictive model bot activated in this block contains the information shown in Table 22.

TABLE 22

1. Unique ID number (based on date, hour, minute, second of creation)
2. Creation date (date, hour, minute, second)
3. Mapping information
4. Storage location
5. Component or subcomponent of value
6. Cluster (ID) and/or Regime (ID)
7. Element, sub-element or external factor
8. Variable set
9. Organization
10. Enterprise
11. Causal predictive model type After the causal predictive model bats are initialized by the software in block 315, the bats activate in accordance with the frequency specified by the user (20) in the system settings table (140). Once activated, they retrieve the required information for each model and sub-divide the variables into two sets, one for training and one for testing. The same set of training data are used by each of the different types of bats for each model. After the causal predictive model bats complete their processing for each model, the software in block 315 uses a model selection algorithm to identify the model that best fits the data for each element, sub-element or external factor being analyzed by model and/or regime by organization and organization level. For the system of the present invention, a cross validation algorithm is used for model selection. The software in block 315 saves the refined impact estimates and the best fit causal factors in the element definition table (184) or the factor definition table (185) in the ContextBase (60) before processing advances to a block 321.

The software in block 321 tests the performance drivers to see if there is interaction between elements, between elements and external factors or between external factors by organization and organization level. The software in this block identifies interaction by evaluating a chosen model based on stochastic-driven pairs of value-driver subsets. If the accuracy of such a model is higher that the accuracy of statistically combined models trained on attribute subsets, then the attributes from subsets are considered to be interacting and then they form an interacting set. The software in block 321 also tests the performance drivers to see if there are "missing" performance drivers that are influencing the results. If the software in block 321 does not detect any performance driver interaction or missing variables for each enterprise, then system processing advances to a block 324. Alternatively, if missing data or performance driver interactions across elements are detected by the software in block 321 for one or more mission measure processing advances to a software block 322.

The software in block 322 prompts the user (20) via the structure revision window (706) to adjust the specification(s) for the elements of performance, sub-elements of performance or external factors as required to minimize or eliminate the interaction that was identified. At this point the user (20) has the option of specifying that one or more elements of performance, sub elements of performance and/or external factors be combined for analysis purposes (element combinations and/or factor combinations) for each enterprise where there is interaction between elements and/or factors. The user (20) also has the option of specifying that the elements or external factors that are interacting will be evaluated by summing the impact of their individual performance drivers. Finally, the user (20) can choose to re-assign a performance driver to a new element of performance or external factor to eliminate the inter-dependency. This process is one solution when the inter-dependent performance driver is included in the going concern element of performance. Elements and external factors that will be evaluated by summing their performance drivers will not have vectors generated.

Elements of performance and external factors generally do not share performance drivers and they are not combined with one another. However, when an external factor and an element of performance are shown to be inter-dependent, it is usually because the element of performance is a dependent on the external factor. For example, the performance of a process typically varies with the price of commodities consumed in the process. In that case, the external factor impact and the element of performance would be expected to be a function of the same performance driver. The software in block 322 examines all the factor-element dependencies and suggest the appropriate percentage of factor risk assignment to the different elements it interacts with. For example, 30% of a commodity factor risk could be distributed to each of the 3 processes that consume the commodity with the remaining 10% staying in the going concern element of performance. The user (20) either accepts the suggested distribution or specifies his own distribution for each factor-element interaction. After the input from the user (20) is saved in the system settings table (140), the element definition table (184) and factor definition table (185) system processing advances to a software block 323. The software in block 323 checks the system settings table (140) and the element definition table (184) and factor definition table (185) to see if there any changes in structure. If there have been changes in the structure, then processing returns to block 201 and the system processing described previously is repeated. Alternatively, if there are no changes in structure, then the information regarding the element interaction is saved in the organization layer table (174) before processing advances to a block 324.

The software in block 324 checks the bot date table (141) and deactivates vector generation bats with creation dates before the current system date. The software in block 324 then initializes bats for each element of performance, sub-element of performance, element combination, factor combination and external factor for each enterprise in the organization. The bats activate in accordance with the frequency specified by the user (20) in the system settings table (140), retrieve the information from the system settings table (140), the element definition table (184) and factor definition table (185) as required to initialize vector generation bats for each element of performance and sub-element of performance in accordance with the frequency specified by the user (20) in the system settings table (140). Sots are independent components of the application that have specific tasks to perform. In the case of vector generation bats, their primary task is to produce formulas, (hereinafter, vectors) that summarize the relationship between the causal performance drivers and changes in the component or sub-component of value being examined for each enterprise. The causal performance drivers may be grouped by element of performance, sub-element of performance, external factor, factor combination or element combination. As discussed previously, the vector generation step is skipped for performance drivers where the user has specified that performance driver impacts will be mathematically summed to determine the value of the element or factor. The vector generation bats use induction algorithms to generate the vectors. Other vector generation algorithms can be used to the same effect. The software in block 324 generates a vector generation bot for each set of causal performance drivers stored in the element definition table (184) and factor definition table (185). Every vector generation bot contains the information shown in Table 23.

TABLE 23

1. Unique ID number (based on date, hour, minute, second of creation)
2. Creation date_(date, hour, minute, second)
3. Mapping information
4. Storage location
5. Organization
6. Organization level
7. Element, sub-element, factor or combination
8. Factor 1
. . . to
8 + n. Factor n When bets in block 324 have identified, tagged and stored vectors for all time periods with data for all the elements, sub-elements, combinations or external factors where vectors are being calculated in the element definition table (184) and factor definition table (185) by organization and organization level, processing advances to a software block 325.

The software in block 325 checks the bot date table (141) and deactivates element life bets with creation dates before the current system date. The software in block 325 then retrieves the information from the system settings table (140) and the element definition table (184) as required to initialize element life bets for each element and sub-element of performance for each organization level being analyzed.

Bets are independent components of the application that have specific tasks to perform. In the case of element life bets, their primary task is to determine the expected life of each element and sub-element of performance. There are three methods for evaluating the expected life of the elements and sub-elements of performance:

1. Elements of performance that are defined by a population of members or items (such as: channel partners, customers, employees and vendors) will have their lives estimated by analyzing and forecasting the lives of the members of the population. The forecasting of member lives will be determined by the "best" fit solution from competing life estimation methods including the Iowa type survivor curves, Weibull distribution survivor curves, Gompertz-Makeham survivor curves, polynomial equations using the methodology for selecting from competing forecasts disclosed in cross referenced U.S. Pat. No. 5,615,109;

2. Elements of performance (such as patents, long term supply agreements and insurance contracts) that have legally defined lives will have their lives calculated using the time period between the current date and the expiration date of the element or sub-element; and 3. Finally, for commercial business evaluations elements of performance and sub-elements of performance (such as brand names, information technology and processes) that do not have defined lives and/or that may not consist of a collection of members will have their lives estimated as a function of the enterprise Competitive Advantage Period (CAP).

In the latter case, the estimate will be completed using the element vector trends and the stability of relative element strength. More specifically, lives for these element types are estimated by: subtracting time from the CAP for element volatility that exceeds enterprise volatility and/or subtracting time for relative element strength that is below the leading position and/or relative element strength that is declining. In all cases, the resulting values are tagged and stored in the element definition table (184) for each element and sub-element of performance by organization and organization level. Every element life bot contains the information shown in Table 24.

TABLE 24

1. Unique ID number (based on date, hour, minute, second of creation)
2. Creation date (date, hour, minute, second)
3. Mapping information
4. Storage location
5. Organization
6. Organization Level
7. Element or sub-element of performance
8. Life estimation method (item analysis, date calculation or relative to CAP)

After the element life bots are initialized, they are activated in accordance with the frequency specified by the user (20) in the system settings table (140). After being activated, the bots retrieve information for each element and sub-element of performance from the element definition table (184) as required to complete the estimate of element life. The resulting values are then tagged and stored in the element definition table (184) by organization and organization level in the ContextBase (60) before processing advances to a block 326.

The software in block 326 checks the bot date table (141) and deactivates event risk bots with creation dates before the current system date. The software in the block then retrieves the information from the system settings table (140) and the event risk table (186) as required to initialize event risk bots for each organization level in accordance with the frequency specified by the user (20) in the system settings table (140). Bots are independent components of the application that have specific tasks to perform. In the case of event risk bots, their primary tasks are to forecast the frequency of standard event risks by organization and organization level and forecast the impact on the mission measure. In addition to forecasting risks that are traditionally covered by insurance, the system of the present invention also uses the data to forecast standard, "non-insured" event risks such as the risk of employee resignation and the risk of customer defection. The system of the present invention uses the forecasting methods disclosed in cross-referenced U.S. Pat. No. 5,615,109 for standard event risk forecasting. Other forecasting methods can be used to the same effect. Every event risk bot contains the information shown in Table 25.

TABLE 25

1. Unique ID number (based on date, hour, minute, second of creation)
2. Creation date_{_date, hour, minute, second)
3. Mapping information
4. Storage location
5. Organization
6. Organization level
7. Event risk After the event risk bots are initialized, the bots activate in accordance with the frequency specified by the user (20) in the system settings table (140). After being activated the bots, retrieve the data from the element definition table (184) and factor definition table (185) and then forecast the frequency and severity of the event risks. The resulting forecasts for each enterprise are then stored in the event risk table (186) before processing advances to a software block 327.

The software in block 327 checks the bot date table (141) and deactivates extreme value bots with creation dates before the current system date. The software in block 327 then retrieves the information from the system settings table (140), the element definition table (184), the factor definition table (185) and the event risk table (186) as required to initialize extreme value bots in accordance with the frequency specified by the user (20) in the system settings table (140). Sots are independent components of the application that have specific tasks to perform. In the case of extreme value bots, their primary task is to forecast the probability of realizing extreme values and identify the range of extreme values for every event risk, action and causal, performance driver (for both elements of performance and external factors). The extreme value bots use the Blocks method and the peak over threshold method to identify extreme values. Other extreme value algorithms can be used to the same effect. Every extreme value bot activated in this block contains the information shown in Table 26.

TABLE 26

1. Unique 10 number (based on date, hour, minute, second of creation)
2. Creation date (date, hour, minute, second)
3. Mapping information
4. Storage location
5. Organization
6. Organization level
7. Method: blocks or peak over threshold
8. Event risk, performance driver or action After the extreme value bets are initialized, they activate in accordance with the frequency specified by the user (20) in the system settings table (140). Once activated, they retrieve the required information and forecast the likelihood of realizing extreme values and determine the extreme value range for each performance driver or event risk. The bot tags and saves the extreme values for each causal performance driver in the element definition table (184) or the factor definition table (185) by organization and organization level. The extreme event risk information is stored in the event risk table (186) by organization and organization level in the ContextBase (60) before processing advances to a software block 328.

The software in block 328 checks the bot date table (141) and deactivates strategic event bets with creation dates before the current system date. The software in block 328 then retrieves the information from the system settings table (140}, the element definition table (184), the factor definition table (185) and the event risk table (186) as required to initialize strategic event bats in accordance with the frequency specified by the user (20) in the system settings table (140). Bats are independent components of the application that have specific tasks to perform. In the case of strategic event bets, their primary task is to identify the probability and magnitude of strategic events that can impact mission measure performance for each organization level. The strategic event bets use game theoretic real option models to forecast strategic risks. Other risk forecasting algorithms can be used to the same effect. Every strategic event bot activated in this block contains the information shown in Table 27.

TABLE 27

1. Unique ID number (based on date, hour, minute, second of creation)
2. Creation date (date, hour, minute, second)
3. Mapping information
4. Storage location
5. Organization
6. Organization level After the strategic event bots are initialized, they activate in accordance with the frequency specified by the user (20) in the system settings table (140). Once activated, they retrieve the required information and forecast the frequency and magnitude of strategic events. The bots save the strategic event forecast information in the event risk table (186) by organization and organization level in the ContextBase (60) and processing advances to a block 329.

The software in block 329 checks the bot date table (141) and deactivates statistical bots with creation dates before the current system date. The software in block 329 then retrieves the information from the system settings table (140), the element definition table (184), the factor definition table (185) and the event risk table (186) as required to initialize statistical bots for each causal performance driver and event risk. Bots are independent components of the application that have specific tasks to perform. In the case of statistical bots, their primary tasks are to calculate and store statistics such as mean, median, standard deviation, slope, average period change, maximum period change, variance and covariance between each causal performance driver and event risk. Every statistical bot contains the information shown in Table 28.

TABLE 28

1. Unique ID number (based on date, hour, minute, second of creation)
2. Creation date (date, hour, minute, second)
3. Mapping information
4. Storage location
5. Organization
6. Organization level
7. Performance driver or event risk The bots in block 329 calculate and store statistics for each causal performance driver and event risk in the element definition table (184}, factor definition table (185) or event risk table (186) by organization and organization level. The covariance information is also stored in the organization layer table (174) before processing advances to a software block 331.

The software in block 331 checks the bot date table (141) and deactivates forecast update bots with creation dates before the current system date. The software in block 331 then retrieves the information from the system settings table (140) and factor definition table (185) as required to initialize forecast bots in accordance with the frequency specified by the user (20) in the system settings table (140). Bots are independent components of the application that have specific tasks to perform. In the case of forecast update bots, their task is to compare the forecasts for external factors and with the information available from futures exchanges and update the existing forecasts as required. Every forecast update bot activated in this block contains the information shown in Table 29.

TABLE 29

1. Unique ID number (based on date, hour, minute, second of creation)
2. Creation date (date, hour, minute, second)
3. Mapping information
4. Storage location
5. Organization
6. Organization level
7. External factor
8. Forecast time period After the forecast update bots are initialized, they activate in accordance with the frequency specified by the user (20) in the system settings table (140). Once activated, they retrieve the required information and determine if any forecasts need to be updated to bring them in line with the market data on future values. The bots save the updated factor forecasts in the factor definition table (185) by organization and organization level and processing advances to a software block 334.

The software in block 334 checks the bot date table (141) and deactivates scenario bots with creation dates before the current system date. The software in block 334 then retrieves the information from the system settings table (140), the element definition table (184), the factor definition table (185) and the event risk table as required to initialize scenario bots in accordance with the frequency specified by the user (20} in the system settings table (140}.

Sots are independent components of the application that have specific tasks to perform. In the case of scenario bots, their primary task is to identify likely scenarios for the evolution of the causal performance drivers and event risks by organization and organization level. The scenario bots use information from the element definition table (184), the factor definition table (185) and the event risk table (186} to develop forecasts for the evolution of causal performance drivers and risks under normal conditions, extreme conditions and a blended extreme-normal scenario. Every scenario bot activated in this block contains the information shown in Table 30.

TABLE 30

1. Unique 10 number (based on date, hour, minute, second of creation)
2. Creation date (date, hour, minute, second)
3. Mapping information
4. Storage location
5. Type: normal, extreme or blended TABLE 30-continued 6. Organization
7. Organization level After the scenario bots are initialized, they activate in accordance with the frequency specified by the user (20) in the system settings table (140). Once activated, they retrieve the required information and develop a variety of scenarios as described previously. After the scenario bots complete their calculations, they save the resulting scenarios in the scenario table (187) by organization and organization level in the ContextBase (60) and processing advances to a block 341.

The software in block 341 checks the system settings table (140) in the application database (50) to see if knowledge is going to be captured from a subject matter expert. If the current calculations are not going to utilize knowledge from a subject matter expert (25), then processing advances to a software block 344. Alternatively, if the current calculations are going to utilize knowledge captured from a subject matter expert (25), then processing advances to a software block 342.

The software in block 342 will guide the subject matter expert (25) through a series of steps as required to capture knowledge via the knowledge capture window (707). The subject matter expert (25) will provide knowledge by selecting from a template of pre-defined elements, events, actions and organization structure graphics that are developed from the information stored in the ContextBase (60). The subject-matter expert (25) is first asked to define what type of knowledge will be provided. The choices will include each of the six context layers as well as element definition, factor definition, event risk definition and scenarios. On this same screen, the subject-matter expert (25) will also be asked to decide whether basic structures or probabilistic structures will provided in this session, if this session will require the use of a time-line and if the session will include the lower level subject matter. The selection regarding type of structures will determine what type of samples will be displayed on the next screen. If the use of a time-line is indicated, then the user will be prompted to: select a reference point—examples would include today, event occurrence, when I started, etc.; define the scale being used to separate different times—examples would include seconds, minutes, days, years, etc.; and specify the number of time slices being specified in this session. The selection regarding which type of knowledge will be provided determines the display for the last selection made on this screen. As shown in Table 31 there is a natural hierarchy to the different types of knowledge that can be provided by subject-matter experts (25). For example, mission level knowledge would be expected to include relationships with the organization, instant impact, tactical and physical context layers. If the subject-matter expert (25) agrees, the knowledge capture window (707) will guide the subject-matter expert (25) to provide knowledge for each of the "lower level" knowledge areas by following the natural hierarchies shown in Table 31.

TABLE 31

| Starting point | "Lower level" knowledge areas |
| --- | --- |
| Mission | Organization, Instant Impact, Tactical, Physical |
| Organization | Instant Impact, Tactical, Physical |
| Instant Impact | Tactical, Physical |

Summarizing the preceding discussion, the subject-matter expert (25) has used the first screen to select one of ten types of knowledge to be provided (mission, organization, instant impact, tactical, physical, social environment, element, factor, event risk or scenario). The subject-matter expert (25) has also chosen to provide this information in one of four formats: basic structure without timeline, basic structure with timeline, relational structure without timeline or relational structure with timeline. Finally, the subject-matter expert (25) has indicated whether or not the session will include an extension to capture "lower level" knowledge. Each selection made by the subject-matter expert (25) will be used to identify the combination of elements, events, actions and organization structure chosen for display and possible selection. This information will be displayed in a manner that is very similar to the manner in which stencils are made available to Visio® users for use in the workspace.

The next screen displayed by the knowledge capture window (707) will, of course, depend on which combination of knowledge, structure and timeline types the subject-matter expert (25) has selected. In addition to displaying the sample structures and elements to the subject-matter expert (25}, this screen will also provide the subject-matter expert (25) with the option to use graphical operations to change the relationship structures, define new relationships and define new elements. The thesaurus table (142) in the application database provides graphical operators for: adding an element or factor, consuming an element, acquiring an element, changing element or factor values, adding a relationship, changing the strength of a relationship, identifying an event cycle, identifying a random relationship, identifying commitments, identifying constraints and indicating preferences.

The subject-matter expert (25) would be expected to select the organization structure that most closely resembles the knowledge that is being communicated and add it to the workspace in the knowledge capture window (707). After adding it to the workspace, the subject-matter expert (25) will then edit elements and events and add elements, events and descriptive information as required to fully describe the knowledge being captured from the perspective represented by the screen. If relational information is being specified, then the knowledge capture window (707) will give the subject-matter expert (25) the option of using graphs, numbers or letter grades to communicate the information regarding probabilities. If a timeline is being used, then the next screen displayed by the knowledge capture window (707) will be the screen for the same perspective from the next time period in the time line. The starting point for the next period knowledge capture will be the final version of the knowledge captured in the prior time period. After completing the knowledge capture for each time period for a given level, the knowledge capture window (707) will guide the subject-matter expert (25) to the "lower level" areas where the process will be repeated using samples that are appropriate to the context layer or area being reviewed. At all steps in the process, the subject matter background information in the ContextBase (60) and the knowledge collected during the session will be used to predict elements, actions, events and organization structures that are likely to be added or modified in the workspace. These "predictions" will be displayed using flashing symbols in the workspace. The subject-matter expert (25) will also be provided with the option of turning the predictive prompting feature off. After knowledge has been captured for all knowledge areas, the graphical results will be converted to data base entries and stored in the appropriate tables (171, 172, 173, 174, 175,

179, 184, 185, 186 or 187) in the ContextBase (60) before processing advances to a software block 344. Data from simulation programs could be added to the ContextBase (60) to provide similar information.

The software in block 344 checks the bot date table (141) and deactivates segmentation bots with creation dates before the current system date. The software in the block then retrieves the information from the system settings table (140), the element definition table (184) and factor definition table (185) and scenario table (187) to initialize segmentation bots for each organization level in accordance with the frequency specified by the user (20) in the system settings table (140). Sots are independent components of the application that have specific tasks to perform. In the case of segmentation bots, their primary task is to use the historical and forecast data to segment the performance contribution of each element, factor, combination and performance driver into a base value and a variability or risk component. The system of the present invention uses wavelet algorithms to segment the performance contribution into two components although other segmentation algorithms such as GARCH could be used to the same effect. Every segmentation bot contains the information shown in Table 32.

TABLE 32

1. Unique ID number (based on date, hour, minute, second of creation)
2. Creation date (date, hour, minute, second)
3. Mapping information
4. Storage location
5. Organization
6. Organization level
7. Element, factor, or combination
8. Segmentatio'n algorithm After the segmentation bots are initialized, the bots activate in accordance with the frequency specified by the user (20) in the system settings table (140). After being activated the bots retrieve data from the element definition table (184) and the factor definition table (185) and then segment the performance contribution of each element, factor or combination into two segments. The resulting values by period for each organization level are then stored in the element definition table (184) and factor definition table (185) before processing advances to a software block 345.

The software in block 345 checks the bot date table (141) and deactivates simulation bots with creation dates before the current system date. The software in block 345 then retrieves the information from the system settings table (140), the element definition table (184), the factor definition table (185), the event risk table (186) and the scenario table (187) as required to initialize simulation bots in accordance with the frequency specified by the user (20) in the system settings table (140).

Sots are independent components of the application that have specific tasks to perform. In the case of simulation bots, their primary tasks are to run three different types of simulations for the organization by organization level and to develop an overall summary of the risks to mission measure performance. The simulation bots run probabilistic simulations of mission measure performance for each organization level using: the normal scenario, the extreme scenario and the blended scenario. They also run an unconstrained genetic algorithm simulation that evolves to the most negative value possible over the specified time period. In one embodiment, Monte Carlo models are used to complete the probabilistic simulation, however other probabilistic simulation models such as Quasi Monte Carlo can be used to the same effect. The models are initialized using the statistics and relationships derived from the calculations completed in the prior stages of processing to relate mission measure performance to the performance driver and event risk scenarios. Every simulation bot activated in this block contains the information shown in Table 33.

TABLE 33

1. Unique ID number (based on date, hour, minute, second of creation)
2. Creation date (date, hour, minute, second)
3. Mapping information
4. Storage location
5. Type: normal, extreme, blended or unconstrained genetic algorithm
6. Mission measure
7. Organization
8. Organization level After the simulation bots are initialized, they activate in accordance with the frequency specified by the user (20) in the system settings table (140). Once activated, they retrieve the required information and simulate mission measure performance by organization and organization level over the time periods specified by the user (20) in the system settings table (140). In doing so, the bots will forecast the range of performance and risk that can be expected for the specified mission measure by organization and organization level within the confidence interval defined by the user (20) in the system settings table (140) for each scenario. The bots also create a summary of the overall risks facing the organization for the current mission measure. After the simulation bots complete their calculations, the resulting forecasts are saved in the scenario table (187) by organization and organization level and the risk summary is saved in the mission layer table (175) and the report table (183) in the ContextBase (60) before processing advances to a software block 346.

The software in block 346 checks the bot date table (141) and deactivates mission measure bots with creation dates before the current system date. The software in block 346 then retrieves the information from the system settings table (140), the mission layer table (175), the element definition table (184) and the factor definition table (185) as required to initialize bots for each element of performance, external factor, combination or performance driver for the mission measure being analyzed. Sots are independent components of the application that have specific tasks to perform. In the case of mission measure bats, their task is to determine the contribution of every element of performance, external factor, combination and performance driver to the mission measure being analyzed. The relative contribution of each element, external factor, combination and performance driver is determined by using a series of predictive models to find the best fit relationship between the element of performance vectors, external factor vectors, combination vectors and performance drivers and the mission measure. The system of the present invention uses 12 different types of predictive models to identify the best fit relationship: neural network; CART; projection pursuit regression; generalized additive model (GAM); GARCH; MMDR; redundant regression network; boosted Na"ive Bayes Regression; the support vector method; MARS; linear regression; and stepwise regression. The model having the smallest amount of error as measured by applying the mean squared error algorithm to the test data is the best fit model. The "relative contribution algorithm" used for completing the analysis varies with the model that was selected as the "best-fit". For example, if the "best-fit" model is a neural net model, then the portion of the mission measure attributable to each input vector is determined by the formula shown in Table 34.

TABLE 34 k=m j=n  j=n  k=m j=n
\ ₁ ₁ljk X ok 'j'"'!r lik) 'k 1jk  X ok
Where
lik =   Absolute value of the input weight from input node j to hidden node k
Ok =   Absolute value of output weight from hidden node k
M =    number of hidden nodes
N =    number of input nodes After completing the best fit calculations, the bats review the lives of the elements of performance that impact mission measure performance. If one or more of the elements has an expected life that is shorter than the forecast time period stored in the system settings, then a separate model will be developed to reflect the removal of the impact from the element(s) that are expiring. The resulting values for relative element of performance and external factor contributions to mission measure performance are and saved in the element definition table (184) and the factor definition table (185) by organization level and organization. If the calculations are related to a commercial business then the value of each contribution will be saved. The overall model of mission measure performance is saved in the mission layer table (175) by organization level and organization. Every mission measure bot contains the information shown in Table 35.

TABLE 35

1. Unique ID number (based on date, hour, minute, second of creation)
2. Creation date (date, hour, minute, second)
3. Mapping information
4. Storage location
5. Organization
6. Organization level
7. Element, factor, combination or performance driver
8. Mission Measure After the mission measure bats are initialized by the software in block 346 they activate in accordance with the frequency specified by the user (20) in the system settings table (140). After being activated, the bats retrieve information and complete the analysis of the mission measure performance. As described previously, the resulting relative contribution percentages are saved in the element definition table (184) and the factor definition table (185) by organization level and organization. The overall model of mission measure performance is saved in the mission layer table (175) by organization level and organization before processing advances to a software block 352.

Before continuing the discussion the remaining calculations in this section it is appropriate to briefly review the processing that has been completed in this portion of system (100) processing. At this point, the physical layer table (171), tactical layer table (172) and instant impact layer table (173) contain information that defines the administrative status of the organization by element. The social environment layer table (179) contains information that identifies the external factors that affect mission measure performance. As detailed above, the organization layer table (174) now contains information that identifies the inter relationship between the different elements, risks and factors that drive mission measure performance. The mission layer table (175) now contains a model that identifies the elements and factors that support mission measure performance by organization level and organization. The mission layer table (175) also contains a summary of the event risks and factor risks that threaten mission measure performance. The event risks include standard event risks, strategic event risks, contingent liabilities and extreme risks while the variability risks include both element variability risks and factor variability risks. In short, the ContextBase (60) now contains a complete picture of the factors that will determine mission measure performance for the organization. In the steps that follow, the ContextBase (60) will be updated to support the analysis of all organization mission measure, organizational alignment will be evaluated, the efficient frontier for organization performance will be defined and the organization ontology will be formalized and stored. The next step in this processing is completed in. software block 352.

The software in block 352 checks the mission layer table (175) in the ContextBase (60) to determine if all mission measures for all organizations have current models. If all mission measure models are not current, then processing returns to software block 301 and the processing described above for this portion (300) of the application software. Alternatively, if all mission measure models are current, then processing advances to a software block 354.

The software in block 354 retrieves the previously stored values for mission performance from the mission layer table (175) before processing advances to a software block 355. The software in block 355 checks the bot date table (141) and deactivates measure relevance bots with creation dates before the current system date. The software in block 355 then retrieves the information from the system settings table (140) and the mission layer table (175) as required to initialize a bot for each organization being analyzed. Bots are independent components of the application that have specific tasks to perform. In the case of measure relevance bots, their task is to determine the relevance of each of the different mission measures to mission performance. The relevance of each mission measure is determined by using a series of predictive models to find the best fit relationship between the mission measures and mission performance. The system of the present invention uses 12 different types of predictive models to identify the best fit relationship: neural network; CART; projection pursuit regression; generalized additive model (GAM); GARCH; MMDR; redundant regression network; boosted Na'ive Bayes Regression; the support vector method; MARS; linear regression; and stepwise regression. The model having the smallest amount of error as measured by applying the mean squared error algorithm to the test data is the best fit model. Bayes models are used to define the probability associated with each relevance measure and the Viterbi algorithm is used to identify the most likely contribution of all elements, factors and risks by organization level as required to produce a report. The relative contribution each of mission measure to mission performance is saved in the mission layer table (175) by organization level and organization. Every measure relevance bot contains the information shown in Table 36.

TABLE 36

1. Unique ID number (based on date, hour, minute, second of creation)
2. Creation date (date, hour, minute, second)
3. Mapping information
4. Storage location
5. Organization
6. Organization level
7. Mission Measure After the measure relevance bets are initialized by the software in block 355 they activate in accordance with the frequency specified by the user (20) in the system settings table (140). After being activated, the bets retrieve information and complete the analysis of the mission performance. As described previously, the. relative mission measure contributions to mission performance and the associated probability are saved in the mission layer table (175) by organization level and organization before processing advances to a software block 356.

The software in block 356 retrieves information from the mission layer table (175) and then checks the mission measures by organization level to determine if they are in alignment with the overall mission. As discussed previously, lower level measures that are out of alignment can be identified by the presence of measures from the same level with more impact. For example, employee training could be shown to be a strong performance driver for the organization. If the human resources department (that is responsible for both training and performance evaluations) was using a timely performance evaluation measure, then the measures would be out of alignment. If mission measures are out of alignment, then the software in block 356 prompts the manager (21) via the mission edit data window (708) to change the mission measures by organization level as required to Alternatively, if mission measures by organization level are in alignment, then processing advances to a software block 357.

The software in block 357 checks the bot date table (141) and deactivates frontier bets with creation dates before the current system date. The software in block 357 then retrieves information from the system settings table (140), the element definition table (184), the factor definition table (185), the event risk table (186) and the scenarios table (187) as required to initialize frontier bets for each scenario. Bets are independent components of the application that have specific tasks to perform. In the case of frontier bets, their primary task is to define the efficient frontier for organization performance under each scenario. The top leg of the efficient frontier for each scenario is defined by successively adding the features, options and performance drivers that improve while increasing risk to the optimal mix in resource efficiency order. The bottom leg of the efficient frontier for each scenario is defined by successively adding the features, options and performance drivers that decrease performance while decreasing risk to the optimal mix in resource efficiency order. Every frontier bot contains the information shown in Table 37.

TABLE 37

1. Unique ID number (based on date, hour, minute, second of creation)
2. Creation date (date, hour, minute, second)
3. Mapping information
4. Storage location
5. Organization
6. Scenario: normal, extreme and blended After the software in block 357 initializes the frontier bets, they activate in accordance with the frequency specified by the user (20) in the system settings table (140). After completing their calculations, the results of all 3 sets of calculations (normal, extreme and most likely) are saved in the report table (183) in sufficient detail to generate a chart before processing advances to a software block 358.

The software in block 358 takes the previously stored definitions of key terms, events, organization levels, context layers, event risks and stores them in the ontology table (182) using the OWL language. Use of the rdf based OWL language will enable the synchronization of the organizations ontology with other organizations and will facilitate the extraction and use of information from the semantic web. After the organization ontology is saved in the ContextBase (60), processing advances to a software block 362.

The software in block 362 checks the system settings table (140) in the application database (50) to determine if event models will be created. If event models are not going to be created, then processing advances to a software block 372. Alternatively, if event models are going to be developed, then processing advances to a software block 364. The software in block 364 prompts the user (20) via the event selection window (709) to select the events that will have models developed. Actions are a subset of events so they can also be selected for modeling. The events selected for modeling are stored in the event model table (188) in the ContextBase (60) before processing advances to a software block 365. The software in block 365 retrieves the previously stored event history and forecast information from the tactical layer table (172) before processing advances to a software block 304 where the processing used to identify causal performance drivers is used to identify causal event drivers. When models for each selected event are stored in the event model table (188) processing advances to software block 372.

The software in block 372 checks the system settings table (140) in the application database (50) to determine if impact models will be created. If impact models are not going to be created, then processing advances to a software block 402. Alternatively, if impact models are going to be developed, then processing advances to a software block 374. The software in block 374 prompts the user (20) via the impact selection window (710) to select the impacts that will have models developed. The impacts selected for modeling are stored in the impact model table (189) in the Context-Base (60) before processing advances to a software block 375. The software in block 365 retrieves the previously stored impact history and forecast information from the instant impact layer table (173) before processing advances to a software block 304 where the processing used to identify causal performance drivers is used to identify causal impact drivers. When models for each selected impact are stored in the impact model table (189) processing advances to software block 402.

Context Frame Definition

The flow diagram in FIG. 8 details the processing that is completed by the portion of the application software (400) that generates context frames and optionally displays and prints management reports detailing the mission performance of the organization. Processing in this portion of the application starts in software block 402.

The software in block 402 retrieves information from the system settings table (140), the physical layer table (171), the tactical layer table (172), the instant impact layer table (173), the organization layer table (174), the mission layer table (175), the social environment layer table (179), the element definition table (184), the factor definition table (185) and the event risk table (186) as required to define context frames for every organization level and combination specified by the user (20) in the system settings table. The resulting frame definitions are stored in the context frame table (190) before processing advances to a software block 403.

The software in block 403 prompts the user (20) via the frame definition data window (711) to define additional context frames. If the user defines new context frames, then the information required to define the frame is retrieved from the physical layer table (171), the tactical layer table (172), the instant impact layer table (173), the organization layer table (174), the mission layer table (175), the social environment layer table (179), the element definition table (184), the factor definition table (185) and/or the event risk table (186) and the context frame specification is stored in the context frame table (190). The context frames developed by the software in block 402 will identify and include information regarding all elements that are impacted by a change in a given context frame. In block 403, the user (20) has the option of limiting the elements included in the frame to include only those elements that have a certain level of impact. For example, if a change in supply chain operation had a very weak causal impact on brand strength, then brand information could be excluded from the frame specified by the user (20) in this block. If event models or impact models have been created, then the software in block 403 can define context frames for event and impact analysis using the same procedure described for developing mission measure context frames. The newly defined context frames for events, impacts and mission measures are stored in the context frame table (190) processing passes to a software block 404.

The software in block 404 supports the complete context interface data window (712). The complete context interface data window (712) is where the Complete Context™ Systems (601, 602, 603, 604, 605, 606, 607 and 608) request context frames for use in completing their functions. In addition to supplying context frames to the standard applications via a network (45), the software in block 404 supports integration and translation with other ontologies as required to complete transactions and analysis in automated fashion. The Complete Context™ Systems (601, 602, 603, 604, 605, 606, 607 and 608) all have the ability to support other ontologies as well as the translation and integration of these ontologies with the ontology developed by the system of the present invention. The software in block 404 provides context frames to the standard applications upon request. Processing continues to a software block 410.

The software in block 410 completes two primary functions. First it uses the narrow system interface data window (713) to interact with each narrow system (30) as required identify the context quotient for that system. Second, it provides context frame information to each narrow system (30) in a format that can be used by that narrow system (30). The context quotient is a score that is given to each narrow system (30) that identifies the relative ability of the narrow system to flexibly process information from the six different context layers. The scores range from 2 to 200 with 200 being the highest score. The Complete Context™ Systems (601, 602, 603, 604, 605, 606, 607 and 608) all have context quotients of 200. Twenty points are given for each context layer the narrow system is able to process. For example, a supply chain optimization system with the ability to optimize supplier purchase cost (instant impact) given an inventory status (physical) and order status (tactical) would be given sixty points—twenty points for each of the 3 layers it is able to process. If the supply chain optimization system was able to change its optimal solution based on new information regarding the relationship between the supply chain and other elements of performance (organization) like the customer base and channel partners, then another twenty points would be given for its ability to process organization layer information. The process is repeated for each layer. When the narrow system (30) changes its results in response to input from a new layer, then another twenty points are added to the context quotient for that system. Another thirteen points are awarded for the ability to respond to changes in the relative importance of different attributes within a context layer. For example, many systems include one or two factors from the social environment in their analyses, however, as new factors become important, these systems fail to recognize the new factors. The points awarded for each "ability" are not particularly important, what is important is that the context quotient score consistently reflects the ability of each system to reliably process the full spectrum information from each of the six context layers in the current environment and in the future when the relative importance of different attributes when each layer are expected to change. The results of the evaluation of the context quotient for a narrow system (30) seeking data from the system of the present invention are saved in the context quotient table (192) in the ContextBase (60). The results of the context quotient analysis are used to determine which context layers should be included in the context frame sent to each narrow system (30). After defining a context frame for the narrow system in a manner similar to that described previously for complete context frames, a packet containing the required information is transmitted to the narrow system (30) via a network. Alternatively, an operating system layer could be propagated as described in cross-referenced patent application Ser. No. 10/071,164 filed Feb. 7, 2002; Ser. No. 10/124,240 filed Apr. 18, 2002 and Ser. No. 10/124,327 filed Apr. 18, 2002. The ability to support ontology translation and integration is not provided in this software block as there are no known narrow systems with the ability to support the development and communication of a complete ontology. The ability to support this function could easily be added. The software in block 410 evaluates context quotients and provides customized context frames to the narrow systems (30) upon request. Processing continues to a software block 411.

The software in block 411 prompts the user (20) via the report display and selection data window (714) to review and select reports for printing. The format of the reports is either graphical, numeric or both depending on the type of report the user (20) specified in the system settings table (140). If the user (20) selects any reports for printing, then the information regarding the selected reports is saved in the report table (183). After the user (20) has finished selecting reports, the selected reports are displayed to the user (20) via the report display and selection data window (714). After the user (20) indicates that the review of the reports has been completed, processing advances to a software block 412. The processing can also pass to block 412 if the maximum amount of time to wait for no response specified by the user (20) in the system settings table is exceeded and the user (20) has not responded.

The software in block 412 checks the report table (183) to determine if any reports have been designated for printing. If reports have been designated for printing, then processing advances to a block 415. It should be noted that in addition to standard reports like the performance risk matrix (FIG. 10), the mission performance matrix (FIG. 11), and the graphical depictions of the efficient frontier shown (FIG. 12), the system of the present invention can generate reports that rank the elements, external factors and/or risks in order of their importance to mission performance and/or mission risk by organization level, by mission measure and/or for the organization as a whole. The system can also produce reports that compare results to plan for actions, impacts and mission measure performance if expected performance levels have been specified and saved in appropriate context layer as well as "metrics" reports that trace the historical values for performance drivers over time. The software in block 415 sends the designated reports to the printer (118). After the reports have been sent to the printer (118), processing advances to a software block 417. Alternatively, if no reports were designated for printing, then processing advances directly from block 412 to block 417.

The software in block 417 checks the system settings table (140) to determine if the system is operating in a continuous run mode. If the system is operating in a continuous run mode, then processing returns to block 205 and the processing described previously is repeated in accordance with the frequency specified by the user (20) in the system settings table (140). Alternatively, if the system is not running in continuous mode, then the processing advances to a block 418 where the system stops.

Thus, the reader will see that the system and method described above transforms data and information from disparate narrow systems into an Entity Context System (100). The level of detail, breadth and speed of the analysis gives users of the integrated system the ability to search their data, information and knowledge in a fashion that is less complex and more powerful than any method currently available to users of the isolated, narrowly focused management systems.

While the above description contains many specificities, these should not be construed as limitations on the scope of the invention, but rather as an exemplification of one embodiment thereof. Accordingly, the scope of the invention should be determined not by the embodiment illustrated, but by the appended claims and their legal equivalents.

I claim:

1. A system for implementing an architecture for context aware computing for an organization, comprising:
    a computer with a processor having circuitry to execute instructions; and
    a storage device available to the processor with one or more sequences of instructions stored therein, which when executed cause the processor to:
        provide a data access layer operable to exchange data with a user, one or more external databases and a plurality of systems, accept an organization structure definition that comprises a plurality of organization levels, accept a quantitative measure definition and store the data and definitions in one or more context layers;
        provide a modeling layer operable to develop a measure context layer and an organization context layer for at least one combination of the organization levels by learning from the stored data, wherein developing the measure context layer by learning from the data comprises completing a multi-stage process that includes multiple stages for developing a linear or nonlinear predictive measure model wherein each stage of the multi-stage process comprises an automated selection of an output from a plurality of outputs produced by a plurality of modeling algorithms after processing at least part of the data wherein a linearity of the measure model is determined by an evaluation of an accuracy of at least one linear model and at least one nonlinear model in a final stage of the multi-stage process; and
        provide a context frame layer that develops and outputs a context frame comprising the measure and organization context layers and one or more other context layers for the at least one combination of organization levels wherein the context frame comprises an importance of one or more elements to the measure and a quantified dependence between the elements wherein the context frame enables the output of a graph that comprises a node for each element and the importance measure for each element.

2. The system of claim 1, wherein the processor further provides one or more applications for managing a measure performance of the at least one combination of organization levels wherein the applications utilize the context frame to summarize a measure performance situation and wherein the one or more applications are selected from a group consisting of analysis, forecast, optimization, planning and project management wherein the project management application identifies a set of project features that optimize a project value and a project risk for the context frame.

3. The system of claim 1, wherein the one or more other context layers are selected from a group consisting of physical, tactical, and social environment.

4. The system of claim 1, wherein the plurality of organization levels are selected from a group consisting of team, group, department, division, company, and enterprise for one or more organizations.

5. The system of claim 1, wherein the plurality of modeling algorithms comprise two or more predictive model algorithms for at least one first stage of the multi-stage process and two or more causal model algorithms for at least one second stage of the multi-stage process.

6. The system of claim 1, further comprising, a Context-Base that stores data in accordance with a context by a context layer.

7. A method for implementing an architecture for context aware computing for an organization, comprising:
    using a computer to complete at least one of the steps of performing operations, including at least one of the following by using a computer:
        providing a data access layer operable to exchange data with a plurality of sources including a user, one or more external databases and a plurality of systems, accept an organization structure definition that comprises a plurality of organization levels, accept one quantitative measure definitions and store the data and the definitions in one or more context layers;
        providing a modeling layer operable to develop a measure context layer and an organization context layer for at least one combination of the organization levels by learning from the stored data, wherein developing the measure context layer by learning from the data comprises completing a multi-stage process for developing a predictive measure model wherein each stage of the multi-stage process comprises an automated selection of an output from a plurality of outputs produced by a plurality of modeling algorithms after processing at least part of the data wherein a linearity of each measure model is determined by an evaluation of an accuracy of at least one linear model and at least one nonlinear model in a final stage of the multi-stage process and wherein each stage is completed with and without clustering; and
        providing a context frame layer that develops and outputs a context frame comprising the measure layer, the organization context layer and one or more additional context layers wherein the context frame comprises an importance of one or more elements and one or more factors to the measure and a quantified dependence between the elements and factors wherein the context frame enables the output of a graph that comprises a node for each element and factor and the importance measure for each element and factor.

8. The method of claim 7, wherein the method further comprises providing one or more applications for managing a measure performance of the at least one combination of organization levels wherein the applications utilize the context frame for summarizing a measure performance situation and wherein the one or more applications are selected from a group consisting of analysis, forecast, optimization, planning, and project management.

9. The method of claim 7, wherein the plurality of systems are selected from a group consisting of accounting systems, alliance management systems, asset management systems, brand management systems, budgeting/financial planning systems, business intelligence systems, call management systems, cash management systems, channel management systems, commodity risk management systems, content management systems, contract management systems, credit-risk management system, customer relationship management systems, data integration systems, demand chain systems, decision support systems, document management systems, email management systems, employee relationship management systems, energy risk management systems, executive dashboard systems, expense report processing systems, fleet management systems, fraud management systems, freight management systems, human capital management systems, human resource management systems, incentive management systems, innovation management systems, insurance management systems, intellectual property management systems, intelligent storage systems, interest rate risk management systems, investor relationship management systems, knowledge management systems, learning management systems, location management systems, maintenance management systems, material requirement planning systems, metrics creation system, online analytical processing systems, ontology management systems, partner relationship management systems, payroll systems, performance management systems, price optimization systems, private exchanges, process management systems, product life-cycle management systems, project management systems, project portfolio management systems, revenue management systems, risk management information system, risk simulation systems, sales force automation systems, scorecard systems, sensor grid systems, service management systems, six-sigma quality management systems, strategic planning systems, supply chain systems, supplier relationship management systems, support chain systems, taxonomy development systems, technology chain systems, unstructured data management systems, visitor (web site) relationship management systems, weather risk management systems, workforce management systems, yield management systems and combinations thereof.

10. The method of claim 7, wherein the one or more additional context layers are selected from a group consisting of physical, tactical and social environment and wherein the context frame defines a context.

11. The method of claim 7, wherein the plurality of organization levels are selected from a group consisting of individual, team, group, department, division, company, and enterprise for one or more organizations.

12. The method of claim 7, wherein the method further comprises identifying a set of project features that optimize a project value and a project risk for the at least one context frame.

13. The method of claim 7, further comprising, developing a ContextBase that stores data in accordance with a context by a context layer.

14. The method of claim 7, wherein the plurality of modeling algorithms comprise two or more predictive model algorithms for at least one first stage of the multi-stage process and two or more causal model algorithms selected from the group consisting of Tetrad, LaGrange, Bayes and path analysis for at least one second stage of the multi-stage process.

15. A computer program product tangibly embodied on a computer readable medium and comprising a non-transitory program code for directing at least one computer to perform operations in accordance with an architecture for context aware computing for an organization, the operations comprising:
providing a data access layer operable to exchange data with a plurality of sources including a user, one or more external databases and a plurality of systems, accept an organization structure definition that comprises a plurality of organization levels, accept one quantitative measure definitions and store the data and the definitions in one or more context layers;
providing a modeling layer operable to develop a measure context layer and an organization context layer for at least one combination of the organization levels by learning from the stored data, wherein developing the measure context layer by learning from the data comprises completing a multi-stage process for developing a predictive measure model wherein each stage of the multi-stage process comprises an automated selection of an output from a plurality of outputs produced by a plurality of modeling algorithms after processing at least part of the data wherein a linearity of each measure model is determined by an evaluation of an accuracy of at least one linear model and at least one nonlinear model in a final stage of the multi-stage process; and
providing a context frame layer that develops a context frame comprising the measure layer, the organization context layer and one or more additional context layers wherein the context frame comprises a contribution of one or more elements to the measure and a quantified dependence between the elements wherein the context frame enables the output of a graph that comprises a node for each element and the importance measure for each element.

16. The computer program product of claim 15, wherein the non-transitory program code further directs the at least one computer to provide one or more applications for managing a measure performance of the at least one combination of organization levels wherein the applications utilize the context frame for summarizing a measure performance situation and wherein the one or more applications are selected from a group consisting of analysis, forecast, optimization, planning, and project management.

17. The computer program product of claim 15, wherein the one or more additional context layers are selected from a group consisting of physical, tactical, instant and social environment.

18. The computer program product of claim 15, wherein the non-transitory program code further directs the at least one computer to identify a set of project features that optimize a project value and a project risk for the context frame.

19. The computer program product of claim 15, wherein the plurality of organization levels are selected from a group consisting of individual, team, group, department, division, company, and enterprise.

20. The computer program product of claim 15, wherein the context frame defines a context.

21. The computer program product of claim 15, wherein the processing provides a ContextBase that stores data in accordance with a context by a context layer.

22. The computer program product of claim 15, wherein the plurality of modeling algorithms comprise two or more algorithms selected from a group consisting of neural network, classification and regression trees, projection pursuit regression, generalized additive model, redundant regression network, linear regression, support vector method, MARS and stepwise regression for at least one first stage of multi-stage process and two or more causal model algorithms for at least one second stage of multi-stage process.

23. An advanced system for implementing an architecture for context aware computing for an organization, comprising:
 a computer with a processor having circuitry to execute instructions; and
 a storage device available to the processor with one or more sequences of instructions stored therein, which when executed cause the processor to:
  provide a data access layer operable to obtain data from a plurality of sources including a user, one or more external databases, a world wide web and a plurality of narrow systems, accept an organization structure definition that comprises a plurality of organization levels, accept one or more quantitative measure definitions and store the data and the definitions in one or more context layers;
  provide a modeling layer operable to develop a measure context layer and an organization context layer for at least one combination of the organization levels by learning from the stored data; and
  provide a context frame layer operable to define and output a context frame that comprises the measure context layer, the organization context layer and one or more of the other context layers wherein the context frame comprises a contribution of each of one or more elements and each of one or more factors to each of the measures and a quantified dependence between each of the elements and factors wherein the context frame enables the output of a graph that comprises a node for each element and factor and the contribution measure for each element and factor.

24. The system of claim 23, wherein the plurality of organization levels are selected from a group consisting of individual, team, group, department, division, company, and enterprise.

25. The system of claim 23, wherein the context frame defines a context.

26. The system of claim 23, wherein the system further comprises a ContextBase that stores data in accordance with a context by a context layer.

27. The system of claim 23, wherein the plurality of narrow systems are selected from a group consisting of accounting systems, alliance management systems, asset management systems, brand management systems, budgeting/financial planning systems, business intelligence systems, call management systems, cash management systems, channel management systems, commodity risk management systems, content management systems, contract management systems, credit-risk management system, customer relationship management systems, data integration systems, demand chain systems, decision support systems, document management systems, email management systems, employee relationship management systems, energy risk management systems, executive dashboard systems, expense report processing systems, fleet management systems, fraud management systems, freight management systems, human capital management systems, human resource management systems, incentive management systems, innovation management systems, insurance management systems, intellectual property management systems, intelligent storage systems, interest rate risk management systems, investor relationship management systems, knowledge management systems, learning management systems, location management systems, maintenance management systems, material requirement planning systems, metrics creation system, online analytical processing systems, ontology management systems, partner relationship management systems, payroll systems, performance management systems, price optimization systems, private exchanges, process management systems, product life-cycle management systems, project management systems, project portfolio management systems, revenue management systems, risk management information system, risk simulation systems, sales force automation systems, scorecard systems, sensor grid systems, service management systems, six-sigma quality management systems, strategic planning systems, supply chain systems, supplier relationship management systems, support chain systems, taxonomy development systems, technology chain systems, unstructured data management systems, visitor (web site) relationship management systems, weather risk management systems, workforce management systems and yield management systems.

28. The system of claim 23, wherein the processor further provides one or more applications for managing a measure performance of the at least one combination of organization levels wherein the applications utilize the context frame for summarizing a measure performance situation and wherein the one or more applications are selected from a group consisting of analysis, forecast, optimization, planning and project management.

29. The system of claim 23, wherein developing the measure context layer by learning from the data comprises completing a multi-stage process for developing a predictive model for each measure wherein each stage of the multi-stage process comprises an automated selection of an output from a plurality of outputs produced by a plurality of modeling algorithms after processing at least part of the data wherein a linearity of each measure model is determined by an evaluation of an accuracy of at least one linear model and at least one nonlinear model in a final stage of the multi-stage process.

30. The system of claim 23, wherein the plurality of modeling algorithms comprise two or more algorithms selected from a group consisting of neural network, classification and regression trees, projection pursuit regression, generalized additive model, redundant regression network, linear regression, support vector method, MARS and stepwise regression for at least one first stage of the multi-stage process and two or more algorithms selected from a group consisting of Tetrad, LaGrange, Bayes, MML and path analysis for at least one second stage of multi-stage process.

31. The system of claim 23, wherein the processor further provides an application for identifying a set of project features that optimize a project value and a project risk for the at least one context frame wherein the context frame comprises a project sponsor.

32. A non-transitory computer program product tangibly embodied on a computer readable medium and comprising program code for directing at least one computer to perform operations in accordance with an advanced architecture for context aware computing for an organization and to provide the following:
a data access layer operable to obtain data from a plurality of sources including a user, one or more external databases, a world wide web and a plurality of narrow systems, accept an organization structure definition that comprises a plurality of organization levels, accept one or more quantitative measure definitions and store the data and the definitions in one or more context layers;
a modeling layer operable to develop a measure context layer and an organization context layer for at least one combination of the organization levels by learning from the stored data; and
a context frame layer operable to define an entity and output a context frame that comprises the measure context layer, the organization context layer, and one or more of the other context layers wherein the context frame comprises a contribution of each of one or more elements and each of one or more factors to each of the measures and a quantified dependence between each of the elements and factors wherein the context frame enables the output of a graph that comprises a node for each element and factor and the contribution measure for each element and factor.

33. The computer program product of claim 32, wherein the plurality of organization levels are selected from a group consisting of individual, team, group, department, division, company, and enterprise.

34. The computer program product of claim 32, wherein the context frame defines a context.

35. The computer program product of claim 32, wherein the context frame further comprises a ContextBase that stores data in accordance with a context by a context layer.

36. The computer program product of claim 32, wherein the non-transitory program code further directs the at least one computer to provide one or more applications for managing a measure performance of the at least one combination of organization levels wherein the applications utilize the context frame for summarizing a measure performance situation and wherein the one or more applications are selected from a group consisting of analysis, forecast, optimization, planning, project management and review.

37. The computer program product of claim 32, wherein developing the measure context layer by learning from the data comprises completing a multi-stage process for each model wherein each stage of the multistage process comprises an automated selection of an output from a plurality of outputs produced by a plurality of modeling algorithms after processing at least part of the data wherein a linearity of each measure model is determined by an evaluation of an accuracy of at least one linear model and at least one nonlinear model in a final stage of the multi-stage process.

38. The computer program product of claim 37, wherein the plurality of modeling algorithms comprise two or more predictive model algorithms selected from a group consisting of neural network, classification and regression tree, projection pursuit regression, generalized additive model, redundant regression network, linear regression, support vector method, multivariate adaptive regression spline and stepwise regression for at least one first stage of the multi-stage process and two or more causal model algorithms selected from a group consisting of Tetrad, LaGrange, Bayes, MML and path analysis for at least one second stage of the multi-stage process.

39. The computer program product of claim 32, wherein the non-transitory program code further directs the at least one computer to identify a set of project features that maximize a project value and minimize a project risk for the context frame.

40. The computer program product of claim 32, wherein the plurality of narrow systems are selected from a group consisting of accounting systems, alliance management systems, asset management systems, brand management systems, budgeting/financial planning systems, business intelligence systems, call management systems, cash management systems, channel management systems, commodity risk management systems, content management systems, contract management systems, credit-risk management system, customer relationship management systems, data integration systems, demand chain systems, decision support systems, document management systems, email management systems, employee relationship management systems, energy risk management systems, executive dashboard systems, expense report processing systems, fleet management systems, fraud management systems, freight management systems, human capital management systems, human resource management systems, incentive management systems, innovation management systems, insurance management systems, intellectual property management systems, intelligent storage systems, interest rate risk management systems, investor relationship management systems, knowledge management systems, learning management systems, location management systems, maintenance management systems, material requirement planning systems, metrics creation system, online analytical processing systems, ontology management systems, partner relationship management systems, payroll systems, performance management systems, price optimization systems, private exchanges, process management systems, product life-cycle management systems, project management systems, project portfolio management systems, revenue management systems, risk management information system, risk simulation systems, sales force automation systems, scorecard systems, sensor grid systems, service management systems, six-sigma quality management systems, strategic planning systems, supply chain systems, supplier relationship management systems, support chain systems, taxonomy development systems, technology chain systems, unstructured data management systems, visitor (web site) relationship management systems, weather risk management systems, workforce management systems and yield management systems.

41. An apparatus for implementing an architecture for context aware computing for an organization, comprising:
a memory configured to store data; and
a processor configured to:
accept and store an organization structure definition that comprises a plurality of organization levels;
accept and store one or more quantitative measure definitions;
obtain data from a plurality of sources comprising a user, one or more external databases, a world wide web and a plurality of narrow systems;
prepare and store the data obtained from the sources in one or more context layers;

develop and output a predictive model for each of the defined measures for at least one combination of the organization levels;

develop and output a measure relevance for the at least one combination of the organization levels;

develop and output a measure layer for the at least one combination of the organization levels comprised of the measure relevance and the one or more predictive measure models;

develop and output an organization layer for the at least one combination of the organization levels from the data obtained from the plurality of sources; and define a context frame for the at least one combination of the organization levels that comprises the measure layer the organization layer and one or more of the other context layers wherein the context frame comprises a contribution of each of one or more elements and each of one or more factors to each of the measures and a quantified dependence between each of the elements and factors wherein the context frame enables the output of a graph that comprises a node for each element and factor and the contribution measure for each element and factor.

42. The apparatus of claim 41, wherein the context frame defines a context.

43. The apparatus of claim 41, wherein the memory stores data in accordance with a context by a context layer.

44. The apparatus of claim 41, wherein the apparatus further comprises a component configured to provide one or more applications for managing a measure performance of the at least one combination of organization levels wherein the applications utilize the context frame to summarize a measure performance situation and wherein the one or more applications are selected from a group consisting of analysis, forecast, optimization, planning, project management and review.

45. The apparatus of claim 41, wherein the processor is further configured to complete a multi-stage process for each model wherein each stage of the multi-stage process comprises an automated selection of an output from a plurality of outputs produced by a plurality of modeling algorithms after processing at least part of the data wherein a linearity of each measure model is determined by an evaluation of an accuracy of at least one linear model and at least one nonlinear model in a final stage of the multi-stage process.

46. The apparatus of claim 45, wherein the plurality of modeling algorithms comprise two or more algorithms selected from a group consisting of neural network, classification and regression trees, projection pursuit regression, generalized additive model, redundant regression network, linear regression, support vector method, MARS and stepwise regression for at least one first stage of the multi-stage process and two or more causal model algorithms selected from a group consisting of Tetrad, LaGrange, MML, Bayes and path analysis for at least one second stage of the multi-stage process.

47. The apparatus of claim 41, wherein the output from each of the measure models comprises a relative contribution from one or more elements of performance and one or more external factors to each measure.

48. The apparatus of claim 41, wherein the plurality of organization levels are selected from a group consisting of individual, team, group, department, division, company, and enterprise.

49. The apparatus of claim 41, wherein the processor is further configured to identify a set of project features that maximize a project value and minimize a project risk for the context frame wherein the context frame comprises a project sponsor.

* * * * *